(12) United States Patent
Meisels et al.

(10) Patent No.: US 9,552,334 B1
(45) Date of Patent: Jan. 24, 2017

(54) GEOTEMPORAL WEB AND MOBILE SERVICE SYSTEM AND METHODS

(75) Inventors: Adrienne Meisels, New York, NY (US); Bart Besseling, Foster City, CA (US); Michael Gray, New York, NY (US); Matthew Weinstein, Santa Monica, CA (US)

(73) Assignee: MYPLANIT INC., New York, NY (US)

( * ) Notice: Subject to any disclaimer, the term of this patent is extended or adjusted under 35 U.S.C. 154(b) by 607 days.

(21) Appl. No.: 13/468,898

(22) Filed: May 10, 2012

Related U.S. Application Data

(60) Provisional application No. 61/484,314, filed on May 10, 2011.

(51) Int. Cl.
  *G06F 17/30* (2006.01)
  *G06F 17/21* (2006.01)

(52) U.S. Cl.
  CPC .................................. *G06F 17/218* (2013.01)

(58) Field of Classification Search
  CPC .................................................... G06F 17/218
  USPC ........................................................ 707/722
  See application file for complete search history.

(56) References Cited

U.S. PATENT DOCUMENTS

| | | | |
|---|---|---|---|
| 7,180,516 B2 | 2/2007 | Kapler et al. | |
| 7,499,046 B1 | 3/2009 | Wright et al. | |
| 7,609,257 B2 | 10/2009 | Wright et al. | |
| 7,688,322 B2 | 3/2010 | Kapler et al. | |
| 2003/0156138 A1* | 8/2003 | Vronay et al. | 345/772 |
| 2003/0200192 A1* | 10/2003 | Bell et al. | 707/1 |
| 2005/0022168 A1* | 1/2005 | Zhu et al. | 717/124 |
| 2009/0160658 A1* | 6/2009 | Armstrong et al. | 340/573.1 |
| 2009/0216435 A1* | 8/2009 | Zheng | G06F 17/3087 701/533 |
| 2009/0300009 A1* | 12/2009 | Rezaei et al. | 707/5 |
| 2010/0046842 A1* | 2/2010 | Conwell | G06F 17/30265 382/218 |
| 2010/0310182 A1* | 12/2010 | Kroepfl | G06K 9/00624 382/216 |
| 2011/0099045 A1* | 4/2011 | Carr et al. | 705/7.31 |
| 2011/0264649 A1* | 10/2011 | Hsiao et al. | 707/722 |

OTHER PUBLICATIONS

Tian et al., "The Organization of Mobile Personal Lifelog by Activity", 2010.*

* cited by examiner

*Primary Examiner* — Mariela Reyes
*Assistant Examiner* — Dawaune Conyers
(74) *Attorney, Agent, or Firm* — Ellenoff Grossman & Schole LLP

(57) ABSTRACT

A system and a method are presented for providing a data schema for managing people's important relationships to other people and businesses, past-present-future plans and events, places, activities, memorable life moments and any information about anything that exists or occurred in the earth's time-space reality, as well as a set of Internet services and transactions that allow people to make plans for the future, discover what to do and where to go for their present and future, discover content and commercial offerings for places in which they are or may be interested, and let them organize, share, recall and relive their history in useful and powerful ways.

17 Claims, 16 Drawing Sheets

GEOTEMPORAL WEB AND MOBILE SERVICE SYSTEM AND METHODS

CROSS-REFERENCE TO RELATED APPLICATIONS

The present application claims the benefit, pursuant to the provisions of 35 U.S.C. 119, of U.S. Provisional Application Ser. No. 61/484,314, filed on Tuesday, May 10, 2011.

FIELD OF THE INVENTION

Embodiments of the present disclosure relate to the field of personal data management and, more particularly, to a data schema for managing people's important relationships to other people and businesses, past-present-future plans and events, places, activities, and memorable life moments.

BACKGROUND OF THE INVENTION

Most people use several different online and offline tools to record, organize and share different aspects of the information that relates to their physical world (places, relationships/people, events, and life moments), including, without limitation, the following:

Personal information management tools (e.g., Microsoft Outlook™, Google Calendar™, calendar/contacts, etc.) for recording and managing their information about people, places, and calendared events.

Paper for recording and remembering their people, places, events and moments (e.g., post-it notes, articles from travel or restaurant review magazines, newspaper advertisements for sales at local businesses, diaries, etc.)

GPS and online and offline mapping services for figuring out where they are and how to get somewhere else (e.g., Google Maps™, MapQuest™, car-based GPS such as Garmin™ and Tomtom™ products.)

Online services such as digital venue, event, commercial deals databases and other websites and digital applications to discover a) new places to go, such as restaurants, businesses, vacation spots (e.g., Google Places/Hotspot™, Yelp™, Zagat™ Tripadvisor.com™, etc.), b) new events to experience (e.g., Moviefone™, Meetup™ community event databases, etc.) and c) new deals, coupons, specials at commercial venues to derive financial value (e.g., Foursquare™, Groupon™, Shopkick™, etc.)

Digital cameras, smartphones, mobile devices, camcorders, computers and other digital devices to record private notes, photos, videos, audio and other media about places, people, events and moments that they encounter or experience.

Email and social networks to share information about places, people, events and moments with their friends. These messages include data as to when the message was sent and often include information as to from where the message was originated (e.g., GPS information, street information, venue information.) These messages may include media such as pictures, video, audio recordings, music, and other digital media formats.

Sometimes people do not record such information because it is not currently easy to do so (e.g., meeting someone new who does not have a business card, walking by a restaurant and wanting to remember it for later, watching a travel show and wanting to remember a particular bed and breakfast, etc.)

People may be using a wide variety of tools to perform these life transactions but lack a universal, integrated solution to manage them that also allows them to combine their personal, private data and media with helpful information and content (e.g., reviews, store hours, history of a castle, etc.) For example, to set up a dinner event, a user may use their computer to research which restaurant to go to on a venue search tool. Then they may create an on-line calendar entry with the time and location that they email to their friends, who receive the entry using a smart phone. Then, everyone has to get directions to that place. The group may have a great wine at dinner that they want to remember for later (an example of a Moment), and after the event, they want to read what people may have tweeted about the event. To accomplish all this, they have to switch amongst different services and perhaps different devices.

Most systems that people are using today have database and transactions that are usually focused on only one or at most two of the following: the user's past, present or future. Social networking systems are good at communicating where people currently are and what they might be doing, but the data is not stored and organized in a manner that is easy to access for utility (e.g., recall, sharing, discovery, reliving) at a later point in time.

Systems such as Microsoft Outlook™, Blackberry™, Google Calendar™ and other Personal Information Management (PIM) Tools are good at providing a user a secure and private way to organize contacts, events and to-do's, but this private data cannot be easily linked to social transactions. Likewise most of the established PIM protocols have limited ability to geo-encode the data or link it to external data records. Location-based systems let people share where they are, but their data cannot be linked to personal events that are scheduled in the users' calendaring systems or other event systems. Social networks are useful for creating large group and public events but cannot manage personal or private events. So, today consumers use 1) Facebook™ and Twitter™ to share with others their current activities, 2) private Contact and Calendar Tools (iPhone™, Blackberry™, Outlook™) to manage their private data about people, places, to-do's, and events, 3) a variety of online and offline tools to capture their thoughts and life experiences and 4) third party Internet services or tangible products like Yelp™, TripAdvisor™, Moviefone™, or Frommer's™ tour books for finding informational content about places and events they may want to go or attend in the future.

Most of a consumer's information (events, places, people, and moments) is not recorded in a manner that can be data mined effectively. Large companies have the ability to track our web history, product use, and location in order to sell products and services to consumers. Currently, however, consumers do not have digital tools to mine their personal data where such mining which would offer them a multitude of benefits, including gaining insight into their own behavior.

BRIEF SUMMARY OF THE INVENTION

A system and a method are presented for providing a data schema for managing people's important relationships to other people and businesses, past-present-future plans and events, places, activities, memorable life moments and any information about anything that exists or occurred in the earth's time-space reality, as well as a set of Internet services and transactions that allow people to make plans for the future, discover what to do and where to go for their present and future, discover content and commercial offerings for places in which they are or may be interested, and let them organize, share, recall and relive their history in useful and powerful ways.

The solution is henceforth referred to as "myPlanit"™. The myPlanit™ core components include the myPlanit™ central database (mpdb 102), the myPlanit™ web service (mpService) and the myPlanit™ User client application (mpClient 108). Additional services and integrations of the myPlanit™ include venue database services, event database services, geocoder and mapping services, social networking services, a directions service, calendaring and/or contact management tools and services, commercial offering services, and other data services. The myPlanit™ core components and additional services and integrations are described in further detail below.

BRIEF DESCRIPTION OF THE DRAWINGS

The present disclosure will be understood more fully from the detailed description given below and from the accompanying drawings of various embodiments of the disclosure.

DETAILED DESCRIPTION

A system and method for providing a data schema for managing people's important relationships to other people and businesses, past-present-future plans and events, places, activities, and memorable life moments are described. As used herein, the myPlanit™ data schema may include, but is not limited to, a data structure which enables a user to mine his or her personal data. Advantageously, the myPlanit™ data schema provides, for example, valuable insight into a person's own behavior.

Figure 1:
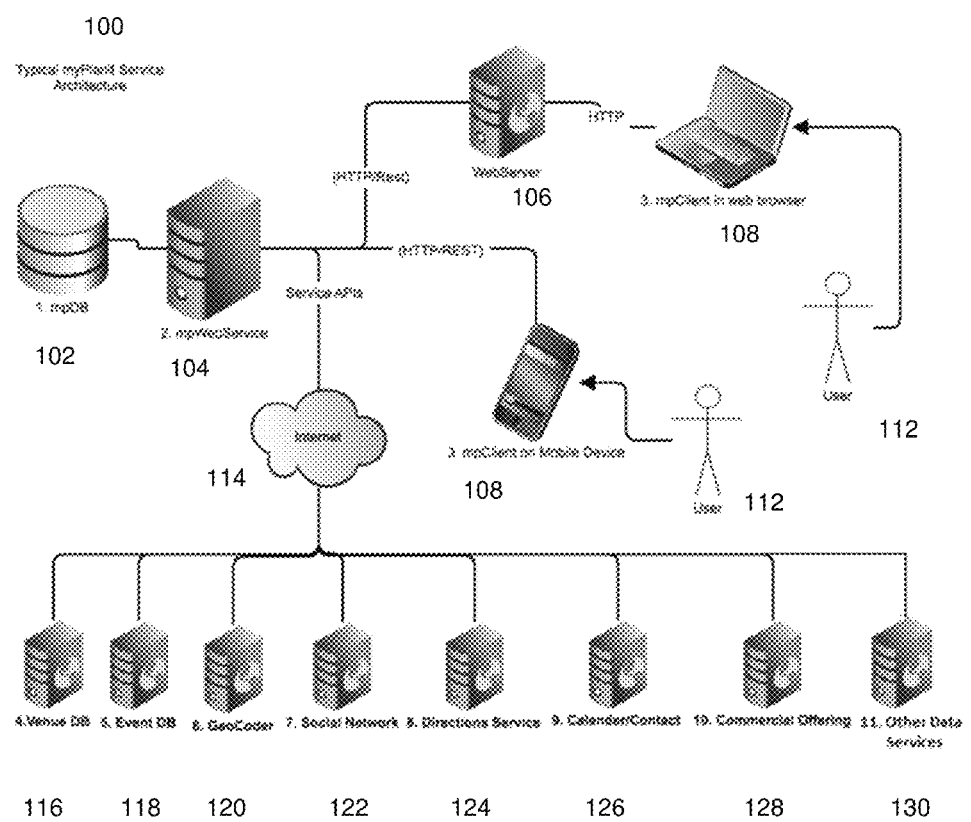
FIG. 1 illustrates an exemplary system architecture, in accordance with one embodiment of the present disclosure.

FIG. 1 illustrates an exemplary system architecture 100 for myPlanit™, in accordance with one embodiment of the present disclosure. System 100 includes a depiction of the myPlanit™ core components, which include the myPlanit™ central database (mpDB 102), the myPlanit™ web service (mpService) 104; and the myPlanit™ user client application (mpClient 108) 108.

In an embodiment, the myPlanit™ central database 102 (also referred to as "mpDB 102") is a central database that stores all of a user's 112 information. It can record, sort and organize large amounts of both private and public information such as calendar Events, People, Places, Tags. As used herein, the term "Tags" or "Tag" includes, but is not limited to, a collection of data elements, such as people (e.g., "Friends"), Events ("Work Meetings"), Moments ("Soccer Goals"), Places ("Fishing Holes"), and/or life Moments. As used herein, the term "Moment" includes, but is not limited to, a record of any experience, such as, for example, a recorded thought, a mood, an activity (e.g., "workout"), a thing (e.g., "wine"), an event (e.g., "Suzy's first goal"), etc.), private notes, memos, and media (photos, video, audio), publicly shared messages and media (e.g., Facebook™ status updates, Twitter™ tweets, Flickr™ photos, etc.). Exemplary embodiments of an mpDB 102 may be an SQL Server (e.g., sqlite, Oracle™, mySQL) or a no-SQL server (e.g., MongoDB™ CouchDB™). The mpDB 102 can be shared and/or replicated across many different physical servers and storage devices.

In an embodiment, the myPlanit™ Web Service (mpService) 104 is a web-enabled service that exposes a set of transactions to clients, web servers and third party APIs. It connects to the mpDB 102 to perform any needed database transactions. It can connect to third party API services (e.g., Facebook™ API, Google Maps™ API, Foursquare™ API). Exemplary embodiments of the mpService 104 are deployed in a web service environment (e.g., Rails™, J2EE/JBoss™, Tomcat™, .NET.) The mpService 104 is deployable in a redundant, resilient and load-sharing method across many different application servers.

In an embodiment, the myPlanit™ "User Client Application" (mpClient 108) 108 may be a client application running on a mobile device (most likely a smartphone such as the iPhone™, Blackberry™, etc.), laptop (e.g., macBook™, Dell™ laptop, etc.) or similar mobile Internet connected device. The mpClient 108 can also run entirely on a web-hosted website and accessed remotely over the Internet via any compatible Internet browser (e.g., Firefox™, Chrome™, etc). The mpClient 108 has its own local database that can cache some or all of the user's 112 information when the mpClient 108 is unable to connect to the mpDB 102 and/or mpService 104. The mpClient 108 is usually running on a mobile device or web browser that can determine the user's 112 location (e.g., via GPS, Wifi, GSM/CDMA, WC3 Geolocation compatible solutions.) When audio, photo, or video recording technology is available on the mobile device (e.g., smartphone camera and microphone) or Internet browser (e.g., Flash, web camera, microphones), the mpClient 108 can invoke audio, photo and/or video recordings.

In an alternate embodiment of the myPlanit™, the mpService 104 and the mpClient 108 are deployed together on the same computing device (e.g., smartphone, laptop, or web-hosted website). The mpDB 102 can be deployed on the same device as the mpClient 108 or it can be deployed on a remote server. FIG. 1 also illustrates additional services and integrations for myPlanit™.

In an embodiment, the term "Venue Database Services" 116 may be databases of businesses and other public venues such as restaurants, stores, city parks, government buildings, or other services, etc. (e.g., Yelp™, Zagat—s™, Google Places™, Foursquare Venues™, Frommer's™ historical place information, Wikipedia, etc.)

In an embodiment, the term "Event Database Services" 118 may be listings of past, present or future events that are completely public or semi-public (just for connected friends on other networks) (e.g., Facebook™ Events, Historical Events™ (war battles), Meetup events, city parades, etc.). These services may or may not be integrated with Venue Database Services.

In an embodiment, the term "Geocoder and Mapping Services" 120 may take a partial or complete address or street corner and determine its GPS Value (i.e., latitude and longitude.) It may also give mathematical weights for how accurate a potential result may be. It may return multiple possible values for a given input and include a numerical estimate of each value's correctness. It may offer "corrections" for a given street address. The Geocoder Service can also take a given GPS Value and determine the closest usable street address for that value. A Mapping Service can respond to requests to generate a detailed map of a given area of the world. Clients can request to retrieve a map (or set of map tiles) that can include details such as streets, roads, bodies of water, parks, businesses, political boundaries, satellite imagery, etc. Either service might be embedded in a device such as an iPhone™, a laptop or any other mobile device. Either service can be deployed as a standalone service running in a process (similar to the mpService 104 above), or can be remotely accessed via a third party web service protocol (e.g., Google Maps™ API, Bing Maps™ API.)

In an embodiment, the term "Social Networking Services" 122 may include the following features: a user account (the user's account on this service) and an API that allows the mpService 104 and/or mpClient 108 to access to the user's 112 private and public data (e.g., Twitter™, Facebook™, Foursquare™ Flickr™, Google Picasaweb™, Google Buzz™ Orkut™, etc.) It also provides access to the information and data streams of other people ("friends", connected contacts, etc. and any other person who makes their data public to that Social Networking Service). In an embodiment, a Social Networking Service provides a database of friends or other people, a way to send and receive digital media, such as private or public messages, status updates, tweets, photos, videos, audio files, URL links to other websites, comments, check-ins, and other social networking transactions.

In an embodiment, the term "Directions Service" 124 may be a service that can take two locations and generate a list of directions on how to travel between these places (e.g., the directions feature of Google Maps™, Mapquest™.)

In an embodiment the terms "Calendaring" and or "Contact Management Tools and Services" 126 may be types of calendar tools such as Google Calendar/Contacts™ Outlook™, Blackberry Calendar/Contacts™, iPhone™ calendar, Caldav/CardDav™ compatible services, iCal™ feeds.

In an embodiment, the term "Commercial Offering Services" 128 may be services that manage advertisements, offerings, coupons, deals, special invitations and other types of commercial offerings. A Commercial Offering Service can generate a list of potential commercial offerings targeted to an individual, specific user or a set of users based on different criteria such as location, users' 112 history on the myPlanit™ service, users' 112 demographic information, users' 112 behavioral data, myPlanit™ predictive algorithms, etc. (e.g., Shopkick™, adMob™, Apple's iAd™, Groupon™, Adility™.)

In an embodiment, the term "Other Data Services" 130 may be other data that relates to the physical world and therefore has time and place metadata along with other contextual information/content (e.g., real estate listings, historical battles, film locations for popular movies, package deliveries, vehicle tracking, real time public transportation tracking/routes, etc.)

Embodiments of the myPlanit™ data schema are described henceforth.

Personal Information Records.

In an embodiment, the mpClient 108 presents to the user 112 a Personal Information Management system comprised of a set of Records and transactions that relate to those Records. The Records are stored in the mpDB 102 and the transactions are exposed to mpClient 108s 108 via the mpService 104. There are five "Primary Records" (alternatively, "Records") that are in the myPlanit™ data schema as well as a sixth "unstructured" Primary Record to allow for interconnection of different, as of yet unknown, data types. Many of the transactions performed by myPlanit™ relate to transactions on the six Primary Records: Person (People), Place, Event, Tag, Moment and Unstructured Data. In an embodiment, a "Primary Record" may have methods and transactions within the mpService 104. Exemplary methods and transactions include relating to other records; interactions with activities; displaying on a map; displaying in a time format; tagging and categorizing; organizing into lists; searching, sorting, and slicing or creating slices; having a well defined URL; having attached media; and linking to external third party services and databases.

In an embodiment, the Records may be tagged with a geotemporal stamp. For purposes of clarification and not limitation, "Geo-temporal" may mean the combination of both a time value and a location value, where the time value may be known or unknown and past, present or future and the location value may be known or unknown (a location to be determined in the future.)

In an embodiment, the term "Person (people) Record" may represent a human (a "who".) This can be a user's 112 friend, colleague, a celebrity on the street, or someone the user 112 just met. The Record can contain basic contact information for such Person (name, addresses, phone numbers, emails, etc.) A Person Record may also include their user names for various online accounts (e.g., Twitter™, Facebook™, Linkedin™, etc.), personal notes, media (photos, videos, audios) and other details relating to the Person. This is similar to contact records such as Outlook, Google Contacts etc., and is a functional superset of the VCF (vCard) contact record.

In an embodiment, the term "Place Record" (a "where") may represent a specific GPS location (latitude/longitude), a private residence ("Bob's home"), a specific business ("Joe's Java on 7th Ave"), an address, a specific point of interest (a statue, a park bench, a fishing spot in a lake), an area such as a campus, neighborhood or even a city, etc. To the extent possible, GPS Values or regions denoted by GPS Values are assigned, but such values may not be available. A Place Record may also include a description of the Place, personal notes, media (photos, videos, audios), ratings of the Place, reviews of the Place and other details relating to the Place. This field is also a functional superset of the VCF (vCard) data format.

In an embodiment, the term "Event Record" (a "when") may be a Calendar Event. The Event Record may contain a start and end date/time, one or more locations, a description of the invite, the people invited, and other details related to a planned event. This is similar to an event record in Outlook or Google Calendar. An Event Record may also include personal notes, media (photos, videos, audios) and other details relating to the Event. It is a functional superset of the iCalendar Event™ format.

In an embodiment, the term "Tag Record" (a "what") may be a semantic or visual descriptor of a category of people, events, places, moments or anything (feelings, adjectives, etc.) Some examples of tags may be "Wines", "Awesome", "Happy", "Surfing Spots", "To Do's", "migraines", "Friends", etc. A tag record may contain a field for the name/title of the tag, a description of the tag, visual representations of the tag subject, ratings of the tag, and other details relating to the Tag.

In an embodiment, the term "Moment Record" (also a "when" or a "Moment") may be a general free-form record with a Date-Time Value that includes one or more data or media related to that Moment. It includes at least one specific Date-Time Value for when the record was created, even though such creation Date-Time Value may not be displayed to the user 112.

In an embodiment, recorded data or media may include, for example: a time/date stamp of when the Moment Record was created; various time/date stamps of when the information in the Moment Record is Interacted (see below) with, such as when it occurs (either in the past, present or even future) or an, as of yet, undesignated future time for a future To Do; various locations of the Moment (GPS, Street Address) related to the locations of various Interactions of the Moment (ex: where the Moment was created; where the subject matter of the Moment occurs; where a shared Moment was received, etc.); an activity (describing what a user 112 was doing OR experiencing OR is planning to do (for future Moments)); a mood (describing how a person was feeling at this time); any word "tag" or category descriptor; a recorded note or description, whether it be of an experience, a thing, a thought, etc.; a recordation of anything that has happened or exists, will happen or exist or is or will be created in time and/or location. This may be a flexible data object that users 112 can customize with multiple "anything" or Tag fields and calculations on such fields (ex: tracking how many sodas a user 112 drank with a calculation that keeps a running total of the number of ounces of soda consumed at any given interval of time—per hour, day, week, month, year, etc.) If the creation, occurrence, existence, etc. is in the future, the Date-Time Value and Location Value of such thing or event may be unknown at the time of the creation of the Moment Record and updated later, when such values are known.

In an embodiment, recorded data or media may also include, for example: media associated with the Moment (Photo, Video, Audio, Text); links to external web sites/services (e.g., If this Moment has a related tweet or Facebook™ status, the link can point to those sites or this moment can represent a user 112 sending or receiving a URL from another member.); comments made by the user 112 or by the user's 112 friends that are related to this Moment, and Unstructured Data Records. As used herein, the term "Unstructured Data Records" may include unstructured data units such as arbitrary strings of text or other data without a structural definition. Unstructured data units may be used for arbitrary notes and records generated by people or potentially generated by external data sources that cannot be interpreted.

In an exemplary embodiment, relationships can be created with a Relationship Record. As used herein, a "Relationship Record" may store a relationship type and includes links to two or more Primary Records. A relationship type attribute defines the type of relationship (e.g., "located at", "lives at".) Exemplary examples of relationships established between Primary Records may include: an Event Record might have relationships to People such as "Hosted by", "Invited", "Attending", "Attended"; an Event Record may have a "located at" relationship to a Place Record; People Records may have a "live at" or "work at" relationship to Place Records; Moments may have a "happened at" relationship to an Event or Place or a "happened with" relationship to a Person; Tags can have a "linked to" relationship with any or all of a Person, Event, Place or Moment (ex: "Awesome" or "For the Future".).

The data schema is capable of recording new relationship types, defined either by the system or an individual, to solve new problems and create new features (e.g., myPlanit™ defines a new feature to allow people to be "followed". A new relationship type of "is following" is defined, and as User Bob "follows" User Jane, a relationship can be created.)

In an exemplary embodiment, an "Interaction" may be any activity with a Primary Record that a user 112 or other third party does with or to that record, such as create, comment on, view, purchase, check in, share, publish, receive, read, run calculations on, delete or any other interaction digitally possible with a Primary Record. There may be a different Date-Time Value (any such value whether referring to the date portion, the time portion or the combined date-time, a "Date-Time Value") and location (any such geographical location or region, a "GPS Value" or "Location Value") pairing for each Interaction related to a Primary Record or related to a record from third party databases.

In an exemplary embodiment, the Primary Records that contain location information (and/or have a relationship to another mappable Primary Record, such as a Place) can be visually displayed on a map. People may be mapped by their related work, home or based on where they were at a particular moment in time.

In an exemplary embodiment, records may be displayed in a time format (Time Slider, calendar format, chronological list, etc.): The Primary Records that contain time information (and/or have a relationship to another calendar record, such as an Event) may be visually displayed on a calendar (month, week, day views), associated along a time slide, or in a chronological list.

In an exemplary embodiment, the Primary Records can be "tagged" with keywords. For example, a user 112 might use a "work" tag to categorize all of the People and Places that relate to his work, or a "personal" tag to categorize all of their friends, family, or favorite bars. Tags may be user created, created automatically by myPlanit™, or imported from third party services. For example: A Place Record that was imported from a Venue DB, might include category tags such as "Cafe" or "Open Late."

In an exemplary embodiment, Records may be organized into Lists. As used herein, a "List" may be a grouping, which may be ordered, of People, Places, Events and/or Moments. A Tag may be used to create Lists of other Primary Records. Lists might be created by a user 112 ("My Wine Moments"). Lists can be imported ("Zagat's top 10 date spots"), created automatically on behalf of the user 112 (e.g., "Your People with Facebook™ accounts") or created by other myPlanit™ users and published semi-publicly (just to the user's 112 friends) or publicly (for all myPlanit™ users or the entire Internet.). Each List is assigned a unique URL. The URL allows the List to be shared and viewed by users and non-users.

In an exemplary embodiment, Records may be searchable, sortable, "Slices." As used herein, a "Slice or "Slices" may be a temporary object which may be composed of: Primary Records; Relationship Records; Weak Links to a Primary Record or a Relationship Record; sub documents; Slice attributes; and Orderings.

In an embodiment, search results may be represented by Slices. Data can be searched using one or more different types of search criteria. For example: via a search term for matches in name, description, other text fields, etc.; via a specific location or geographical area (find records at or near a specific location GPS location X, find records in a specific city or state, find records near the location of another record.); via a specific Date-Time Value or date-time range; via a tag or category; on a specific List; via any Date-Time Value, Location Value or type of an Interaction; via any other field on a Primary Record (e.g., activity, mood, URL, etc.); via a username.

According to an embodiment of the present invention, search criteria can be inclusive or exclusive using Boolean operators such as "Not, And, Or" to create complex search criteria. Results can be "ordered" by their own criteria, for example: sort by distance of the Location Value of one or more specific Interactions (ex: the location that the Primary Record was added; the location that is the subject matter of the Primary Record (ex: "home address" of a Person), etc.) from location Y; sort by Date-Time Value (ascending/descending) of one or more specific Interactions (ex: the date that the Primary Record was created, the check-in date of the Primary Record, etc.); sort by name/title.

In an exemplary embodiment, Records can be found via their relationships to other records. For example: Find all "Places" that are related to Events, Tags or Moments on a specific day; Find all "People" that have an "attended" relationship with any Events that have a "happened at" relationship to the Place Record "Yankee Stadium" (e.g., find all my friends who ever went to a game at Yankees Stadium.)

In an exemplary embodiment, Records can be found via what Interactions were performed on them and further filtered by additional search criteria (e.g., find all Records that were published to these People during this time period.)

In an exemplary embodiment, Results can also be "grouped" by their related Primary Records (e.g., group by related Place or group by related Person.)

In an exemplary embodiment, Records have a well defined URL: Each Primary Record is given its own retrievable URL on either a web browser or within an mpClient 108. The URL can be used to share the Primary Record with other users. The URL can be linked to from other sites and shared in emails and on social networks. There may be restrictions on the URL so that it can it can only be accessible to specific users. The URL may be for the user's eyes only (private). It may be restricted so that it is only accessible to specific accounts, third party services, friends, or trusted devices and networks. It can be made available to the entire Internet and even indexed into search engines (e.g., Google™ Bing™, etc.) The data retrieved by the URL may be different depending on who is using it and what data and features they are allowed to perform (similar to Facebook™ Open Graph Protocol.)

In an exemplary embodiment, Records may have attached media. Each Primary Record can have one or more attachments of Associated Media, which is defined as a text, photo, audio, video or similar media object or file. Any number of notes, photo, audio, video, etc. files can be linked to a Primary Record. Each Associated Media can have its own set of privacy controls. So while the Primary Record may be marked as public, each piece of Associated Media can have its own level of privacy (e.g., a user can make a private text note about a Person, and the note would not be included in any shared view of the Person Record.)

In an exemplary embodiment, Records may be linked to external third party services and databases. Many records may be synced, imported and/or exported to and from social networks, third party services and databases. Each Primary Record can maintain multiple links that point to related records in these external databases. For example: A Place Record may link to a Foursquare Venue™ record, a Facebook™ Places record, a record on Google Places™, and a link to their Blackberry Contact DB.

In addition to these Primary Records, the mpService 104 provides other or additional methods to store and retrieve other data such as: the user's 112 personal information: Name, Address, Age, Sex, and various other demographic, interest, and professional information; the user's 112 password and email address; a list of accounts this user 112 has on third party Social Networking Services that are integrated with myPlanit™ (e.g., Facebook™, Twitter™, Foursquare™.); a list of accounts this user 112 has on other data services, such as Gmail/Google Calendar™, Blackberry Contacts/Calendar™, Yahoo™ AOL™, etc.; any security information that mpService 104 needs may need to connect to the user's 112 external data services or Social Networking services.

In an exemplary embodiment, each Primary Record may represent a record in the mpDB 102, or it may be an imported Primary Record from a third party database (i.e., a record from a third party database that is converted into a Primary Record.)

In an exemplary embodiment, the Relationship Records may point to Primary Records that exist within the Slice or outside of the Slice in another part of the mpDB 102 or third party database.

In an exemplary embodiment, as used herein, a "Weak Link" may be a pointer to either a Primary Record or a Relationship Record in the mpDB 102 or a third party database. A Weak Link allows for "lazy" retrieval of large sets of data. Weak Links allow information to be linked to the Slice but not extracted until such information is required by the operations being performed. For example, the mpClient 108 may need to extract a large List of Places and display the List on a Map. The Slice may only include basic details for each Place (location, name, etc.) Later, the user 112 may click on a Place and want to see more details such as a photo, ratings, etc. The requested details can be dynamically retrieved using the Slice's Weak Links. This prevents the myPlanit™ system from having to extract every potential piece of detail about a Primary Record since the user 112 may only want to view detailed information for only a few Places in the List.

In an exemplary embodiment, a sub document may be a piece of information that may be attached to any of the Primary Records or Relationship Records. These sub documents add extra information to Primary Records or Relationship Records (e.g., for each Place Record in a Slice, a sub document may be generated that includes the Place's recent Foursquare or Facebook™ check-in information.)

In an exemplary embodiment, Slice attribute may be a key-value pair that identifies basic information about the Slice (e.g., when the Slice was created, what processes created the Slice, why the Slice was created.) A Slice may have privacy control or terms-of-service attributes attached to it or other attributes that may control what functions can be performed on or with the Slice.

In an exemplary embodiment, a Slice may contain an "Ordering" so that Primary Records in the Slice can be sorted in different orders (e.g., from smallest to biggest, oldest to newest, best to worst). For example: Order of Places by Frequency of Visits; Order of Moments by Time or Mood; Order of Tags by closest in geographical proximity; or Order of Events by Most Expensive. Items in an Ordering may be given numbered labels (1, 2, 3) or lettered labels (A, B, C). Not all Primary Records in a Slice need to be in an Ordering. Multiple Orderings can be attached to the same Slice showing different potential ways to organize and display the information.

In an exemplary embodiment, a Slice can be formatted into a single complex object format such as JSON or XML so that it can be easily stored, transmitted or manipulated by a variety of systems and processes.

In an exemplary embodiment, a Slice can be created by a number of means such as: a query against one or more databases; automated processes such as a recommendations engine or as computed based on a trending report; or by importing data from an external DB or website.

In an exemplary embodiment, the mpService 104 may dynamically import all of a person's Foursquare™ Check-ins into a temporary "Slice" object so it can then be displayed on a map next to another person's private history. The Foursquare™ user may not have an existing myPlanit™ account nor any permanent data stored within the mpDB 102. Likewise, the Terms of Service may prevent myPlanit™ from storing this data in a user's 112 mpDB 102 account.

In an exemplary embodiment, a Slice may be populated with data in a variety of ways. Two such ways are by using a List Record and an Auto-List.

In an exemplary embodiment, the mpDB 102 may store the contents of a List in a List Record. The List Record may contain a list of Weak Links. Each of these Weak Links points to a Primary Record and is created when that Primary Record is added to the List Record. The List's latest contents are retrieved by fetching the record pointed to by each Weak Link.

In an exemplary embodiment, an Auto-List may be a set of Slice Creation Criteria (defined below) that can be stored in the mpDB 102 as a named "Auto-List".

In an exemplary embodiment, the mpClient 108 can be designed as an application running on a computing device such as a smartphone, computer, laptop, tablet (e.g., iPad™), mobile device, GPS device, wristwatch, automobile appliance, specialized sensor devices tied to such a person (such as a blood pressure monitor, a Nike™+ device, etc.); specialized sensor devices tied to multiple types of objects, such as a home or business alarm and monitoring systems, perimeter camera systems, or any other digitally enabled device etc. The mpClient 108 can also be designed as a web browser application that can run in any compatible web browser (e.g., Safari™, Firefox™, Chrome™.)

In an exemplary embodiment, an mpClient 108 may provide a user 112 with access to a set of data that belongs solely to the user 112. A user 112 can perform a number of basic transactions with the mpClient 108 on his personal set of data. He can create new Primary Records. He can view, edit and delete existing Primary Records. He can share Primary Records and Lists with other users by sharing the object's URL. When viewing Primary Records and Lists shared by other users, he can add the shared objects to his private data, thereby creating a new private version of that Primary Record or List. A new URL is generated by the mpService 104 for such new private version of the Primary Record or List. The mpClient 108 can add Primary Records and Lists from third party databases supported by the mpService 104 (e.g., Foursquare™, Facebook™ places) to the user's 112 mpDB 102. When adding existing Primary Records to a user's 112 mpDB 102, the mpService 104 also creates a Relationship Record that creates a "copy of" relationship between the original Primary Record and the new private version of the Primary Record. The user 112 may also add Associated Media to, delete Associated Media from, view Associated Media for, or edit Associated Media of any type.

In an exemplary embodiment, when displaying a Primary Record, the mpClient 108 dynamically may pull in information about the Record that is currently stored on one or more third party databases that are linked to such Primary Record, such as:

In an exemplary embodiment, for a Place Record, for example: contact and location information (e.g., address, phone number, hours open, description, category (cafe, restaurant, gym, grocery store, etc.)); photos of, at or nearby the Place (e.g., Flickr™ Facebook™, Google Places™, etc.); any website links (e.g., the business' home page, a fan page, etc.) Such links can be clickable; a list of upcoming Events at or nearby this Place (e.g., the user's 112 Events, his friends' Events, Events that are on the user's 112 subscribed Lists, or Events found on external Venue or third-party Event Database Services from within myPlanit™.); reviews from content sites (e.g., Yelp™, Zagats™, New York Times™, etc.) and other contextual information (e.g., Frommer's™ historical info, Wikipedia background info, etc.) can be pulled in and displayed.

In an exemplary embodiment, for a Person Record, for example: contact and location information (e.g., address, phone number, etc.) of the Person's home, work and other addresses; photos of the Person (e.g., Facebook™ photos.); any website links (e.g., a link to their LinkedIn™ profile); list of their recent social network comments (e.g., Facebook™ status messages, Twitter™ tweets.); a list of upcoming Events near their home or office.

In an exemplary embodiment, for an Event Record, for example: any website links to this Event (e.g., band homepage for a concert event).; list of current social network comments about the event (e.g., Facebook™ status messages, Twitter™ tweets for the event.); a list of Places nearby the Event (e.g., restaurants, gas stations, etc.);

The mpClient 108 can display on a Primary Record a user's 112 personal history with this Record (e.g., for a Place Record: all the Events the user 112 has had or is planning to have at a Place, all the People the user 112 knows that have visited or have posted within an Events Database Service that they plan to visit this Place, or any Moments he has recorded there, etc.; for a Person Record: all the Moments and Events a user 112 has had with that Person and events they're planning to have with that Person; all the places the user 112 has been with that Person and is planning to go to with that Person; for an Event Record: notes to remember or preparation activities accomplished for that event; experiences and moments at that Event; and reminders, follow-ups for the future from that Event.)

The mpClient 108 can display on a Primary Record any activity related to the Primary Record from a user's 112 social networks (e.g., the activity of his Facebook™ friends at a Place, any media (photos, videos) that may be related to this location.)

The user 112 can also locate new Places, People, Events or Moments that are "nearby" this Place, Event, Person or Moment (e.g., when viewing a Place Record that is a restaurant, the user 112 wants to find parking garages nearby.)

A user 112 can add a reminder/to-do to any Primary Record. The reminder can automatically trigger a notification that is sent to the user 112 via various methods (e.g., via an Email, SMS, sound or vibration on his mobile device, popup or similar notification strategy). The reminder can be triggered automatically when the mpClient 108 or the mpService 104 detects that the user 112 is at or nearby this Primary Record, whether "nearby" is measured in time or location proximity.

The user 112 can create links amongst one or more Primary Record types, and such linking automatically creates a relationship between the linked Primary Records inside the mpDB 102. Some examples include: a Moment can be linked to the People with whom the Moment was shared; an Event can be linked to the People invited and one or more Places to designate where the Event is occurring; Moments can be linked to an Event or an Event to a Moment, in both cases to designate that the Moment occurred during this Event; and Tags can be linked to Events, Moments, Places and People that have the attribute of that Tag (ex: "Awesome".)

In an exemplary embodiment, a link may have an attribute that defines the relationship between two Primary Records (e.g., Person, "lives at", Place; Person, "friends", Person; Event, "occurs at," Place.) This relationship attribute may be determined by the mpClient 108 (e.g., "home address field") or the user 112.

When viewing the details of a Primary Record, the mpClient 108 may display one or more other Primary Records that are related to such first Primary Record (e.g., an Event Record may also display a list of People Records (relationship: "Invited" or "Attended" such Event.)) The mpClient 108 may also automatically pull in the latest and "most relevant" other data related to a Primary Record (e.g., "Most Recent Events You've Attended with [this Person]", "Your Shared Moments in the Last Month", "Places You've Both Visited" (whether together or not.))

In an exemplary embodiment, the mpClient 108 can display the data created by person P and stored either in the mpDB 102 or a third party database that is shared with the user 112 on the Person Record of person P (e.g., person P's Tweets, Facebook™ statuses, photos shared on any photo sharing service, etc.)

For any Person Record, the mpClient 108 can automatically retrieve data associated with that person that is either currently stored in myPlanit™ or a third party database and shared with the user 112 (e.g., a person lists his phone number, address, email and other contact information on LinkedIn™ or Facebook™ and is friends with the user 112 on such service) or is publicly available.

In an exemplary embodiment, a myPlanit™ Event invitation can include additional details, such as the following: a text description of the Event including the following standard details: description, location, invitees, and start and stop times, etc.; one or more photos associated with the Event; a URL pointing to an mpClient 108 shows an invitee the latest details about the Event; one or more URLs, each pointing to an mpClient 108 that allows the invitee to accept, tentatively accept, or decline the invitation; a vCard or iCal (or similar file format) attachment. This attachment can be added to the invitee's third party calendar application.

For notification platforms that do not support the ability to display everything defined above (e.g., Twitter™, SMS), the notification may simply include a URL that routes the invitee to a version of the mpClient 108. When clicked, the mpClient 108 may automatically display the elements defined or invite the invitee to join myPlanit™.

Sending an Event Invitation: When the user 112 creates or updates an Event, all of the invitees may be notified about the details of the Event. Invitees can be notified via various messaging services, including Email, SMS, Twitter™, Facebook™ or a myPlanit™ notification service. Invitees may be notified using an Exchange compatible meeting request format.

In an exemplary embodiment, the invitee can click on any embedded URL to retrieve more detail or accept, decline, or tentatively accept the Event invitation. When the invitee clicks a URL, he is routed to an mpClient 108. The mpClient 108 may display the following:

All of the current and latest details including any changes that were made since the invitation were sent, such as the Event being canceled or moved to a new time and place.

Display the list of people that accepted, declined, or tentatively accepted. If any of the people on this list are linked to this invitee via a related record in his mpDB 102 or one of the invitee's third party social networks, the mpClient 108 highlights these people (e.g., placed first in the list of invitees, graphic next to their name, their name a special color, etc.)

The mpClient 108 may display one or more Event operations to an invitee. Examples of Event operations include: "Download Event"—when selected by the invitee, the mpClient 108 downloads a vCard, iCal, or similar Event format file so that the invitee can add the Event to his third party calendar application; "Accept"—when selected by the invitee, the mpClient 108 may: send a notification back to the original Event creator of the invitee's acceptance; modify the Event creator's Event Record to show that the invitee has accepted the invitation; automatically add the Event to the invitee's mpDB 102 or if the invitee is not a myPlanit™ user, they may be prompted to join myPlanit™ so that they can add the Event to their newly created myPlanit™ account; and automatically add the Event's Place Record to the invitee's mpDB 102, if it is not already present in the invitee's mpDB 102; "Decline"-when selected by the invitee, the mpClient 108 may: if the invitee chooses or automatically, send a notification back to the original Event creator of the invitee's decline; modify the Event creator's Event Record to show that the invitee has declined the invitation.

Additional examples of Event operations include: "Tentatively Accept/Maybe"—when selected by the invitee, the mpClient 108 sends a notification back to the original Event creator of the invitee's tentative acceptance and modifies the Event creator's Event Record to show that the invitee has tentatively accepted invitation; "Add Place to myPlanit™"—this command allows the invitee to add any Place attached to the Event to the invitee's mpDB 102. When selected by the invitee, the mpClient 108 adds a new Place Record to the invitee's mpDB 102 or if the invitee is not a myPlanit™ user, they may be prompted to join myPlanit™ so that they can add the Place to their newly created myPlanit™ account; "Add Person to myPlanit™"—this command allows the invitee to add any Person attached to the Event to the invitee's mpDB 102. When selected by the invitee, the mpClient 108 creates a new Person Record or update an existing Person Record in the invitee's mpDB 102 for each selected Person; "Get Directions"—this command allows the invitee to get directions to the Event's location. The mpClient 108 may route the user 112 to an external Directions Service; "See More Detail"—this command allows the invitee to see more information about any related Primary Record to the Event. When selected by the invitee, the mpClient 108 displays more details for any such selected Record.

In an embodiment, for commands that require a user account, the invitee may be required to login to their existing account or to create a new myPlanit™ account. The mpClient 108 automatically initiates the requested command above after the invitee has completed the login operation.

In an embodiment, the mpClient 108 allows a user 112 to create Moment Records. Moments can be used to record anything: any experience, or any concept, for example, such as a user's 112 activities, thoughts, life experiences, things they saw, or a user's 112 intent to perform some activity or life experience in the future. Moments may have the time/date stamp of when the Moment Record was created and may have a time/date stamp of when the information in the Moment Record occurred or occurs (either in the past, present or even future) or an entry/reference that it occurs at some, as of yet, undesignated future time/date. The Moment Record may also contain the location information related to the occurrence of the Moment if it is known (or contain an entry or reference to an unknown future location). Users 112 can create their own Moments. Devices and/or services that can track the user's 112 actions, behaviors, and location can automatically create Moments. Methods of generating Moments include using sensors and devices such as GPS devices, Wifi technology, cell phone location tracking devices or systems, automobile tracking devices or systems, SMS/MMS messaging systems, security systems (detecting entering or exiting buildings, garage door openings), face recognition systems or other body part recognition systems (e.g., fingerprints), RFID enabled devices, Near Field Communication (NFC) enabled devices, or any other device that may be able to detect the user's 112 approximate location at a specific time. Moments may be imported from other third party services, such as the following examples: Facebook™, Twitter™, Foursquare™, Gmail™, Google Latitude™ Google Buzz™, Flickr™, Tumblr™, Wordpress™, AIM™, Google Talk™, blog sites, instant message services, status messages, wall posts, email and other online user transactions. The user's 112 financial transactions may be imported as Moments from the user's 112 financial services, such as the user's 112 history of activity at a bank, ATM usage, credit card transactions, debit card transactions, PayPal™ activity, Square™ (squareup.com) activity, or financial transactions and other activity with various service providers such as airlines, hotels, car rentals, and restaurants.

In an embodiment, the mpClient 108 has several methods of displaying Moments, such as: a method of displaying Moments on a Map; a method of displaying the Moments tagged to a Place when displaying the Place Record; a method of displaying the Moments tagged to an Event when displaying the Event Record; a method of displaying the Moments tagged to a Person when displaying the Person Record; a method of searching for keywords, categories, tags or other text in Moments; a method of displaying Moments on a calendar or list view by various Interaction dates related to the Moment; method of grouping and displaying Moments organized by any tag (e.g., an activity, mood, category, thing, etc.), day, week, month, Place or location, Event, Person, relationship type, or any other Moment attribute.

In an embodiment, the exemplary method enables a user 112 to create a Moment, and to tag it with one or more different pieces of information: date, time, activity, experience, mood, tag, category, location (such as a venue name, Place Record, GPS Value or address), Event, one or more People, notes, photos, etc. For example, the user 112 may want to share the Moment with friends via a social network like Twitter™ or Facebook™ or have the Moment remain private. Manually entering each one of these fields can slow the user 112 down so that the time and effort to create the Moment may result in the user 112 deciding to just record less data. A user 112 may want to group Moments into Events (e.g., a lot of photos at a family picnic, however, the user 112 did not enter an Event on his calendar for "Family Picnic.) If the user 112 already has an Event in his mpDB 102, then a Moment can be tagged to an Event Record when it is created, but the user 112 may also want to create Moments at Places where he has not previously created an Event. He may want a quick and easy way to create "unscheduled" Events in his mpDB 102.

The exemplary methods involve a Moment Template, Ranked Attribute Candidates, and Auto-Events.

In an embodiment, a "Moment Template" may be a set of instructions to build a Moment based on a set of default values for one or more of the various attributes of a Moment, such as activity, mood, tag, time, Place, Event, People, etc. The Moment Template may also include control options for whether a Moment is shared to other third party networks and instructions on what level of privacy is set for this Moment. The Moment Template may include instructions on which values are displayed or hidden when creating a Moment and which fields may be available to edit. Moment Templates may be created by the user 112 and stored in his mpDB 102. Moment Templates may have criteria that determine when the mpClient 108 can utilize a specific Moment Template, such as when it may be displayed to the user 112 (e.g., only displaying a specific Moment Template if the user 112 is at a certain location or if it is a certain time of the day.) A Media Moment Template is a Moment Template that invokes the audio recorder, photo camera, video recorder or any other method of capturing media before or after asking the user 112 to add more Moment details. The user 112 may select a name for the Moment Template and how the Moment Template might be presented (e.g., an icon or image related to the Moment Template.)

The exemplary method also involves Ranked Attribute Candidates. As used herein, the term Ranked Attribute Candidates includes, but is not limited to, for each attribute on a Moment, the mpClient 108 creates a candidate list of likely potential values for such attribute and rank the candidates based on various factors such as the user's 112 history, the user's 112 location, the current time, and other users' 112 histories (e.g., when the user tags that he is at the gym on a Moment, the mpClient 108 creates a list of potential "activities" such as "working out," "exercising", "yoga", etc.)

The exemplary method also involves Auto-Events. As used herein, the term Auto-Events includes, but is not limited to a scheduled Event is a Primary Record for a planned or upcoming Event whose values have been entered by a human prior to the occurrence of the Event (e.g., Event start and stop times, title of Event, place of Event, etc.) An Auto-Event is used to record and organize unscheduled events, for example by recognizing multiple Moments occurring near each other in place and/or time that have not been tagged to a scheduled Event. The mpClient 108 can display Auto-Events differently from scheduled Events (such as using two different virtual calendars (one for scheduled Events and one for Auto-Events) or displaying them differently on the same calendar.)

Figure 2:
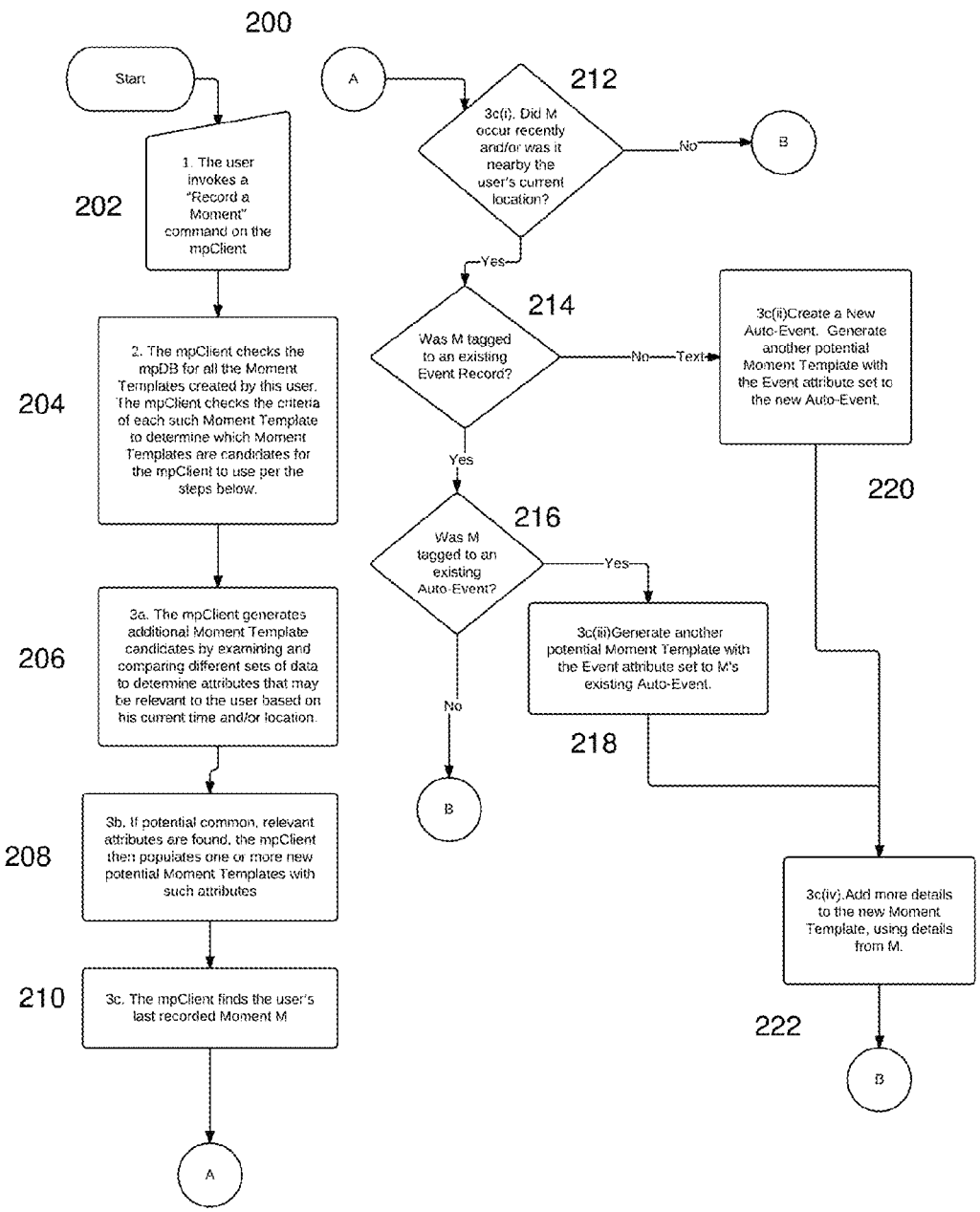
FIG. 2 illustrates an exemplary method for auto populating Moment attributes via moment templates, in accordance with one embodiment of the present disclosure.

FIG. 2 illustrates a method 200 for auto populating Moment attributes via Moment templates, according to an embodiment of the present invention.

In block 202, the user 112 invokes a "Stamp It" (or a "Record a Moment") command on the mpClient 108.

In block 204, the mpClient 108 checks the mpDB 102 for all the Moment Templates created by this user 112. The mpClient 108 checks the criteria of each such Moment Template to determine which Moment Templates are candidates for the mpClient 108 to use per the steps below.

In block 206, the mpClient 108 generates additional Moment Template candidates by the following process:

Examining and comparing different sets of data to determine attributes that may be relevant to the user 112 based on his current time and/or location. The following are examples of various data sets that the mpClient 108 may examine and compare to determine such relevancy:

The user's 112 current location and time of day as compared to the user's 112 history stored in the mpDB 102 and/or third party services/databases.

The user's upcoming and/or past Events, Moments and to-dos within a certain time period of the user's current time.

The user's recently recorded Moments and the Moments recently recorded by other users that may have been "tagged" to this user.

Commonly created Moments by other users that were recorded nearby or at Places similar to the user's current location historically, recently or at the same time of day.

In block 208, if potential common, relevant attributes are found, the mpClient 108 then populates one or more new potential Moment Templates with such attributes.

In block 210, the mpClient 108 finds the user's last recorded Moment M.

In block 212, if M did not occur recently and/or was not nearby the user's current location, then no additional Moment Template is created.

In block 214, else if M was not tagged to an existing Event Record, then in block 220 the mpClient 108 generates a potential Moment Template with the Event attribute set to a new Auto-Event. When creating an Auto-Event, the mpClient 108 does the following:

The mpClient 108 creates a blank Auto-Event Record.

The Auto-Event is tagged to the previously recorded Moment.

The mpClient 108 may populate the Auto-Event's title and description using one or more of the previous Moment attributes such as Place, activity, Person, Tags, note, and description (e.g., "Drinking at Moe's Pub with Marge.")

In block 216, else if M was tagged to an Auto-Event, then in block 218 the mpClient 108 generates a potential Moment Template with the Event attribute set to the previous Auto-Event.

In block 222, additional attributes for Moment Templates created in blocks 212 and 214 above can also be assigned from either M's attribute values (e.g., Place, activity, tag, People, etc.) or common, relevant attributes found in block 206.

Figure 3:
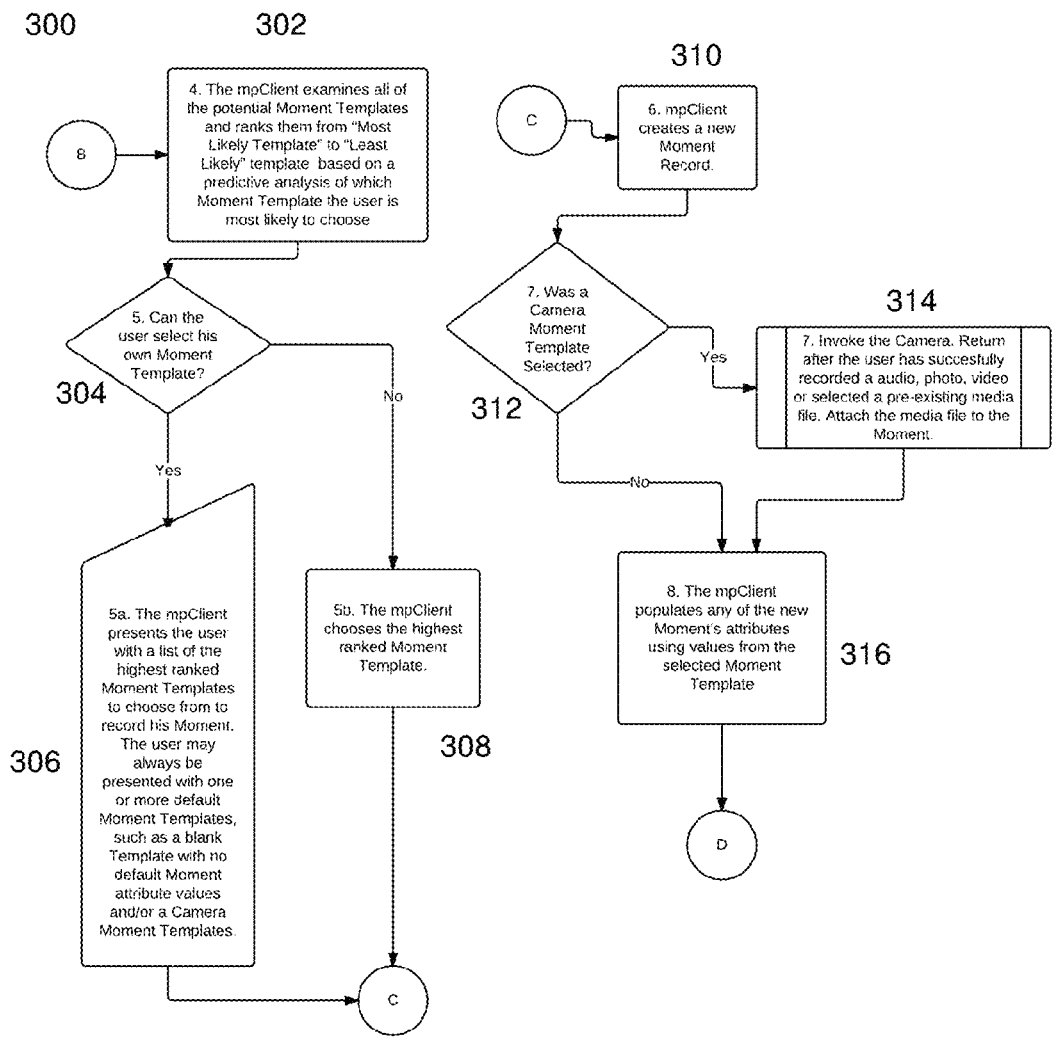
FIG. 3 is an exemplary method for auto populating Moment attributes via moment templates, in accordance with an embodiment of the present disclosure.

FIG. 3 illustrates a method 300 for auto populating Moment attributes via Moment Templates, according to an embodiment of the present invention.

In block 302, the mpClient 108 examines all of the potential Moment Templates from blocks 204 and 206 above and performs a predictive analysis for each one. The predictive analysis may generate a value that indicates how likely the user would select this Moment Template, based on examining various data, for example, the user's previous myPlanit™ history, current location, recorded Moments, scheduled Events, current time of day, current day of the week, and scheduled to-do's. A mathematician or statistician that is one of ordinary skill in the art can recognize that a number of statistical methods can be used to generate or predict such value. The mpClient 108 then ranks all the Moment Templates from "Most Likely Template" to "Least Likely". The mpClient 108 may remove any Moment Template whose generated value is determined to be too low.

In block 304, if the mpClient 108 supports a method for the user to select Moment Templates, then allow the user to select a Moment Template. Otherwise the mpClient 108 may automatically select a Moment Template.

In block 306, for user selection of a Moment Template:

The mpClient 108 presents the user with a list of the highest ranked Moment Templates from which to choose. The user may be presented with one or more default Moment Templates, such as a blank Template with no default Moment attribute values and/or a Media Moment Template. The user selects one of the displayed Moment Templates. The following is a list of example Moment Template options that the mpClient 108 might display to the user: Record a private Moment with no default values already populated (blank Moment Record); Record a shared (e.g., share out to Facebook™) Moment (a Moment Template with the shared attribute set to "yes"); Take a Picture (Media Moment Template); Record another Moment at Jane's Birthday party (a Moment Template was generated as a result of a recent Moment already being tagged to this Event); take a picture at Jane's Birthday party (Media Moment Template); "Workout" populated as the activity attribute when at Bob's Gym (this is a nearby Place and the user's most frequent activity at this Place); and Record a Moment at Business Meeting (because the user has this Event scheduled today).

In block 308, automatic Moment Template Selection: The highest ranked Moment Template is selected by the mpClient 108.

In block 310, the mpClient 108 creates a new Moment Record.

In block 312, if a Media Moment Template is chosen, then the mpClient 108 invokes a method to record media (photo, video, audio, etc.) on the device before creating the Moment Record.

In block 314, once the user has recorded an audio, photo or video or selected an existing audio, photo or video, the mpClient 108 attaches the media to the new Moment Record.

In block 316, the mpClient 108 populates any of the new Moment's attributes using values from the selected Moment Template.

The mpClient 108 presents a method for the user to edit and save the new Moment Record.

Populating Moment Attribute Values and Saving a Moment.

Figure 4:
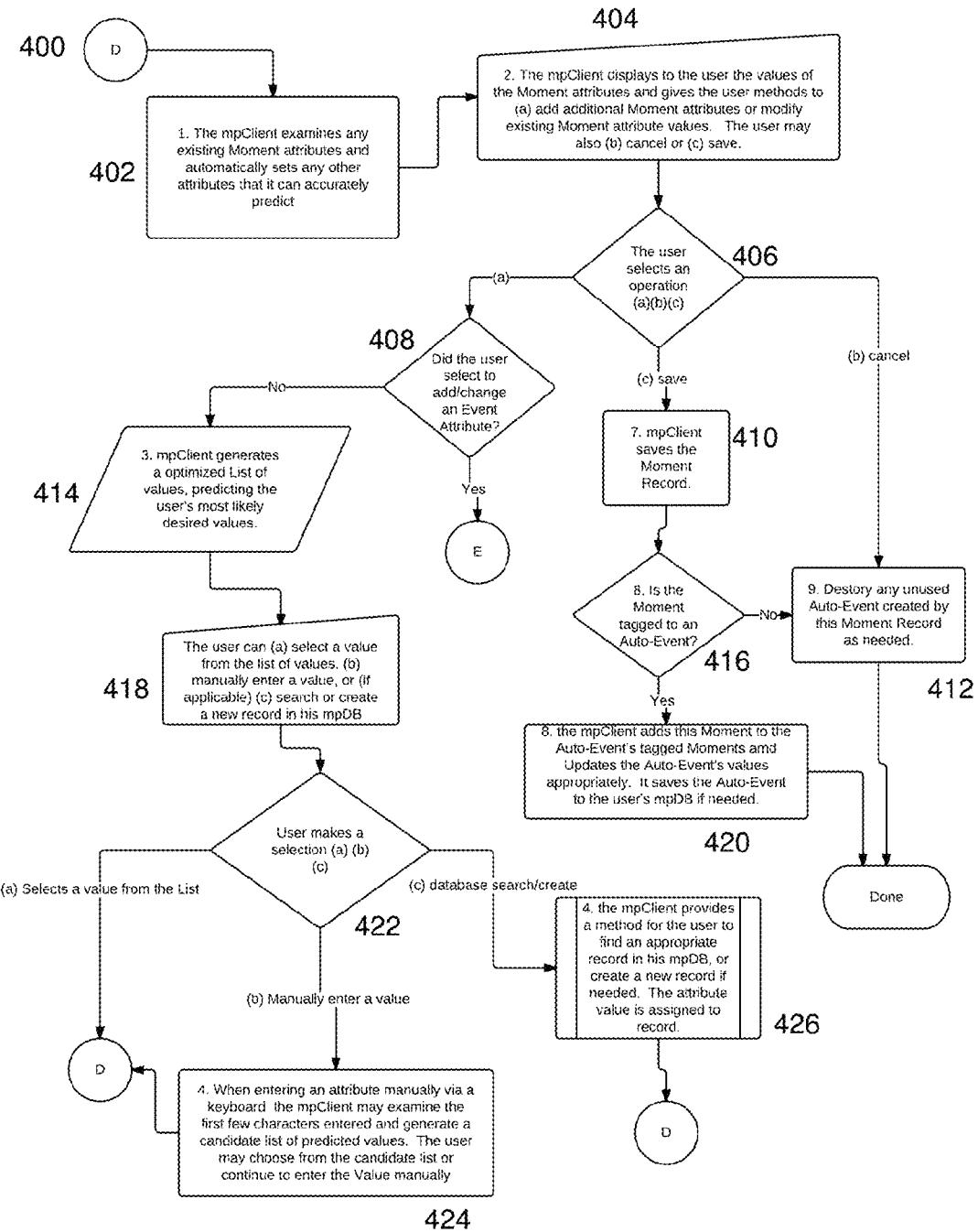
FIG. 4 illustrates a method for populating Moment attribute values and saving a moment, according to an embodiment of the present invention.
Figure 5:
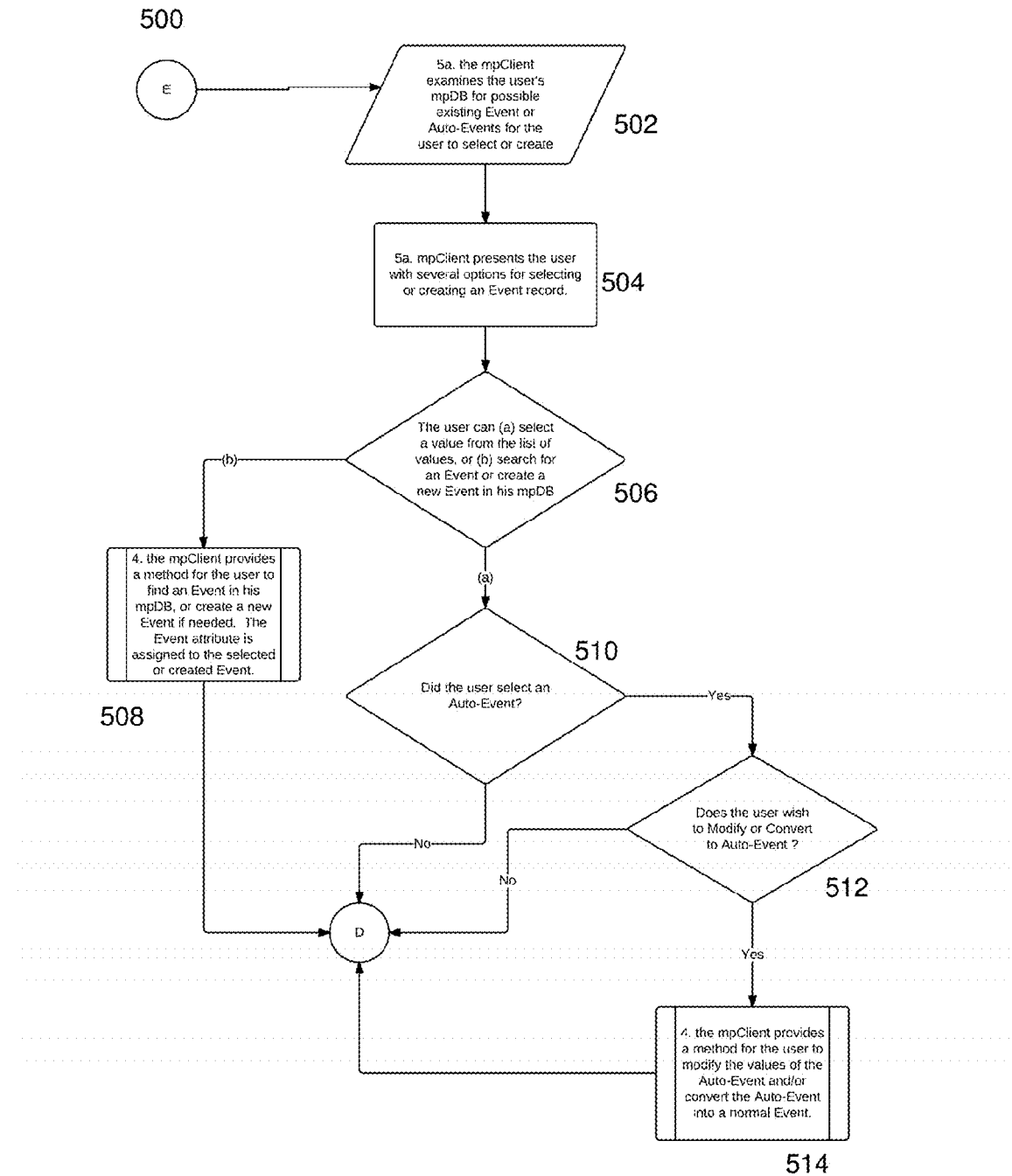
FIG. 5 illustrates a method for populating Moment attribute values and saving a moment, according to an embodiment of the present invention.

FIGS. 4 and 5 illustrate methods 400 and 500 for populating Moment attribute values and saving a Moment, according to an embodiment of the present invention.

In block 402, the mpClient 108 examines any existing Moment attributes and automatically sets any other attributes that it can accurately predict. For example, if the user selects a Place of "Gym", the tag/"what" field may automatically be populated with the tag of "Workout"; or if the user includes a reference to a Person, Place or Event in a description field, the mpClient 108 may automatically tag this Moment to the referenced Primary Record.

In blocks 404 and 502, the mpClient 108 displays to the user the values of the Moment attributes that were populated per method 200, and in block 406 gives the user methods to add additional Moment attributes or modify existing Moment attribute values.

In block 408, if the user 112 decides to add or modify a Moment attribute's value (whether or not the value was predicted via Part 1).

In block 414, the mpClient 108 may use the user's history, current location, time of day, or other attributes to present an "optimized" list of values for such attribute.

In blocks 418 and 422, the user may select a value from the list or manually enter a new value. Once the user has entered a new value, then the logic returns back to block 402 to see if any other attributes can now be automatically determined. For example, if the user wants to tag a Place Record to the Moment, then the mpClient 108 may display the Places the user is most likely to select (e.g., Places nearby at which the user has previously recorded Moments.) or if the user wants to add a tag descriptor (e.g., a mood or an activity), the mpClient 108 can determine the user's most frequently used tag selections on the user's Moments previously recorded in the same location, at similar locations and/or recorded at a similar time of day.

If the attribute points to another database record, the user can decide to search that database to find an appropriate value, create a new associated record in that database, and then assign the Moment attribute to point to the found or created record. Once the user has entered a new value, then the logic returns back to block 402.

In block 424, when entering an attribute via a keyboard (e.g., descriptions, Place, Event, People, Tags, etc.), the mpClient 108 may examine the first few characters entered and generate a candidate list of predicted values. This can allow the user to immediately confirm the predicted value without having to type the entire value into the keyboard. The candidate list is based on the user's history, his current location, and the time of day. When entering text into a note or description field, the mpClient 108 can define special characters for different attributes (e.g., "@" for people, "#" for activities, etc.) to optimize the speed and accuracy of the candidate list and to assist in parsing the values into the correct attributes. When a specific character is entered, the candidate list is immediately generated. As the user enters more characters, the predicted candidate list is updated to remove entries that no longer match the characters entered.

In an embodiment, the mpClient 108 may have additional logic that can be invoked when a user adds or modifies an Event attribute.

In block 504, if the user wants to associate an Event Record to a Moment, the mpClient 108 can present the user with several options for selecting or creating an Event Record.

If the user recently recorded a Moment that was tagged to an Event or an Auto-Event, then the previously used Event or Auto-Event is displayed as a candidate. All Events in the user's mpDB 102 that are scheduled to occur within a certain time period of the user's current time and possibly any Events in third party Events Services that are scheduled to occur in either time and/or location proximity to where the user is are shown as Event candidates. Events that are scheduled closer to the current time may be ranked higher than other scheduled Events. If another user tagged this user at an Event, then that Event may be displayed as a candidate to select.

In block 506, the user is given an option to search his entire mpDB 102 and any connected third party Events Services for Events.

In block 508, the user can create a new Event Record in his mpDB 102. If the user recently recorded a Moment and did not tag such Moment to an Event, then an Auto-Event can be created and the user is given the option to select this Auto-Event.

In block 510, f the Moment's is tagged to an Auto-Event, then the user can modify any of the Auto-Event's values (e.g., the title, start/stop times, Place, People, etc.). In block 512, once the user has modified an Auto-Event's attributes, the modified attributes may no longer be automatically updated by mpClient 108.

In block 514, the user can also choose to "convert" an Auto-Event into a scheduled Event. Once the user has modified an attribute, the Auto-Event may be automatically converted into a scheduled Event.

In block 410, the user 112 can select to save or discard the current Moment. If the user 112 chooses to save the current Moment, and in block 416 the Moment's Event attribute is set to an Auto-Event, then in block 420, the mpClient 108 adds this Moment to the Auto-Event's tagged Moments, adds any Person and Place Records that are tagged to any of the Auto-Event's tagged Moments to the Auto-Event. he Auto-Event's start and stop times are adjusted to the earliest and latest Moment Records' Date-Time Values, respectively, and/or updates the Auto-Event title and description using the tagged Moments' attributes such as Place, activity, Person, note, and description (e.g., "Drinking at Moe's Pub with Marge.").

In block 422, if the Auto-Event has not previously been saved, then the Auto-Event is saved to the user's mpDB 102. In block 412, the mpClient 108 destroys any unused Auto-Event created by this method.

In an embodiment, the exemplary method enables the ability to record anything in our physical world ("moments", whether an intangible life experience, an object we come across, an activity we do, a situation that happens to us, a package being shipped etc., whether it has happened in the past or may happen in the future) that are linked to one or more other data records (e.g., Place Records, People Records, Event Records, etc.); 2) the ability to predict and suggest tags and relationships related to the Moment as a user is recording the Moment; 3) the ability to create customized Moment Templates to quickly record Moments that are frequently experienced; and 4) the ability to automatically group and associate related Moments into an Event (i.e., a data structure that has a duration, which may, for example, be characterized by a start time and a stop time, etc.)

The above methods offer multiple benefits. myPlanit™ adapts to a user's behavior so that Moments that the user records frequently become faster to record. The average myPlanit™ Moment records more attributes (i.e., tags and relationships) on their Moments and more Moments since the mpClient 108 allows for automatic or quick population of such attributes, whether automatically generated by the mpClient 108 or manually created by a user. By receiving user confirmation as to myPlanit™'s prediction of Moment attributes, the overall quality of the user's data expands and improves, allowing for a deeper understanding of the user. With the ability to predict and suggest attributes as a Moment is being recorded, a user is less likely to need to manually organize his Moments whether at the time he's recording them or at a later time (e.g., building an "Album" of a vacation later.)

With the more accurate and detailed life history that myPlanit™ enables, the user has many benefits, such as: more potential ways to display and aggregate data; more potential comparisons of data that can be made; and more potential relationships and insights can be made with the data, especially since it contains interconnected Records and may be geo-time indexed.

The myPlanit™ Moment Recorder can be a single "recorder" for private, semi-public (e.g., just my friends), and completely public (viewable by the entire Internet) transactions. The user no longer needs to switch amongst different tools for publishing different types of moments (e.g., Twitter™, Facebook™, and a private diary.)

In an embodiment, the exemplary method enables the user to search, view and organize his Primary Records whereby the mpClient 108 provides a set of Slice operations that provide the user with a set of basic transactions: retrieving one or more Primary Records from the mpDB 102 and/or other related databases, using search criteria; importing records from one or more third party databases into the mpClient 108; displaying the Slice's contents onto the screen; ability to manually organize some of the Slice's contents (its Primary Records) into Lists; ability to define the criteria to automatically organize Primary Records (Auto-Lists); and ability to publish the organized Lists and Auto-Lists to third party services.

Before a Slice can be used, it may need to be queried and imported from one of many data sources. In an embodiment, an mpClient 108 may need to create a more complex Slice that is based on a set of Slice Creation Criteria. As used herein, the term "Slice Creation Criteria" includes, but is not limited to a set of Slice creation instructions. A Client can request a Slice using many different sets of criteria. The mpClient 108 needs to be able to create a Slice from one or more different potential sources and methods:

By retrieving it from a List or an Auto-List; by searching one or more databases for records that match some search criteria (search by attribute values and constraints); by importing records from one or more third party services or data feeds; by filtering another Slice; by searching one or more databases for records that are related to another Slice; or by using two Slices and performing a union, intersection or other set operation on such Slices.

In an embodiment, the mpService 104 defines a syntax and grammar for encoding the Slice Creation Criteria, and the syntax and grammar needs to allow the Client to define one or more of the following Slice Creation Criteria.

In an embodiment, content may be retrieved by using a named List or Auto-List in the mpDB 102. Request to retrieve the contents as either a set of Weak Links or as the latest version of all Primary Records in the List or Auto-List.

The Client may include instructions to only retrieve Primary Records from specified databases causing the remaining content to be returned as Weak Links. The Client may include instructions to retrieve contents by defining a set of search criteria that can retrieve a set of records from the mpDB 102 or one or more other third party databases. Exemplary embodiments may utilize an SQL SELECT or similar database search command.

In an embodiment, content may be retrieved by defining an external URL and a data format type. The URL points to a server or other network resource that returns data published in a compatible proprietary or open standard format (e.g., RSS™, GeoRSS™ KM™ L, XML, JSON, Facebook™ Open Graph™, iCalendar™, vCard™, etc.).

In an embodiment, content may be retrieved by adding a set of filter criteria to other Slice Creation Criteria thereby restricting the Slice's contents. These filters can be used to filter data imported from a third party source.

In an embodiment, content may be retrieved via an initial Slice and a relationship type, each of which is defined by the Client. Instead of sending the initial Slice, the Client may also send a set of Slice Creation Criteria that create the initial Slice. This method examines all of the Relationship Records in the initial Slice, and for each Relationship Record found that matches the defined relationship type, the related Primary Records are retrieved and added to the Slice. The final Slice contents are returned.

In an embodiment, content may be retrieved by defining a set of mathematical set operations on other Slice Creation Criteria (e.g., performing a union, intersection, complement, Cartesian products, or other types of set operations.

Set theory is now a ubiquitous part of mathematics, and can be used as a foundation from which nearly all of mathematics can be derived. The elements or members of a set can be anything: numbers, people, letters of the alphabet, other sets, and so on.

The union of A and B, denoted by A ∪ B, is the set of all things which are members of either A or B. The intersection of A and B, denoted by A∩B, is the set of all things which are members of both A and B. The relative complement of B in A (also called the set-theoretic difference of A and B), denoted by A\B(or A−B), is the set of all elements which are members of A but not members of B. Note that it is valid to "subtract" members of a set that are not in the set, such as removing the element green from the set [1, 2, 3]; doing so has no effect. The Cartesian product of two sets A and B, denoted by A×B is the set of all ordered pairs (a, b) such that a is a member of A and b is a member of B.

Slice Creation Criteria is transmitted to the mpService 104 via an API call. An exemplary embodiment of the mpService 104 is a Web Service API call that is invoked by using an HTTP or HTTPS request to a URL and encodes the criteria using a URI Scheme. All URIs and absolute URI references are formed with a scheme name, followed by a colon character (":"), and the remainder of the URI called (in the outdated RFCs 1738 and 2396, but not the current STD 66/RFC 3986) the scheme-specific part. The syntax and semantics of the scheme-specific part are left largely to the specifications governing individual schemes, subject to certain constraints such as reserved characters and how to "escape" them. Internet standard STD 66 (also RFC 3986) defines the generic syntax to be used in all URI schemes. The scheme name consist of a sequence of characters beginning with a letter and followed by any combination of letters, digits, plus ("+"), period ("."), or hyphen ("-"). The authority part holds an optional user-information part, terminated with "@" (e.g., username:password@); a hostname (e.g., domain name or IP address); and an optional port number, preceded by a colon ":". The path part is a sequence of segments (conceptually similar to directories, though not necessarily representing them) separated by a forward slash ("/"). The query is an optional part, separated by a question mark ("?"), that contains additional identification information that is not hierarchical in nature. The query string syntax is not generically defined, but it is commonly organized as a sequence of <key>=<value> pairs, with the pairs separated by a semicolon or an ampersand. It holds additional identifying information that provides direction to a secondary resource, e.g., a section heading (in an article) identified by the remainder of the URI. When the primary resource is an HTML document, the fragment is often an id attribute of a specific element and web browsers may confirm that this element is visible.

When a Client is required to retrieve a Slice, it sends a request to the mpService 104 that contains Slice Creation Criteria and a requested output format (JSON, XML, etc.)

The mpService 104 may require the Client to perform any appropriate authentication as defined by the network protocol in use (e.g., OAuth 2.0 or similar HTTP based authentication strategy) to confirm that the Client is allowed to perform this operation and is allowed to view and retrieve this data.

The mpService 104 performs any external queries to third party databases, external data feeds (RSS, iCalendar) and/or queries to the mpDB 102 based on the Slice Creation Criteria transmitted by the Client; and creates a Slice using the methods defined in the Slice Creation Criteria above.

If any Slice contents fail to be retrieved (for network, performance, data integrity problems, etc), then the mpService 104 may instead insert into the Slice a Weak Link to the failed item along with a sub-document for the Weak Link that informs the Client of the reason for the failure.

The mpService 104 reviews the created Slice and verifies that the Client and the user account associated with the request can view the contents of the created Slice. Some Primary Records may be completely removed or they may have some of their associated data removed. Removal may be based on one or more various criteria, such as: the privacy settings established by the Primary Record owner, which settings are evaluated to determine if the user account who is issuing the request has permission to view the Slice; the Terms of Service, or like privacy or usage policies, of third party databases used to query the created Slice. Terms of Service constraints may require different filtering logic based on privacy flags stored, the permissions of the requesting user, and/or the purpose and intent for the queried information; and other criteria that may verify what data and/or records a user has permission to view.

If the Slice contents are empty, an appropriate error result may be sent to the Client. Otherwise, the mpService 104 encodes the Slice into the requested output format (usually JSON or XML) and returns it to the Client.

In an embodiment, an mpClient 108 method to request a Slice and perform List and Auto-List operations. The user may query, retrieve and organize his Slice information.

Following is an embodiment of an mpClient 108 method to retrieve a Slice, and to edit Lists and Auto-List contents.

The mpClient 108 provides the user a method for inputting a set of Slice Creation Criteria. The mpClient 108 may allow the user to enter the defined syntax and grammar used by the criteria directly. The mpClient 108 may also provide methods that allow a user to create Slice Creation Criteria using a set of easy-to-use user interface elements (e.g., the user may be able to select a List by name, and the associated Slice Creation Criteria needed to request the List's contents are generated by the mpClient 108 automatically.)

A user inputs a set of Slice Creation Criteria into the mpClient 108 or uses some other equivalent method to define Slice Creation Criteria and requests the mpClient 108 to retrieve the Slice.

The mpClient 108 transmits the Slice Creation Criteria to the mpService; retrieves the contents of the Slice from the mpService; displays an appropriate error message if it is unable to retrieve the Slice; and displays the contents of the retrieved Slice to the user. (See below for methods on displaying a Slice to a user.)

When viewing a Slice with the mpClient 108, the user can perform various commands. For example, a user may request that some or all of the viewed Slice's content be saved to a new List or be saved to an existing List. The mpClient 108 creates a new Slice object "S" that contains Weak Links to the data selected by the user to be saved, and it transmits S to the mpService 104 with the appropriate List modification request. If any of the Slice content is contained on a List, the user may request to delete such content from the List. The user may save the current Slice Creation Criteria as a new Auto-List. A user may update an existing Auto-List's stored Slice Creation Criteria using the Slice Creation Criteria from the Slice currently being viewed by the user In an embodiment, the mpClient 108 exposes a method to the user for defining an Ordering of Primary Records within a List. As used herein, the term "List" includes but is not limited to an object which may have one or more Orderings. As used herein, the term "Ordering" may be associated with search criteria such as "Order by Name" or "Order by Rating." The mpClient 108 exposes a method for the user to create an Ordering for a List. The user 112 may define their own method for Ordering, including which Primary Record in the List is "first, second, third, etc." He may add a numbering label or a lettering label (1, 2, 3,) (A, B, C,), or leave the ordered list of items unlabeled. The user 112 can define a meaning for the Ordering such as "Ordered by favorite" or "Order by highest rated." Some Orderings may be created by the mpClient 108 or the mpService 104 automatically when the List is created or changed. The mpService 104 automatically creates some "default orderings" such as by name, price, rating, distance or other attribute.

In an embodiment, an Initial Set of Map Annotations is computed for a Given Slice's Content. As used herein, the term "Map Annotation" includes but is not limited to a logical object used by the mpClient 108 to display one or more Primary Records to a user. It defines how and where a Primary Record or a set of Primary Records is displayed visually to a user in one or more (i.e., a combination of) visual areas/displays such as on a map, in a textual display, and/or on a calendar, a timeline etc. The Map Annotation may be visually represented by an icon, a pinpoint, a picture, or any other visual depiction. To display a Slice, the mpClient 108 needs a method to parse the current contents of the Slice into a set of one or more Map Annotations which then may be grouped into a single visual Map Annotation so that such single Map Annotation can represent more than one Primary Record in the Slice.

In an embodiment, a set of Map Annotations is computed by the mpClient 108 from a Slice's contents when it is required to display the Slice on a map. Each Map Annotation controls how a specific subset of data contained in a Slice is displayed on a map. A Map Annotation's data contents may contain a set of Primary Records and Relationship Records or it may contain two or more other Map Annotations. When a single Map Annotation's contents contain one or more other Map Annotations or contents thereof, it is referred to as a "Grouped Map Annotation."

In an embodiment, the mpClient 108 can display the contents of a Map Annotation via a number of different views. The possible views include: a Default Icon View, which may utilize an icon, letter, number, picture, photo, drawing or similar visual element (e.g., a pin point, a person shape, a small photo, a frame from a video, or other mechanical or human generated visual media.) It is used to annotate the map with a visual representation of one or more Primary Records (the content of the Map Annotation.); a Selected Icon View, which may define how the Map Annotation Icon View appears when the Map Annotation is "highlighted". The mpClient 108 may highlight some Map Annotations so that they appear different than related elements around them; a Small Window View, which can define how the Map Annotation may appear when selected by the user. This view usually populates a small window with text, HTML and/or small images that appear above the icon. This view contains a name and brief summary of what this Map Annotation represents; a Larger Window View, which may define an even larger text description that may contain a more complex or detailed description of the data (e.g., an HTML document.) but obscures more of the map when displayed and a List Output View, which may define how this Map Annotation's contents are displayed as an item or items in an ordered list.

In an embodiment, the map display logic uses different views at different times. For example, the mpClient 108 may start by showing only the Icon View for each Map Annotation, but then enables the Small Window View after the user selects one of the icons. The mpClient 108 may define even more views than are listed above based on different types of user interface elements, configuration parameters, commands and features it needs to implement for each Map Annotation.

In an embodiment, a Map Annotation includes an attribute that defines an Annotation Type. As used herein, the term "Annotation Type" is associated with determining which logic the Map Annotation uses to display each of the required views and is determined by examining the Map Annotation's contents.

In an embodiment, different strategies can be used to compute a set of Map Annotations. Configuration parameters can define which strategies are used by the mpClient 108 for computing a list of Map Annotations from a Slice's contents.

The types of strategies used includes Map Annotation for each Primary Record. Compute a unique Map Annotation for every visible, unfiltered, Primary Record in a Slice. Each Primary Record is assigned to its own Map Annotation.

In an embodiment another strategy includes Map Annotation for each unique GPS Value. Create one Map Annotation for each unique GPS Value or each unique pair of (GPS Value and Date-Time Value). Each Map Annotation gets a list of Primary Records that have matching GPS Values or pairs of GPS Values and Date-Time Values.

Figure 6:
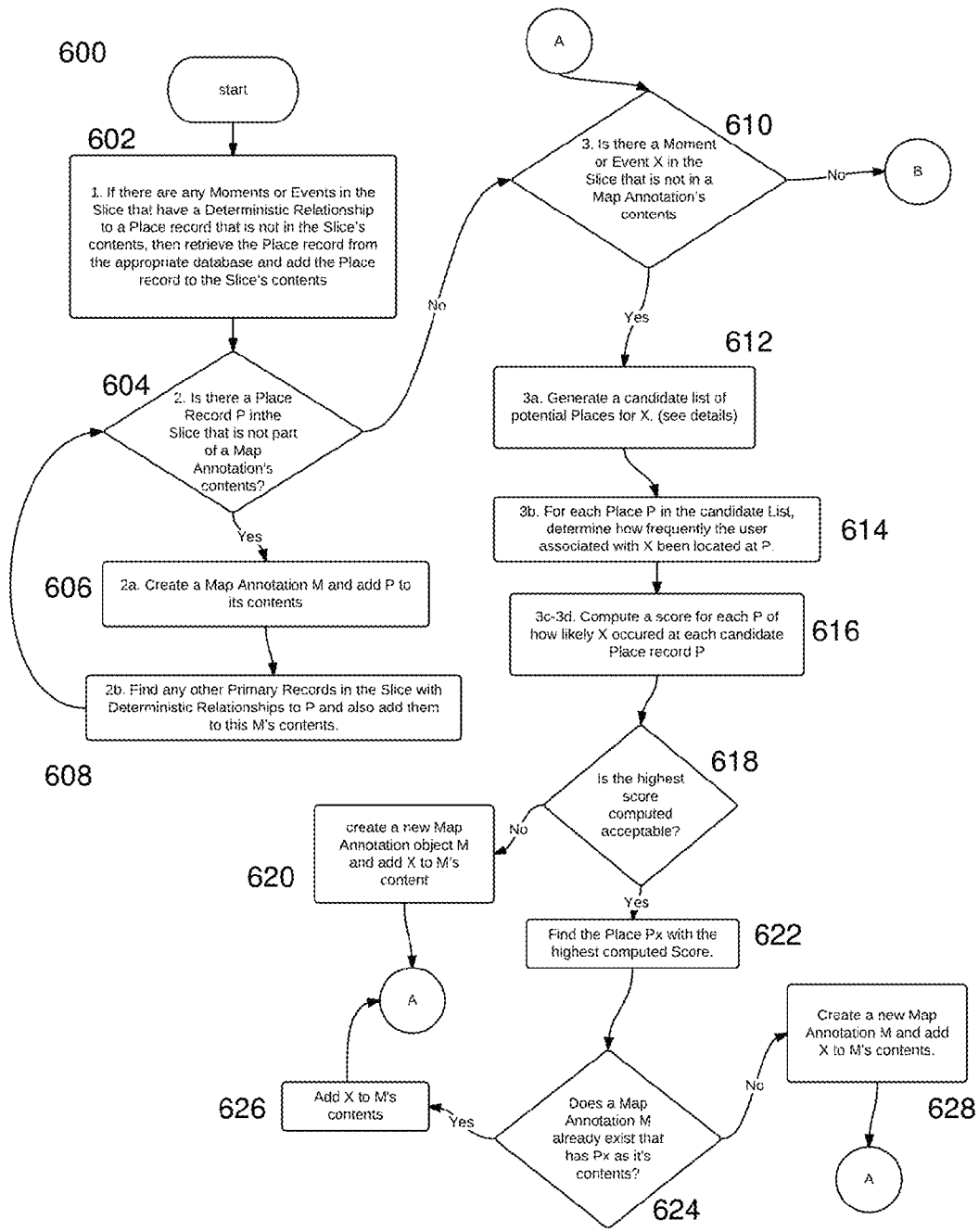
FIG. 6 illustrates an exemplary method for grouping Primary Records by place in accordance with embodiments of the present disclosure.

In an embodiment, FIG. 6 illustrates a method 600 for grouping primary records by Place, according to an embodiment of the present invention.

In block 602, if there are any Moments or Events in the Slice that have a Deterministic Relationship to a Place Record that is not in the Slice's contents, then retrieve the Place Record from the appropriate database and add the Place Record to the Slice's contents. A "Deterministic Relationship" is a relationship that indicates that the Moment or Event occurred at the Place.

In block 604, for each Place Record P in a Slice. In block 606, create a Map Annotation M and add P to its contents. In block 608, find any other Primary Records in the Slice with Deterministic Relationships to P and also add them to this Map Annotation's contents. Repeat blocks 606 and 608 until each Place Record in the Slice has a computed Map Annotation M.

In block 610, if any Moment or Events remain in the Slice and are not in a Map Annotation's contents, then attempt to determine at which Place Record each such Moment or Event occurred. For each Moment or Event X: In block 612, generate a candidate list of potential Places for X. A configuration parameter is used to specify which data sources (e.g., Slice, mpDB 102, and/or other databases) can be used to find potential matching Place Records. Each data source is searched for Places that find Places that are nearby X's GPS Value. A configuration parameter is used to define how close a potential Place must be to consider a potential Place candidate.

In an embodiment each data source is also searched for Places that find Places that have related Primary Records with Date-Time Values that are around X's time. Also include Places that are nearby Places that have related Primary Records with Date-Time Values that are around X's time. A configuration parameter is used to define how recent a time-date value must be considered for it to be used to find a potential candidate.

In block 614, a determination is made as to how frequently the user associated with X has been located at each Place on the candidate list. As shown in FIG. 6, in block 616, define a mathematical formula is defined to generate a score for how likely X occurs at each candidate Place Record P. The mathematical formula may examine one or more traits of the Primary Records, such as, for example, the statistical chance that X's GPS recorded location is inside each potential Place's defined GPS region. This calculation includes examining X's and P's recorded estimated GPS error values; how close X's GPS Values are to the recorded or estimated GPS Values of other Primary Records related to P; how close X's date, time or Date-Time Values are to the date, time or Date-Time Values, respectively, of other Primary Records related to P; the frequency that the user who recorded X has been at P in the past; the frequency that the user who recorded X OR others have been at P in the past at the time, during a time range, on that day of the week, or any other matching temporal pattern; the similarity of attributes on X when compared to attributes of P, the similarity of attributes on X when compared to attributes of other Primary Records that are related to P (e.g., see if there are common text, tags, or People.). It is to be appreciated that a mathematician or statistician that is one of ordinary skill in the art may recognize that a number of statistical methods may be used to generate such examinations and determine such predictions and analyses, in accordance with embodiments of the present invention.

In an embodiment, in block 618, the score for each candidate P is computed and the highest computed score is determined. If the highest computed score exceeds a configuration value, then in block 622, the candidate Place P with the highest computed score is determined. In block 624, find a Map Annotation M that contains P. If no Map Annotation has been created for P, then create a new Map Annotation M. In block 628, add X to M's content. In block 620, if no acceptable place P could be found on the candidate list, then create a new Map Annotation object M and in block

626, add X to M's content. An alternative embodiment of this block 610 of method 600 is to perform the same computations as for Place Record P but on Location X, where X is a GPS Value or street address.

For each Person Record P in the slice: examine each Map Annotation M's contents. If any Primary Record in M's contents is related to P, then add P to M's contents. The same Person Record may end up in more than one Map Annotation. If no Map Annotation can be found with Primary Records related to P, then create a new Map Annotation M and add P to M's content.

For each Map Annotation created, compute the GPS Value of a given type of Interaction that may be used to determine the Map Annotation location on the map display. The GPS Value computation can be computed using many different strategies such as: use a weighted average of the GPS Values of a given type of Interaction of all the content; use the Place's GPS Value; and use a weighted average of the GPS Values of a given type of Interaction of all the content, but use a strategy that treats GPS data that was recorded by a trusted GPS device as of a higher quality than GPS Values that were retrieved by a third party database and/or GPS Values that are geocoded.

In an embodiment, Primary Records are grouped by an Event first. If any Moments in the Slice have a Deterministic Relationship to an Event Record that is not in the Slice's contents, then retrieve the Event Record from the appropriate database and add the Event Record to the Slice's contents.

For each Event Record E in a Slice: create a Map Annotation M and add E to its contents; find any other Primary Records in the Slice with Deterministic Relationships to E and also add them to this Map Annotation's contents; and repeat until each Event Record in the Slice has a computed Map Annotation M; compute an average GPS Value (for a given type of Interaction) for each Map Annotation created and compute a score that predicts how accurate this estimate is. If the Map Annotation contains many GPS Values that are too far apart, then displaying this set of records as a single annotation may be confusing or incorrect. For any Map Annotation M whose score is not above a pre-defined minimum value, then remove M from the list of computed results; create a new Slice object that contains any content from the original Slice that has not yet been assigned a Map Annotation or is only assigned to an annotation that was removed in the previous step; and use one of the previous strategies to compute the remaining Map Annotations with the new smaller Slice object.

In an embodiment, Grouped Map Annotations are computed given a list of Map Annotations. Even using the Map Annotation computation methods above, there can still be too many Map Annotations that can reasonably be displayed together on a map. Map Annotations may be drawn too close together based on the zoom level of the map. Also, the total number of Map Annotations computed may exceed the number that can reasonably be displayed based on RAM, CPU or other performance constraints.

In an embodiment, the exemplary method solves a subproblem to the overall problem of computing a set of Map Annotations. This method requires a map and a list of Map Annotations. It requires a "minimum visual distance" configuration value and a "max annotation" configuration value. This method uses well-known techniques of vector quantization to reduce the number of map annotations through combination while retaining clustering evident in the particular dataset. To compute a set of new set of Map Annotations, an mpClient 108 executes the following steps as one specific example of the above such method.

In an embodiment, based on the map's current displayed size and region, assign each Map Annotation to a specific X, Y pixel location, based on the Map Annotation's GPS Value. The Map Annotation uses this X, Y pixel location as its visual center.

In an embodiment, discard any Map Annotations that cannot be fully or partially displayed on the current map's displayable region.

In an embodiment, find the two Map Annotations A and B that are the "closest" together on the map display. Check the visual distance between X, Y pixel value for each of A and B against a "minimum visual distance" configuration value. If the visual distance is below this value, then: create a new Grouped Map Annotation X. If A is a Grouped Map Annotation, then add A's contents to X's contents, else add A to X's contents.

If B is a Grouped Map Annotation, then add B's contents to X's contents, else add B to X's contents; compute a new GPS Value for X using all of the Primary Records contained within X's Map Annotations; remove A and B from the map's list of Map Annotations and replace them with X; compute a new X, Y pixel value for X based on X's GPS Value; and repeat the above steps until there are no more Map Annotations that are less than the "minimum visual distance" value. If the total number of remaining Map Annotations computed exceeds any known performance limit set by the mpClient 108, then increase the "minimum visual distance" configuration value and repeat until the total number of Map Annotations is now equal to the "maximum annotations" configuration parameter.

In an embodiment, the exemplary method enables a mix of Primary Record elements (People, Places, Events and Moments). For example, the user 112 can identify the proximity in time and place of many different types of elements, such as a grouped algorithm that is used to mix two different "Slices". By allowing a Grouped Map Annotation to have different visual appearances based on if it contains one or more Slices, then it can be used to help immediately identify information in two or more Slices that are visually distinct.

In an embodiment, the exemplary method computes Annotation Type settings of a Map Annotation. A Map Annotation can visually represent a Place, Person, Moment or Event. It can represent a mix of all four. The mpClient 108 needs different display logic for different types of Primary Records or for mixes of different types of Primary Records. Some features may only be enabled for certain Map Annotations based on what type of content the Map Annotation is displaying.

In an embodiment, this method uses a Map Annotation or Grouped Map Annotation; an ordered list of selection rules. Each selection rule defines two things, an Annotation Type and a Boolean expression that is used to examine a Map Annotation's contents; and a default Annotation Type.

If the Map Annotation is a Grouped Map Annotation, then the mpClient 108 examines a union of the Slice content that is contained in all of the Map Annotations owned by the Grouped Map Annotation. The Boolean expression defines the requirements that the contents need to satisfy in order for the Map Annotations to be assigned the indicated Annotation Type. The Boolean expression may define constraints such as: the maximum and/or minimum number of a certain type of Primary Record permitted in the Map Annotation's content (e.g., only one Place Record exists or more than two Moments exist.); the maximum and/or minimum number of Relationship Records of a certain relationship type permitted in the Map Annotation's content; the maximum and/or minimum number of Primary Records permitted in the Map Annotation's content that have attributes that match a given value or range of values (e.g., a Place's rating is more than three stars.); and if it is a Grouped Map Annotation, the maximum and/or minimum number of Map Annotations (or Map Annotations that have been subsumed into the Grouped Map Annotation) permitted by the grouping formula or other parameter. The Boolean expression may include a complex set of Boolean operators such as "AND" and "OR".

In order to determine the Annotation Type for a given Map Annotation, each selection rule is tested in order until the criteria matches the Map Annotation's content. If a match is found, then the assigned Annotation Type is used. If no matching rules are found, then a default Annotation Type is assigned.

In an embodiment, this method can allow for a large number of different types of icons, windows, list descriptions or other views to be defined and displayed by the mpClient 108. This method therefore can enhance the ability to mix Slices or filter Slices and have the display instantly adapt to the resulting data. Different Annotation Types can be designed for specific sub-sets of Primary Records.

Different Annotation Types may define different types of commands that may be enabled. For example, if a Moment is related to a Facebook™ status, then the mpClient 108 may need to enable Facebook™ specific features on the displayed Moment. A new selection rule can be added to the list of selection rules. The new rule searches for "Facebook™" Moments and assigns Map Annotations to an Annotation Type specifically defined for Facebook™ Status Moments. This makes it very easy to enhance the mpClient 108 with new methods of displaying and interacting with elements on a Map.

In an embodiment, a method for a user to filter a map's contents is based on a range of time and to navigate around a map by selecting a time value. A Slice may have Primary Records with Date-Time Values that span a given period of time. For example, the time span can be any range from hundreds of years to just a few seconds apart. The user needs a method to reduce a map's contents down to a specific time period. The user may also need a method to be able to find an element on a map that is related to a specific time value.

Figure 7:
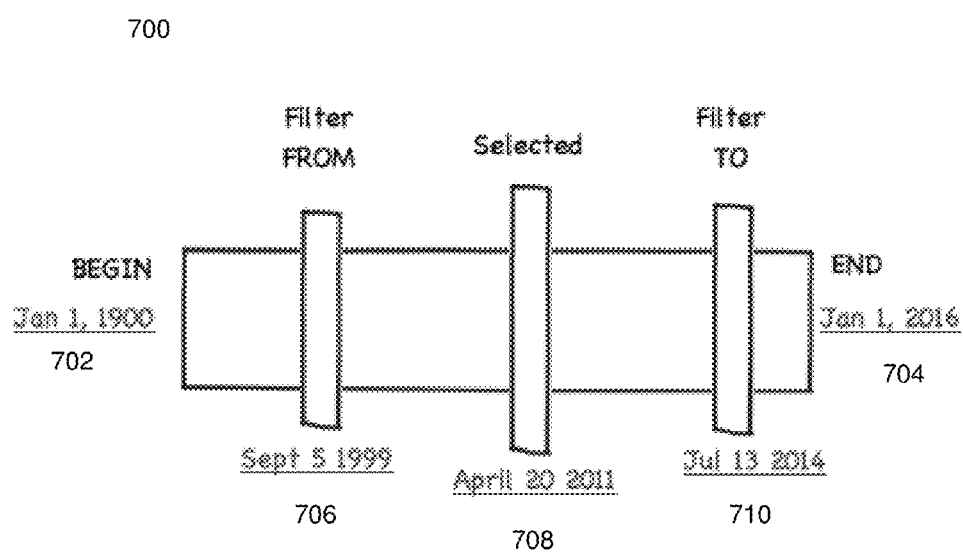
FIG. 7 illustrates an exemplary method for filtering and selecting map content based on date and time values, according to an embodiment of the present invention.
Figure 8:
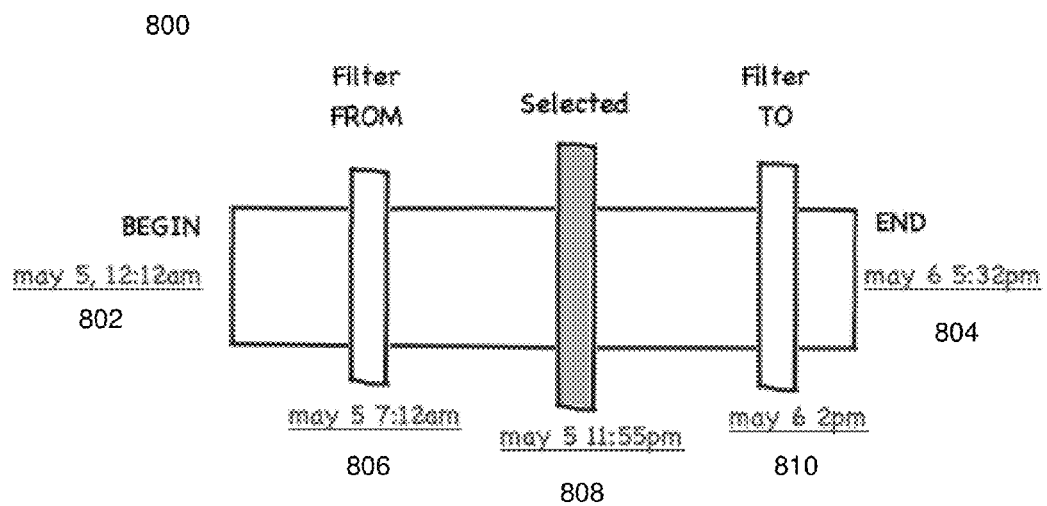
FIG. 8 illustrates an exemplary method for filtering and selecting map content based on date and time values, according to an embodiment of the present invention.

In an embodiment, a "Time Slider" is used to filter and select map content based on time values. In an embodiment, FIGS. 7 and 8 illustrate methods for filtering and selecting map content based on date and time values, according to an embodiment of the present invention. In an exemplary embodiment Time Sliders 700 and 800 represent a user interface element that can display the earliest and latest Date-Time Values (A+B) found in a set of records (the "Set"). The Time Slider may be set to display a specific set of Date-Time Values or a specific set of Date-Time Values based on type of Interaction (ex: Date-Time Values of when records were created, checked-in, modified, deleted, etc.); filter a map down to content that is only related to some "sub-range" of time values between A+B (e.g., filter the content down to just a specific week or day.); and allow the user to navigate through a map's contents forward and backward in time.

The Time Slider can be embodied in a number of visual embodiments. An exemplary Time Slider may look similar to a Time Slider with dates and Time Slider with dates and times.

In an embodiment, there are different Date-Time Values associated with the Time Slider. For example: BEGIN values 702 and 802 are the earliest Date-Time Value found within the Set's map contents; END value values 704 and 804 are the latest Date-Time Value found within the Set's map contents; FROM Filter values 706 and 806 are used to determine which records from the Set are displayed on the map. Records with Date-Time Values before the FROM value is filtered from the display; TO Filter values 710 and 810 are used to determine which records from the Set are displayed on the map. Records from the Set with Date-Time Values after the TO value is filtered from the display; and SELECTED values 708 and 808 cause the map to focus on a specific Map Annotation. The map may zoom or pan dynamically as the user changes this value. The SELECTED values 708 and 808 can only be set to Date-Time Values between FROM and TO. A SELECTED value 708 and 808 may not always be chosen or active in a given Map-Time Slider display.

In an embodiment, each of the TO, FROM and SELECTED values have a graphical or other visual element or demarcation that can be moved across the Time Slider (such graphical or other visual element, a "Marker.") A Marker can be moved across the Time Slider by using a mouse, finger drag or similar gesture, keyboard, or other control or input device. When the Marker is moved, its associated value changes to correspond to its new position on the Time Slider.

In an embodiment, the mpClient 108 receives a request from the user to display a Slice. The mpClient 108 retrieves the requested Slice from the mpService 104 or any other storage or database service. The mpClient 108 computes the BEGIN and END values by looking for the oldest Date-Time Value on a displayable record in the Slice and the latest Date-Time Value on a displayable record in the Slice, respectively (Note: both values may be in the future.). The Time Slider's BEGIN and END values are set to the above computed values. The Time Slider's FROM and TO values may be set to the BEGIN and END values respectively. These values may be set via many different methods, including directly input by the User, via the values that result from a search criteria or any filtering/scoping criteria, by the begin/end dates of the contents in a list, etc. The mpClient 108 displays the Slice contents on the map. The mpClient 108 may select one of the map's records and displays it as "highlighted". It does not matter how this initial selected record is chosen (ex: by the User through the direct input of a specific Date-Time Value, by the User via search criteria, by the User via any other direct or indirect input method or otherwise, such as automated or calculated inputs, inputs from third parties, etc.) It can be the first record, latest record, or any other record. If the mpClient 108 highlights any such record, then the SELECTED value is set to the Date-Time Value of the highlighted record and the SELECTED Marker is displayed on the Time Slider at the spot that corresponds with such value.

In an embodiment, the user can move either or both the FROM and TO Markers; move the SELECTED Marker; select a record directly on the map; and modify some other map filter settings not related to the Time Slider.

In an embodiment, as the corresponding Marker moves, the new FROM and TO Date-Time Values are displayed on the Time Slider, and the corresponding map contents start to appear or disappear based on the filtering logic that is filtering the data/records that match the changing Date-Time Values of the FROM and/or TO Markers. In some embodiments of this method, the map's zoom level changes, zooming in or out to show all the current unfiltered records. If the SELECTED record is no longer displayed due to the change in filter settings, then another record may be chosen as the SELECTED value. The mpClient 108 may select another record whose distance and/or time values are closest to the original SELECTED record that is no longer displayed.

In an embodiment, the Date-Time Value associated with the SELECTED Marker changes. The map now highlights a record on the map that matches the SELECTED Date-Time Value. The map may zoom or pan in order for the SELECTED record to be shown.

In an embodiment, the user can select a record directly on the map using a touch selection, mouse, keyboard or other input device, control or sensor. When the user selects a record to highlight, the SELECTED value changes to the date and/or time value of such highlighted record, and the SELECTED Marker moves to a position on the Time Slider that corresponds to such new value.

In an embodiment, the user can modify some other map filter settings not related to the Time Slider (e.g., the user may filter the map to only show his "Workout" Moments). When one of the other map filter settings changes, the BEGIN and END values are updated. The SELECTED value changes if its record is filtered.

In an additional embodiment, the Time Slider can include gradations or other demarcations so that the user can visualize how far the user needs to move one or more Markers to their desired value so as to increase or decrease a specific range of time or move such range of time forwards or backwards in time. The gradations may include "seconds/minutes/hours/days/weeks/months/years" indicators based on the time range being displayed. The gradations displayed between the FROM and TO do not need to be identical to gradations displayed between BEGIN and FROM and gradations between TO and END to allow easier and more accurate control of the SELECTED Marker (e.g., show time gradations in "hours" between the FROM and TO Markers while displaying "weeks" gradations elsewhere on the Time Slider.)

Figure 9:
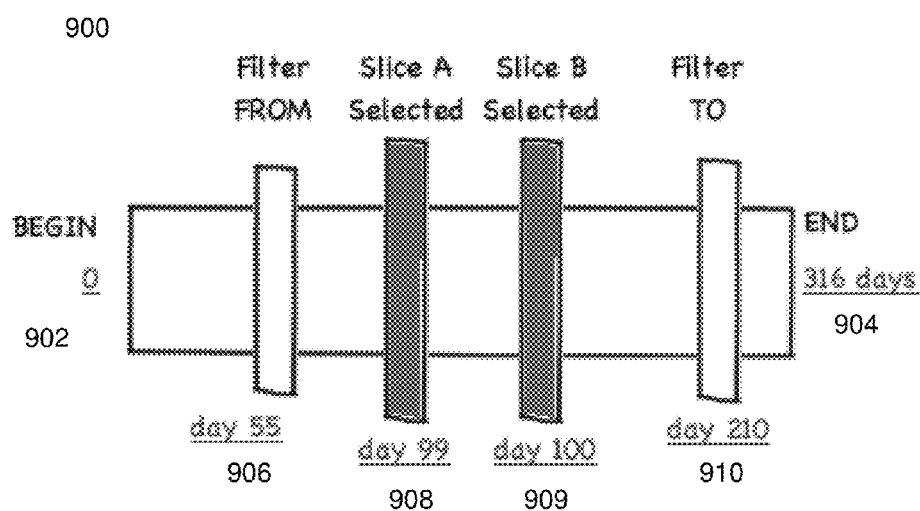
FIG. 9 illustrates a method for using a Time Offset Slider to filter and select two or more different Slices, according to an embodiment of the present invention.

FIG. 9 illustrates a method for using a Time Offset Slider to filter and select two or more different Slices, according to an embodiment of the present invention. When displaying two more Slices, each Slice may have a different range of BEGIN and END values. It is possible to display a "Time Offset Slider" for each Slice being displayed, but that also increases the complexity. The user may wish to compare two or more different histories of a similar sequence of Moments or Events (e.g., compare the "Moments along this year's drive to Grandma's house" to the "Moment's along last year's drive to Grandma's house".)

In an embodiment, a Time Offset Slider 900 is an enhancement to the Time Slider method previously described, however it does not display absolute Date-Time Values. Instead it displays a range of time that starts at zero and ends at an END value as computed below (such range of time, the "Time Offset Value".) Unlike a Time Slider that displays actual times and dates (ex: Mar. 5, 2011 at 6:00 pm), a Time Offset Slider displays relative differences in time between two or more Date-Time Values or, in other words, a time period (ex: five hours, three weeks, two years, etc.)

There are different date-time offset values associated with a Time Offset Slider. All Date-Time Value references below shall be for a specific type of Interaction. In an embodiment, the BEGIN value 902 may be zero, and the END value 904 is a Date-Time Value that represents the largest Slice Time Gap amongst all the displayed Slices. A Slice Time Gap is the date-time difference between the oldest and newest records of a given Slice. For example: if Slice A has records that span 5 days, and Slice B has records that span 20 days, then the END value is set to 20 days.

In an embodiment, FROM filter value 906 is used to determine which records are displayed on the map. The user selects a FROM filter value between the BEGIN value and END value. The FROM filter value is used to determine which records are displayed as follows: for a Slice A, determine the value V, which is the earliest Date-Time Value amongst all the records in Slice A. Compute Slice A's date-time filter value F by adding the FROM filter value to V. Display only the contents of Slice A that have Date-Time Values that are equal to or later than F. Repeat for each displayed Slice.

In an embodiment, the TO filter value 910 is used to determine which records are displayed on the map. The user selects a TO filter value between the BEGIN value and END value. The TO filter value is used to determine which records are displayed as follows:

For a Slice A, determine the value V, which is the earliest Date-Time Value amongst all the records in Slice A. Compute Slice A's date-time filter value T by adding the TO filter value to V. Display only the contents of Slice A that have Date-Time Values that are equal to or earlier than T. Repeat for each displayed Slice.

In an embodiment, there are several methods for exposing a SELECTED value and Marker on a Time Offset Slider, as follows. In an embodiment A of SELECTED value and Marker, the Time Offset Slider has a single offset SELECTED value and Marker. Moving the SELECTED Marker highlights on the map a record from each Slice that "best" matches the SELECTED value. When the user changes the SELECTED value, the mpClient 108 highlights a different set of records as follows. First determine what the "maximum allowed difference" value is. This value is used by the mpClient 108 to search for potential records that match the SELECTED value. For example, the "maximum allowed difference" may be set to 24 hours. If the user sets the SELECTED value to day 15, then the mpClient 108 searches for the best possible record to match the SELECTED value from day 14 to day 16. If no records exist between day 14 and day 16, then no record is highlighted. If more than one record is found, then the record that is closest in time to the SELECTED value is chosen.

For Each Slice A, determine the value V, which is the earliest Date-Time Value amongst all the records in Slice A. Compute Slice A's Date-Time Value S by adding the SELECTED value to V. Find the record X from Slice A that is closest to the Date-Time Value of V. If the difference between X's Date-Time Value and V does not exceed the "maximum allowed difference", then add X to the list of records to highlight. Highlight all the records found. The map may need to pan, zoom in or zoom out to cause all the records to be displayed (i.e., one highlighted record per Slice.)

In an embodiment B of SELECTED value and Marker, this embodiment has multiple SELECTED values 908 and 909 (one for each Displayed Slice). Each Slice has its own SELECTED value and Marker. Each Slice's SELECTED Marker is displayed differently (e.g., using a different color, icon, slider style, etc.) When the user changes the SELECTED value for a particular Slice, then the mpClient 108 highlights a different record from that Slice. First determine the "maximum allowed difference" value. For the selected Slice A, determine the value V that is the earliest Date-Time Value for a specific type of interaction amongst all the records in Slice A. Compute Slice A's Date-Time Value S by adding the Slice's SELECTED value to V. Find the record X from Slice A that is closest to the Date-Time Value of V. If the difference between X's Date-Time Value and V does not exceed the "maximum allowed difference", then highlight X. The map may need to pan, zoom in or zoom out to cause all the records to be displayed (i.e., one highlighted record per Slice.)

When using multiple SELECTED Markers, each Marker may show either the time-date offset value OR the actual Date-Time Value. In an embodiment, C of Time Offset Slider, the Time Offset Slider has no SELECTED value or Marker.

Figure 10:
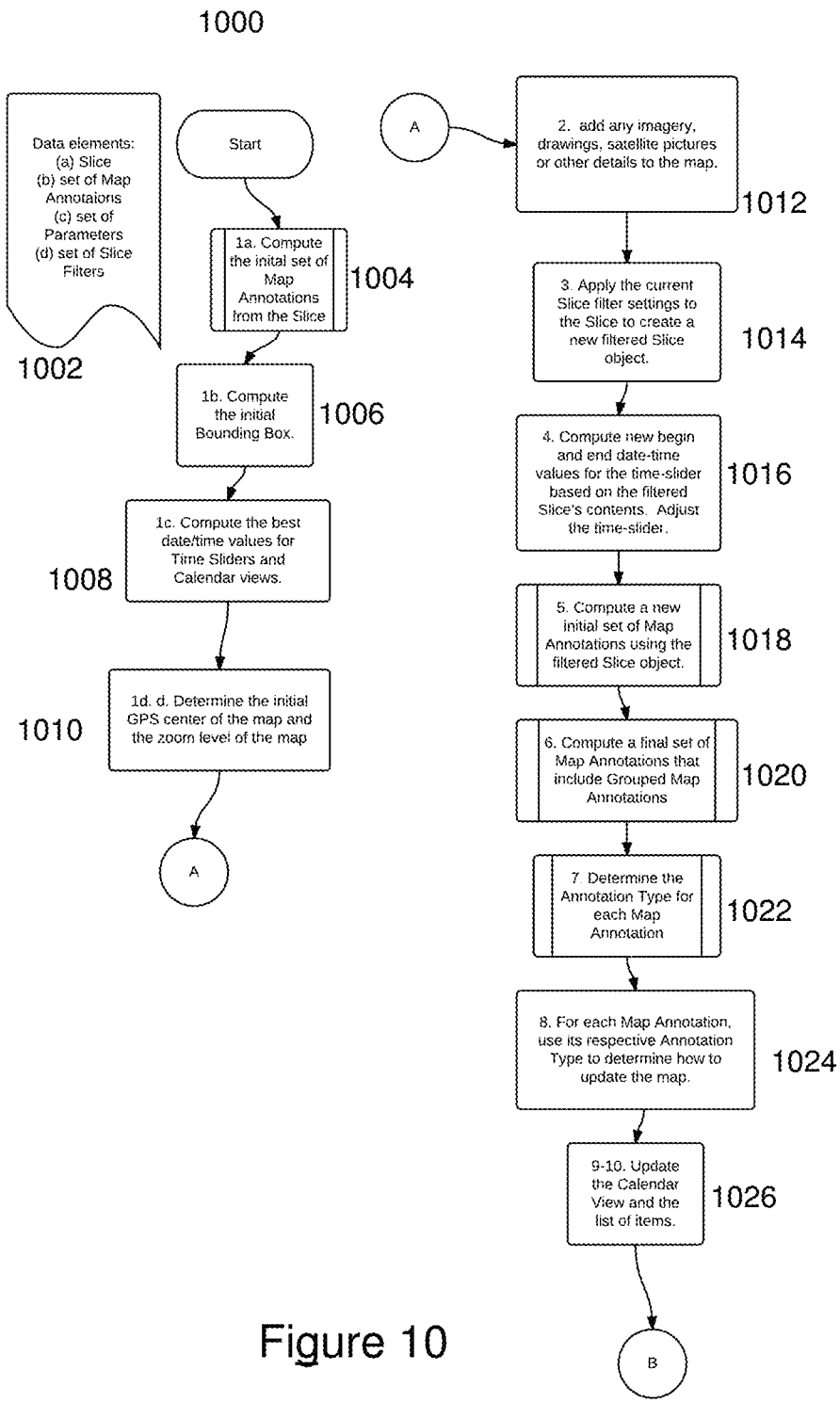
FIG. 10 illustrates an exemplary method for computing and updating a map display for the given contents of a Slice, according to an embodiment of the present invention.
Figure 11:
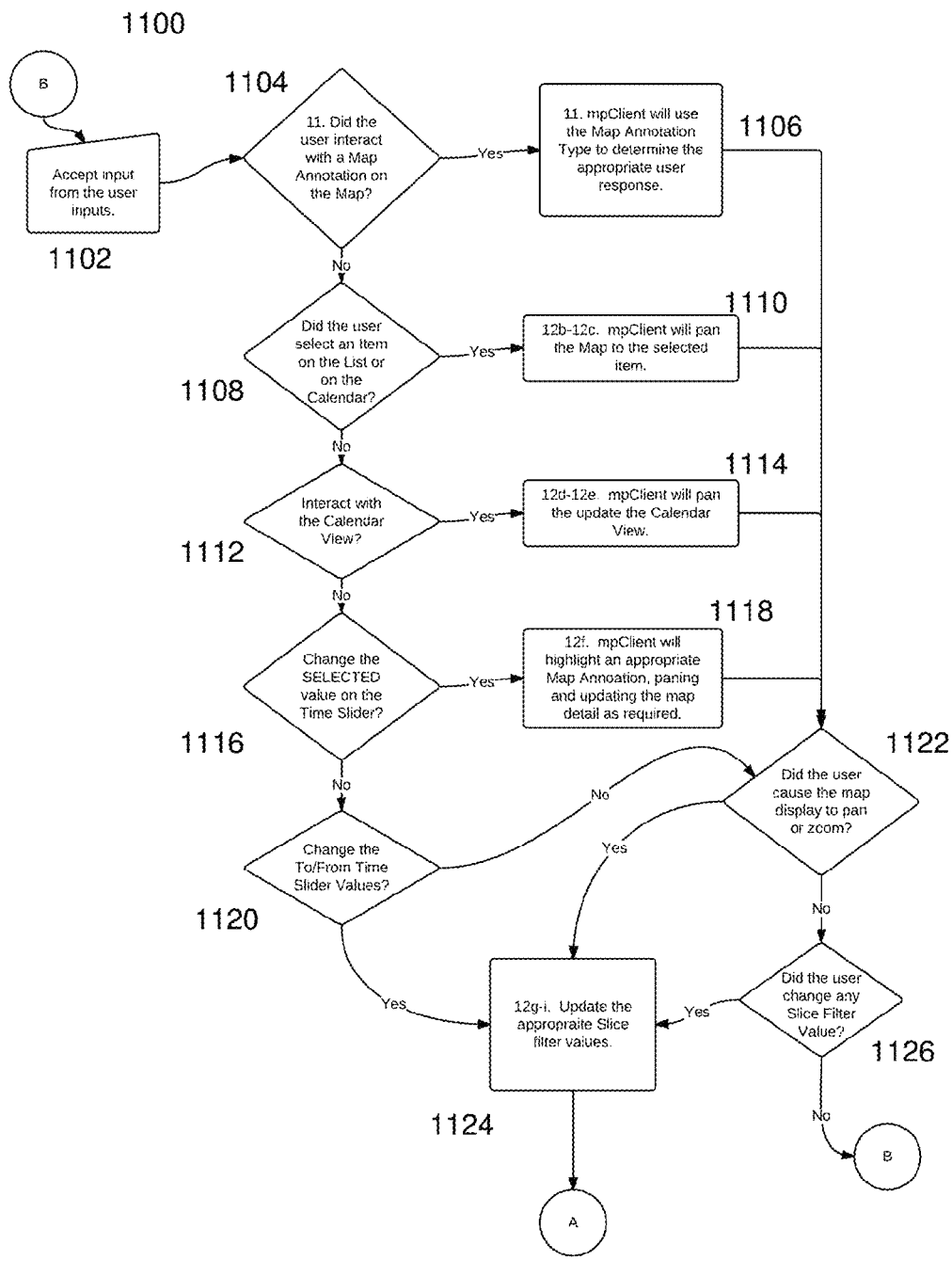
FIG. 11 illustrates an exemplary method for computing and updating a map display for the given contents of a Slice, according to an embodiment of the present invention.

In an embodiment, FIGS. 10 and 11 illustrate a method for computing and updating a map display for the given contents of a Slice, according to an embodiment of the present invention. A Slice may include any combination of People, Places, Events, Tags, and Moments and relationships amongst them. The contents of a Slice may include a set of data that is both geo-encoded and time-encoded data. Often, many of the Primary Records in a Slice has GPS Values that are very close together. Simply annotating a map with a single icon for each Primary Record results in hundreds of icons or more drawn around a single spot on the map, which can make it difficult for a user to see an individual Primary Record. It also prevents the user from being able to see how different Primary Records may be related to each other by time or place, especially if the user wants to zoom out, causing even more Primary Records to be pushed together. Mapping display technologies (e.g., Google Maps™ API) also may limit the number of annotations that can be displayed on a particular map. As the number of annotations is increased, the RAM and CPU requirements needed to display the map may exceed the capabilities of many devices and result in a poor user experience.

In an embodiment, Primary Records that are related by location are be grouped. The user is able to simultaneously view both the location information and the time/date information together and able to view all Primary Record types and be able to visualize the relationships and attributes of those records.

In an embodiment, the user can displays the map/location information and the time/date information simultaneously and mix and compare private records, public records, and shared records (semi-private/permissioned).

In an embodiment, the user can dynamically filter his currently displayed Slice to the pieces of data that are of most interest to him, zoom in on a particular place, or restrict his view to a specific period of time. As the user pans, zooms or changes the filter settings, more or less Slice records are displayed, and this may result in a change in the number of Map Annotations and a change in the way the Map Annotations appear.

FIGS. 10 and 11 illustrate methods 1000 and 1100 for dynamically generating a map that can display a set of detail for a defined area of the world, according to an embodiment of the present invention.

In an embodiment, a set of visual and logical elements in the mpClient 108 may be a dynamically generated map that can display a set of detail for a defined area of the world. That detail may include streets, roads, water, parks, businesses, political boundaries, satellite imagery, etc. The map is able to allow the user to pan north, south, east and west. It allows the user to select different zoom levels and a method for computing Map Annotations.

In an embodiment, Slice contents may be displayed on a simple list, and may include a scrollable window or text box. The list usually appears next to the map and allows for each Primary Record or each Map Annotation to also have a related item on the list.

In an embodiment, methods to display time-related data include: a visual calendar, which may support displaying a set of Primary Records in a month, day, week, agenda list or multi-day view (ex: Google Calendar™, Microsoft Outlook™) and may be used to select map content in a method similar to that described above using Time Sliders but using To/From, Begin/End, Selected time values as displayed in a calendar format; and a Time Slider or equivalent method of filtering and selecting map content using time values.

A method to display and modify a set of Slice filters. This can be done with a text box in which filters can be entered as a text string or special user interface widgets, such as check boxes, slider bars, selection lists or other user inputs that allows the user to add, remove or modify various filtering criteria.

In an embodiment, a method to display and select an Ordering for a Slice, and computing Data To Generate Display is described as follows.

In block 1002, the mpClient 108 uses the following data to compute the current display: a Slice; a list of Map Annotations (computed from the contents of the Slice); and zero or more configuration ("CONFIG") parameters to control different elements of the Display logic. These parameters may set various settings on the Map or other features such as: default map detail level; default map type: Street, Satellite View, Mixed, Topographical, etc.; the initial Ordering to use (e.g., Order by Time, by Rating, etc.); an initial Bounding Box. As used herein, the term "Bounding Box" includes, but is not limited to a rectangular region of a map and can be defined using four different GPS Values (for a given type of Interaction).

These parameters may also set various settings such as defined Slice filters. A Slice can have a set of dynamic "filters". The Slice can be filtered by one or more of the following defined types of filters: a Time/Date Range; and a GPS region or Bounding Box. Only records, Primary Records or other data within mpDB 102 or a third party database and being called by the User or mpService 104 (aka "Other Data") within a time/date range, based on Date-Time Values for a given type of Interaction, are displayed.

For a GPS region or Bounding Box, records, Primary Records or Other Data in this defined region of the world are displayed. This value may be initialized or pre-computed before the Slice is displayed the first time. After the map is initially displayed, the Bounding Box values are then updated as the user pans or zooms the map. The Location Values for the Bounding Box may be based on Location Values for a given type of Interaction.

The Slice can be filtered by, for example: a city, state, country, neighborhood, continent or similar politically or geographically defined region of the world, in which records, Primary Records or Other Data contained in this region are displayed; Tag, Category or Relationship, where records, Primary Records or Other Data with or without a specified Tag, Category or Relationship are displayed; and one or more defined constraints against one or more Primary Record, record or Other Data attributes (e.g., a constraint to only display Places with a rating less than "$$".)

Multiple filters can be combined to create complex filtering. They can be logically joined together with AND, OR, and parentheses to create complex Filters. Example: ("Mood"="Bored" OR "Activity"="Sleeping") AND (Place="Work").

In an embodiment, for a method for computing the display includes, for example: the mpClient 108 examines the Slice and initializes its data elements as follows, before the display is drawn. In block 1004, compute the current set of Map Annotations from the Slice's contents using the previously defined method. In block 1006, if no Bounding Box definition is included as a CONFIG parameter, then compute the initial Bounding Box by examining the first X's visible GPS Values locations on the Slice, using the current selected Ordering. X=a pre-defined system or CONFIG parameter defining how many elements should initially be displayed. If X is "unset," then all values in the Slice can be used to compute the initial Bounding Box.

In block 1008, if no default calendar view is included as a CONFIG parameter, then use the Slice's summary data of Date-Time Values to automatically select the best initial Date-Time Values for the Time Slider and the calendar view and most appropriate calendar view type (e.g., Year, Month, Week, Day, etc.). In block 1010, determine the initial GPS center of the map and the zoom level of the map by examining the current Bounding Box values. The zoom level and center of the map is set so that it can completely display the region defined by the Bounding Box. Then change the Bounding Box's values to match the map's displayable region. The map can be a different shape from the initial Bounded Box values.

In block 1012, for the map's current selected size, shape and location add any imagery, drawings, satellite pictures, weather details or other details as requested in the configuration property to the map or any outside area associated with the map and Date-Time Values. In an embodiment, the mpClient 108 may use a third party service (ex: Google Maps, Bing Maps, etc.) to retrieve these details. Weather details may utilize the SELECTED Date-Time Value on the Time Slider and/or Calendar to determine the time and date to retrieve weather details.

In block 1014, apply all of the current filters to the Slice. Use the filters to create a new filtered Slice object that contains only records that meet the filter criteria. In block 1016, compute new begin and end Date-Time Values for the Time Slider and/or Calendar based on the filtered Slice's contents. Adjust the Time Slider's and/or Calendar's visual representation based on the new computed values. In block 1018, compute a new initial set of Map Annotations using the filtered Slice's contents.

In block 1018, using the set of Map Annotations computed above, compute a final set of Map Annotations that include Grouped Map Annotations. In block 1022, determine the Annotation Type for each Map Annotation. In block 1024, for each Map Annotation, use its respective Annotation Type to determine how to draw the Map Annotation on the map. In block 1026, the calendar view can be updated to display the filtered Slice's contents.

For each Event in the filtered Slice, a corresponding visual calendar item can be created and displayed in a calendar view.

Calendar views may have different formats, for example such as a month view, week view, agenda/list view, and a day view (showing only Events on a single day) or a multi-day view (showing two or more consecutive days side-by-side).

In an embodiment, in blocks 1102 and 1104, each Annotation Type has instructions that inform the mpClient 108 how to respond if the user selects, clicks on or interacts with one of the Map Annotation's Views, whether with a mouse click, keyboard, touch gesture or similar user interaction. For most embodiments, the Annotation Type may map to a class object (for languages like C++ or Java) that contains a method for potential user interaction. In an embodiment, in block 1106, the Annotation Type may respond to the user input in many ways, such as, for example, by zooming the map in for more detail; breaking the Map Annotation (or Grouped Map Annotation) into two or more Map Annotations and zoom in to show more detail; displaying more detail about the Map Annotation's content; displaying a larger Window with an even more detailed description of the Map Annotation's content; changing the Time Slider's SELECTED value to the Date-Time Value of a selected Primary Record or record related to Other Data; transitioning the user to another part of the mpClient 108 (e.g., moving them to a "Place" or "Moment" detail screen and closing the Map view); displaying or showing related Associated Media; hiding or displaying other views (such as a small window, or large window.); simulating movement through the data, such as auto scrolling forward or backward through time or Ordering (such as highest to lowest rated, etc.); displaying images, videos, text, audio in a slide show format, ordered by time or any other Ordering; using animation to simulate traveling across the map; using visuals to show the path across time and place from one Map Annotation to another (ex: dotted lines from Point A on the map, which occurred first in time, to Point B, which occurred next in time.); allowing the user to perform List transactions, such as adding or removing a displayed item from a List thereby creating a new List from the displayed content; dynamically retrieving and displaying more details about a selected item from the mpDB 102 or other database.

In an embodiment, a special icon or Map Annotation View can be used to simulate "where" a particular user was at a particular moment. This may be "where" a user was on the date/time of the "current" Date-Time Value on the Time Slider.

According to embodiments of the present invention, user may now manipulate the display in one or more of the following exemplary ways: interacting with different Map Annotations, via a mouse, keyboard, touch gesture or other selection device; selecting an item on the display's list view to cause the map to pan to the selected item's Map Annotation.

In an embodiment, in blocks 1108 and 1110, select an item or range of items on the calendar, which may cause the map to pan or zoom to a Place or Places associated with the selected Event or range of Events (e.g., from Apr. 1, 2011 to Apr. 2, 2011.). Change the day, week, month or year in the calendar view. In an embodiment, in blocks 1112 and 1114, change the format of the calendar view (from a month view to a week view). In an embodiment, in block 1118, change the range of Date-Time Values from one type of Interaction to another type of Interaction (ex: dates a user added a Place Record to their mpDB 102 versus dates that the user visited such Places.)

In an embodiment, in block 1116, change the "Selected" value on the Time Slider. This changes the selected Annotation, to an Annotation closest to the Date-Time Value selected, navigating the Map to a specific time on the Time Slider. If the map is configured to display weather details, then the map detail may change to include the SELECTED Date-Time Value's weather information. In an embodiment, in block 1120, change the To/From values on the Time Slider. This changes the To/From filters used on the Slice. In an embodiment, in block 1124, add, remove or modify any of the existing set of Slice Filters; zoom the map in, out or pan it to the north, south, east or west to change the Bounding Box filter; exit the map display and cause the routine to exit; request to change the Slice displayed; and request to add an additional Slice to the display (see next method for enhancements on displaying two or more Slices).

In an embodiment, in blocks 1122 and 1126, if the user changes the Slice displayed, the map's displayable region or the current Filter Settings, then the method returns and re-computes the contents of the display.

In an embodiment, the exemplary method enables the recording of any combination of Moments, People, Places, Tags and Events; the importing of any combination of Moments, People, Places, Tags and Events from third party sources; the sharing of any combination of Moments, People, Places, Tags and Events to "friends," and the linking of any combination of Moments, People, Places, Tags and Events to records that point to different databases (e.g., mpDB 102 plus external third party databases).

The exemplary method enables a user to: create an interactive method of displaying some subset of a person's information that can be simultaneously displayed on a map, on a list and on a calendar and/or Time Slider while also being filtered by up to three data attributes (1) Date-Time Values, including filtering on various types of Date-Time Values, 2) Location Values and/or 3) other attribute, such as content or keywords (e.g., tag, description, title, photo, name, person's name/activity, etc.) AND by relationships to other data; create a highly interactive method of comparing multiple Slices with each other, including comparing data that is dynamically extracted from multiple database sources and joined into logical related sets of data, especially as compared across geospatial and temporal axes and parameters; and display any combination of Moments, Events, People, Tags and Places at the same time, which can be applied to many different types of data analysis and can display a mix of private, public and social networked (semi-private/permissioned) information.

In an embodiment, the method enables the displaying of two or more Slices simultaneously if a user may want to compare one or more sets of data about People, Places, Events, Tags and Moments to one or more other sets of data. The following is just a few examples of comparisons that a user may want to make: comparing different kinds of activities, from the past or future, from the same user or from different users; comparing Places, Events and to-do's that have been published on different web sites to data in the user's mpDB 102; comparing private data in the user's mpDB 102 or imported from their private website to their "friends'" private data; comparing a user's workouts from his current week against his workouts from the previous week; comparing a user's workouts with another user's TV watching history; discovering places, events, activities, experiences, thoughts, moods, types of places, and/or types of events that two or more people may have in common; finding a day in the past when two people may have been in the same Place at or around the same time or at the same Event; comparing the progress of a trip against a previously planned itinerary; seeing which of the 20 tallest mountains in the world that a person has already climbed and which ones they have not yet climbed in order to determine which of the 20 tallest mountains in the world that two different people may have both climbed before (either climbed together or climbed separately at different times) and which mountains neither of them have yet climbed (to help plan their next joint climbing attempt.); comparing a person's 30 day planned itinerary for his trip across Europe against his favorite rock band's upcoming European tour to find out for which of the band's performances he can buy tickets.

In an embodiment, the display method above is enhanced to support displaying and comparing multiple Slices. In addition to the user interface controls defined above, the following are additional user interface controls and methods that may be utilized by the user with the mpClient 108: a method of performing additional queries for additional Slices while viewing one or more Slices. These additional Slices can be added to the display.

The method to display and modify a set of Slice filters as defined above may be enhanced by (i) each Slice displayed having its own set of modifiable filters or (ii) a single set of modifiable Slice filters being used to filter all the Slices currently displayed.

A method so that each Slice displayed also displays its own separate Time Slider or a method where a single Time Slider is shared by all displayed Slices. The "FROM", "TO", and "SELECTED" time filter values for each Slice could be set appropriately (ex: the user may want to know where two different people were at a particular moment in time.) As the user changes the selected value on a shared Time Slider, a Map Annotation from each Slice appears highlighted.

Additional user interface controls include a Time Offset Slider and selecting a different Ordering for each Slice. All of the Slices may be displayed on a "single" map or on two or more maps side-by-side. Each map can be assigned one or more Slices to display and may display different map regions at different zoom levels.

Additional user interface controls include filtering one of the Slices to only display Primary Records if the Primary Records are also found in another displayed Slice. For example, only display "Places" that exist in all of the Slices and performing mathematical set operation amongst two or more Slices' contents and displaying the results (e.g., union, intersection, complement.) For a given pair of Slices A and B, the ability to filter the display to only show the Primary Record X from Slice A's contents if X has a Relationship Record that points to a member of Slice B's contents.

For a given pair of Slices A and B, the ability to filter the display to only show the Primary Record X from a Slice A's contents if X has a relationship to some Primary Record (in some database or other Slice) that also has a relationship to a Primary Record in Slice B's contents (e.g., this method can be used to find two different Moments from two different users' histories that may have a common Place, Event, Tag or Person.)

In an embodiment, the display method above is enhanced to support new Annotation Types to allow a user to: recognize that a Map Annotation's contents only contain values from a specific displayed Slice via a color, icon, or other demarcation; recognize that a Map Annotation's contents contain values from two or more displayed Slices via a set of colors, icons or other demarcations; and recognize which calendar view entries are related to which Slice via different colors fonts or other demarcations.

In an embodiment, the exemplary method enables the recording of any combination of Moments, People, Places, Tags and Events, the importing of any combination of Moments, People, Places, Tags and Events from third party sources, the sharing of any combination of Moments, People, Places, Tags and Events to "friends," and the linking of any combination of Moments, People, Places, Tags and Events to records that point to different internal and external databases (e.g., mpDB 102 plus external third party databases).

The exemplary method enables a user to create a highly interactive method of displaying some subset of a person's information that can be simultaneously displayed on a map, on a list and on a calendar or time-slider while also being filtered by various data attributes (e.g., name, place, time, activity, etc.) AND by relationships to other data; create a highly interactive method of comparing multiple Slices with each other, including comparing data that is dynamically extracted from multiple database sources and joined into logical related sets of data; and display any combination of Moments, Events, People, Tags and Places at the same time, which can be applied to many different types of data analysis and can display a mix of private, public and social networked (semi-private/permissioned) information.

In an embodiment, the exemplary method enables publishing content to third party services if user may need to dynamically publish, share or synchronize his mpDB 102 content with a third party service or application (e.g., he may wish to publish his Events and Moments to an iCalendar™ feed so they can be viewed in a third party calendar application.)

In an embodiment, the following exemplary method describes a method of creating a Publication from a List or an Auto-List. A "Publication" is a record in the mpDB 102 that contains the following: a set of Slice Creation Criteria, an export format (such as iCalendar™, GeoRss, KML, vCard, JSON, XML, etc), a URL and one or more settings as described below. The current content of a Publication can be retrieved via the URL and returned with the specified export data format. The mpService 104 may also expose methods to allow a Publication to be subscribed to via a notification protocol such as PubHubSubBub™, Apple iPhone Notifications™, Blackberry's Push Notification Service™ email, SMS, Twitter™, IM, Facebook™ messaging, etc.

In an embodiment, the following is an exemplary method for the user to create a Publication with the mpClient 108. The user creates a List or an Auto-List using the mpClient 108. The user executes an "export as data feed" operation on his currently selected List or Auto-List. The mpClient 108 requests the user 112 to select the export format of the Publication. Publication formats can include different formatted feeds such as XML, JSON, GeoRSS, iCalendar™, VCF, HTML. Only certain types of Primary Records may be supported by the selected export format. The system modifies the Slice Creation Criteria used for the Publication to filter out Primary Records that are not allowed for this output type. For example: the user selects the iCalendar™ format, which is a list of time-encoded Events, and the format has no natural support for displaying People Records. So when the iCalendar™ format is selected, the mpService 104 adds a filter to the Slice Creation Criteria that filters out People Records.

The user selects different options for how much of the data found in the Slice should be included in the Publication. For example: If the user selects format type iCalendar, he is presented with iCalendar specific options to include or filter certain records in the output, as an example: Events: Show busy/free only (yes/no); Include location information (yes/no); Include related people (yes/no); People: Include people's birthdays, addresses, or other metadata; Moments: Include links to photos/video/audio (yes/no).

If the user selects format type GeoRSS, he is presented with GeoRSS specific options to include or filter certain records in the output, for example: Moments: Include links to photos/video/audio (yes/no); All Types: Include GPS/Location (yes/no); All Types: Include descriptions, tags, and various other textual metadata as RSS Text (yes/no).

The User is now presented with a set of security options on the Publication. The feed's security settings may include the following types of settings: Restrict the contents based on the user that is accessing the feed? (yes/no). This allows different people to see different versions of the feed, each such version based on the shared permissions settings for each Primary Record. A unique feed may be generated for each user that queries the feed based on the individual privacy settings on the data inside the feed. Users who wish to view this data may need to be authenticated by the mpService 104 in order to view any content that has non-public privacy settings. This is similar to the Facebook™ Open Graph API, which shows different versions of a user's data to different friends or strangers.

In an embodiment, another security option may be, for example: Publish as a public feed? The Publication can be accessed by anybody on the Internet. (yes/no). Indexable via search engines? (yes/no). The Publication content can be indexed by search engines (e.g., robots.txt files used by Google.). Publish as an unauthenticated secret feed? An unauthenticated secret feed is a feed that does not require username/password, but the URL is large and secret (e.g., Google Calendar's feed export). (yes/no).

If the mpService 104 needs to import data from a third party database to publish the contents of a Publication, the user may have to confirm that publishing the feed does not violate any relevant Terms of Service.

The mpClient 108 checks to see if the user is allowed to publish this data based on the user's account privileges. If publishing the requested Publication requires the mpService 104 to import data from a third party database, the mpService 104 performs checks to see if this type of republication is permitted by this third party database. If not, the user may be presented with an error and requested to alter his settings to comply with the TOS.

The mpService 104 creates a unique URL for the Publication and stores the user's selections for the Publication in a record in the mpDB 102. The mpClient 108 displays the unique URL to the user. The user can then use the URL with third parry services (e.g., Google Reader™ (RSS), Google Earth™ (KML), Google™ Calendar/Outlook (iCalendar™).)

In an embodiment, a method for the mpService 104 to service a Publication URL request may be, for example: the mpService 104 receives an HTTP or HTTPS GET request from a Client to a specific URL; the mpService 104 searches the mpDB 102 for a Publication record that matches the URL requested. If it is not found, then the GET requests returns with a failure.

The mpService 104 examines the configured security settings for the Publication and performs any appropriate HTTP or HTTPS authentication method to determine the user account who is requesting the Publication. Based on the user identified (anonymous or not), the mpService 104 checks the permission settings on the Publication to determine if this user has permission to view this Publication.

In an embodiment, the mpService 104 checks its cache to see if the last cached version of this Publication is the recent and accurate enough to return. If a cached value is found, then the cached object is returned, and the mpService 104 exits. The mpService 104 creates a Slice based on the Publication's List or Auto List and checks each record in the Slice against the querying user's account. Is this user allowed to see each of the records in the Publication based on each such record's privacy settings? If the user is allowed, which fields on each such record can be viewed by this user? Remove any restricted fields from such record. If configured to do so by system configuration and/or by Publication settings, modify the Slice to include a warning that some data may be missing due to privacy settings established for the identified user.

Is this data that was copied or imported from a third party database and if the TOS for this third party data allows the mpService 104 to send the data to this identified user? If so, remove any data that is restricted by the third party's TOS by system configuration and/or by Publication settings and modify the Slice to include a warning that some data may be missing due to TOS issues with the third party database.

If there is no data in the Slice, then Return an appropriate HTTP Error. The Error may use the warnings included above to determine what sort of appropriate error may be returned (e.g., restricted, data unavailable, etc). Else the resulting Slice is converted into the Publication's output format.

The resulting output can be cached in a HTTP server cache to assist in frequent requests for a given URL and transmit the requested data to the Client.

In an embodiment, the mpService 104 may apply some additional enhancements to manage a Publication. For example, restricting the size of the search results to a specified maximum amount of data. The size can be different depending on the user that created the feed, the user querying the feed, and/or by a system wide parameter.

In an embodiment for managing a Publication, the mpService 104 may support a "changed since" parameter. Clients requesting the latest data from a Publication can optionally request to only return data that has "changed" since a specific time. In an embodiment, the mpService 104 may support for HTTP 1.1 cache time values can be embedded inside the HTTP 1.1 headers to encourage web browsers and proxy servers to cache results locally. In an embodiment, the mpService 104 may provide support for rate limits. A rate limit may be assigned to a Publication preventing the total number of requests made by all users. A rate limit may be applied to a specific querying user or IP. Different rate limits may be applied at different times. They may be dynamically adjusted based on current network traffic conditions.

In an embodiment for managing a Publication, support for caching of requests from the mpService 104 may be provided to third party databases. Before a request is sent to a third party DB, the mpService 104 can check a local cache to see if the data is already cached locally. Some third party databases may return cache timing values as part of their data result set. Cached timing values returned to the Client should match cached timing values returned from a third party database request. Some third party databases require that data cannot be cached, or if it can be cached, that the caches expire at pre-defined limits. Cached timing values returned to the Client should comply with third party database caching requirements.

In an embodiment for managing a Publication, notification support for the Publication may be added. Users can utilize protocols such as PubHubSubBub™, Prowl™ Apple Notification™, or other notifications to be instantly notified if the data inside the Publication has changed without needing to poll the server with HTTP GET requests. In an embodiment, tracking tokens (Google Analytics™ or similar strategies) may be embedded inside returned data so that Clients viewing the Publication's data can be tracked.

In an embodiment for managing a Publication, commercial content may be embedded into the Publication's data, such as advertising or other offers. In an embodiment, Clients may be allowed to modify the content of a List, using an API such as the Atom Publishing Standard or similar protocol. Modifications result in data being added or removed from the Publication's related List object.

In an embodiment, this method allows for a single set of data (a single List or Auto-List) to be published to third party services. The user can create multiple Publications from the same List or Auto-List (e.g., an iCalendar™ Feed can contain a List's Events, a vCard feed can contain a list of People, a GeoRSS feed can contain a List's Moments and/or Places.)

In an embodiment, this method allows for data to be dynamically imported from a third party service using one supported format (as defined in the Slice Creation Content for an Auto-List) and dynamically converted into a different export format. The user can create Slice Creation Criteria that mixes their personal mpDB 102 information with third party records by using Relationship Records and/or Weak Links to third party records. Since the user may constantly be adding new content (new Moments, Events, People, Places, Tags, etc.), the Publication can pull in the latest information across private and public data sources.

In an embodiment, the mpService 104 can "forward" the querying user security credentials to the third party data sources needed to retrieve the contents. This can prevent the "re-publication" of data from a social network and prevents a user from using the Publication to defeat a third party website's privacy restrictions. This method allows myPlanit™ to maintain its highly flexible internal schema while still maintaining compatibility with a number of existing products and solutions.

In an embodiment, a Client can deal with partial Slices if the Client may be required to display or analyze the contents of a Slice. A Slice may contain a partial set of data of usable data and some of the contents of a Slice contain Weak Links to records that are not contained in the Slice. Before the Slice can be processed, the records pointed to by the Weak Links need to be satisfied. This requires executing several database lookups both to the mpDB 102 and to external databases, but performing a large number of these operations on a Client can result in performance issues.

Some of the records contained in a Slice and some of the records that may be retrieved via the Weak Links may not have usable GPS Values, but such records may include enough information that a GPS Value can be determined. Determining a GPS Value may require the use of a Geocoder Service, but performing a large number of these operations on a Client can result in performance issues.

The Client may be required to estimate the earliest and latest Date-Time Values that are related to a specific Primary Record (ex: an Event may have a "begin" Date-Time Value and an "end" Date-Time Value. The Event may also have related Moments that are outside of the Event's "begin" and "end" values. The Client may need to compute time values for the earliest related Moment and the latest related Moment.)

The Client may request that Orderings are automatically generated based on the final contents of the Slice. These could be Orderings of an entire Slice or of just one type of Primary Record in a Slice (e.g., Place, Event, etc.) Examples of the types of Orderings that may be requested are the order by the distance from a specified GPS Value and the order by name, time, rating, cost, price or any other attribute on a Primary Record.

The Client may be required to compute some summary details about a Slice. Examples of some such summary details include: What Bounding Box contains all of the Slice's Primary Records' GPS Values (whether for one or more specific Interactions)? The map display zooms to this specific part of a geographical Map.

In an embodiment, additional summary details include: What Bounding Box contains the Slice's first N (N being an integer greater than 0) Primary Records' GPS Values based on an Ordering? The Client may need to display the "best" N places to the user by using a defined or computed Ordering.

In an embodiment, additional summary details include: What is the earliest and latest Date-Time Values of all the Events and/or Moments in the Slice? What is the earliest and latest Date-Time Values of all the Moments related to an Event in the slice?

In an embodiment, the Client transmits a request to the mpService, which performs an analysis on the Slice requested. The Client issues a "GetSlice" request to the mpService. The "GetSlice" request contains the following details: a copy of a Slice, a reference to a Slice object stored on a database or a set of Slice Creation Criteria; any required user account information, including the user's authorization information for any required third party databases; parameter values that let the Client customize how the mpService 104 should process the request.

In an embodiment, parameter values to instruct the mpService 104 to perform various additional actions on the Slice, may include, for example: add to the Slice any record pointed to by the Slice's Weak Links; add to the Slice only certain types of records (e.g., Places only, Events and Moments only) pointed to by Weak Links; add to the Slice records pointed to by Relationship Records for certain types of Primary Records and certain types of relationships within the Slice (e.g., retrieve certain types of Moments related to Events in the Slice); add to the Slice only records pointed to by Weak Links that point to a specific database or databases (e.g., only get records from the mpDB 102, or only get records from mpDB 102 and Facebook™, etc.); add only records pointed to by Weak Links if the records are needed in order to determine a GPS and/or a Date-Time Value; determine the best GPS Value and/or the best Date-Time Value(s) for all records in the Slice; determine the best GPS and/or the best Date-Time Values for Primary Records of a certain type (e.g., Places, Events); define what methods to use when determining the best GPS Value or the best time-values; if a Primary Record in the Slice has a specific type of Relationship Record, then retrieve and add the related record as a subdocument to Primary Record (e.g., getting the latest information about a Place Record from Google based on a specific relationship.); and if a Primary Record in the Slice does not have an acceptable value for one or more fields (name, address, GPS, date-time, etc) and it has a specific type of Relationship Record, then retrieve and add the related record as a subdocument to Primary Record (e.g., this can be used to get a set of usable information such as phone number, address, or GPS Value for a Place Record from Google by storing a Relationship Record that maintains a relationship between the Primary Record and a record in Google's database.). The Client transmits the request details to the mpService 104 (via a web service API or other protocol.) The mpService 104 receives the request.

The mpService 104 computes the initial Slice. If the Client transmitted a Slice in the request, it uses this as the initial Slice. If the Client transmitted a reference to a Slice stored in a database, the mpService 104 retrieves the referenced Slice from the referenced database. If the Client sent Slice Creation Criteria, then the mpService 104 uses this to create a Slice object.

The mpService 104 executes all database related requests from the Client and adds any additional records from such requests to the Slice as needed. This includes adding Primary Records to the Slice that are pointed to by Weak Links and/or Relationship Records. The mpService 104 forwards the user's authentication information to any third party database with each database request as needed.

In an embodiment, if the mpService 104 needs to retrieve a record from a third party database (e.g., in order to perform the above steps), then a local cache can be checked before querying the third party database. The mpService 104 performs a third party database request if an appropriate unexpired cached result is not found in the cache. The mpService 104 stores any records retrieved from the third party database into the cache using cache time expiration values that comply with the third party database's caching policies.

In an embodiment, if the mpService 104 needs to perform a large number of database queries from the same database, it aggregates the queries into a single batch that can be sent to the database as a single request. The batching logic could batch some or all of the database requests needed to populate this Slice into a single request to the database.

In an embodiment, if the mpService 104 has a large number of database requests it needs to perform, it may issue simultaneous, overlapping requests using different worker threads, job queues or other methods.

An embodiment includes some combination of the above three embodiments.

If any attempt to retrieve a record a database fails, then the mpService 104 adds an appropriate error message to the Slice as a Slice attribute or as a subdocument.

If the Client's request includes a request to check for valid GPS Values, then for each Primary Record X that needs to be checked, the mpService 104 performs the following actions: Determine if the X has a GPS Value that can be used. If X's GPS Value is an estimate, then the mpService 104 examines how long ago the estimate was made. If the age of the estimate exceeds a configured parameter, then the GPS Value may not be used, else if X's GPS Value is not an estimate but was recorded by a GPS device, then confirm that X's recorded GPS Value has an acceptable level of estimated error. Some GPS-enabled devices may generate an estimated error value at the same time they measure a GPS Value. If the recorded GPS Value's estimated error is below a configured parameter, then use the stored GPS Value.

If no appropriate GPS Value can be found, then use an appropriate algorithm to determine the GPS Value for this record (see other parts of document for potential strategies.)

If the Client's request includes a request to verify earliest and latest Date-Time Values, then for each Primary Record X that matches the criteria established in the Client's request, the mpService 104 determines the best earliest and best latest Date-Time Values for X. (See other parts of document for potential strategies to compute these values.)

The mpService 104 computes any summary values requested by the Client such as: any requested Orderings; any requested Bounding Box calculation; the earliest and latest Date-Time Values for all of the Slice; and the mpService 104 returns the requested Slice and requested computed summary values to Client.

In an embodiment, an mpClient can request to receive Slices of almost exactly the "right" level of detail. This can allow the mpClient to initially query and retrieve only a partial set of the data. For example, an mpClient 108 may wish to map a large amount of items, but it does not need to retrieve extra details for each item, especially if those details are from a third party database. The following is an example of an mpClient 108 requesting more detail by using a GetSlice operation:

The mpClient 108 requests an initial Slice that contains Place Records that only have GPS Values and names and Relationship Records for each Place Record that points to a "Google Place" record. The mpClient 108 displays the Slice. The user zooms into a smaller region of the mpClient 108's map display filtering out many of the items from the Slice. The mpClient 108 automatically generates a new, smaller Slice based on the smaller region the user has now zoomed into. The mpClient 108 issues a GetSlice requests to the mpService, sending the new, smaller Slice object. The new request instructs the mpService 104 to retrieve the external Google Place Records based on the set of included Slice Relationship Records.

The mpService 104 queries the Google Place database for each Place in the new Slice and returns it to the mpClient 108. The mpClient 108 now automatically displays more detail for the Places, in the zoomed view. The routine can allow developers to create highly customized strategies for optimizing different database queries, for data that may be aggregated or linked.

Computed Slices can use aggregated data that was merged, joined or collected from multiple third party databases. The mpClient 108 can issue a single request for more detail regardless of which database each Primary Record is related to (e.g., A user may have merged his Facebook™ check-in history with his Foursquare check-in history.) A single Slice object can aggregate this data into a single list.

The time and GPS estimates can be based on data that crosses different databases, resulting in a more accurate estimate of a user's location at a given point in the past than could be generated by examining any one of datasets independently. This is true even when some of the databases records contain partial and inaccurate information. Moments that were collected from different sources such as mpDB 102, Google Latitude™ history, Garmin GPS Tracks™, Foursquare Check-ins™, or GPS-Enabled photos on Flickr™ can be mixed into a single Slice object and organized for simultaneous display. Moments that have no GPS Values can utilize the user's Moments on other services to create highly accurate GPS estimates (e.g., using a person's Google Latitude™ information to geo-tag a user's Twitter™ messages.)

The large and intensive database queries and calculations can be done on servers deployed in the cloud so that a Client that is running on a smartphone with a slow data connection can still request large and complex database lookups, analyses and estimations.

Since the data inside the Slice can contain relationships and Weak Links to a user's social network (e.g., Facebook™, Foursquare), the mpService 104 can improve its analysis of a user's Slice by examining related data that may not be present inside the Slice. This examination improves the accuracy and increases the level of detail for the information in the Slice.

Since requests are routed through the mpService 104, the mpService 104 can optimize queries to third party databases by utilizing a central shared cache. A shared cache reduces the overall amount of transactions that all users may place on a specific third party database. A cache also reduces license fees paid and can prevent the mpService 104 from exceeding rate limits that may be imposed by the third parties.

Unlike other platforms that may be specific to analyzing either GPS encoded information or analyzing a user's social graph, myPlanit™ intelligently combines both activities together. This combination offers the potential of great insight into how a user's online behavior relates to their real world behavior in time and place.

This method can utilize the social graph information to minimize the need to use expensive or slow Geocoder Services.

Data analysis engines can also use the GetSlice routine. For example:

A data engine is required to test if there is a potential correlation between two or more sets of data and needs to retrieve Slices based on its test criteria. The data engine can request that the mpService 104 retrieve detailed versions of each Slice that may require correlated data across many different sources such as a user's social graph, Venue Database Services, websites and other external databases.

The resulting Slices can be returned to the data engine for analysis.

In an embodiment, similar data in two or more Slices is automatically determined if a user may not know what is common amongst two or more Slices and may not be able to discover them by displaying the two Slices on the same screen.

In an embodiment, the system can automatically discover similarities amongst any two or more any two Slices without requiring any user input or data manipulation in order to aid them in discovering unknown commonalities, including, for example: the user selects two or more Slices; the user submits a request to "automatically compare" the various Slices; the mpClient 108 submits the Slices to the mpService 104 for analysis; the mpService 104 performs statistical analysis of the content of each Slice looking for common Records, attributes, tags, activities, moods, trends or other similarities amongst the Slices.

The mpService 104 uses the results to generate a list of potential common factors amongst the Slices. These may include factors such as: Places, People, Events, Tags or Moments that are identical in all the Slices; a list of common "attributes" discovered amongst the various Slices, such as common or similar activities, moods, Place types (e.g., beaches, restaurants, golf courses, etc.), categories or Tags; Moments and Events that occurred close in time; Primary Records that are close to each other in geographical proximity.

The mpService 104 uses each potential common factor to create a pair (or a set, if more than two Slices) of subsets of data and generates a "score" for each pair (or set, if more than two Slices) of subsets, based on how similar or how related the two subsets are. If the computed score is high enough, a pair (or a set, if more than two Slices) of new Slices is created based on the subsets found.

The mpService 104 returns a list of common factors, a score, and a pair (or a set, if more than two Slices) of Slices for each common factor on the list. The mpClient 108 displays the results to the user. The user can examine each common factor separately by examining the pair (or a set, if more than two Slices) of Slices together on the display. Alternatively, the user can examine multiple common factors simultaneously by displaying multiple pairs (or sets, if more than two Slices) of Slices.

The user can store the returned Slices as new Lists in the mpDB 102 or append the Slices to existing Lists. The Lists can be shared with other users, exported as data feeds, and embedded inside websites via an embedded web widget.

In an embodiment, this particular method when used with the other elements of myPlanit™ allows individual end users the ability to discover details about their world by themselves and without needing to be a statistician. When this method is utilized on Slice data that is shared between users and/or imported from third party databases, it enables consumers to discover new facts and insight about themselves, their friends, their community and the world. This offers consumers the ability to discover and share new insights about human relationships and behaviors.

A user can now discover insights about themselves using their own personal data. This can be especially useful if users want to gain insight into highly personal details about themselves, regarding, for example, their health, habits, relationships, private activities, and personal intimate moments. They can share these details with whom they wish (e.g., their doctor, their spouse, etc). They can compare themselves with shared data from friends or with publicly available data without having to give up their personal privacy.

Figure 12:
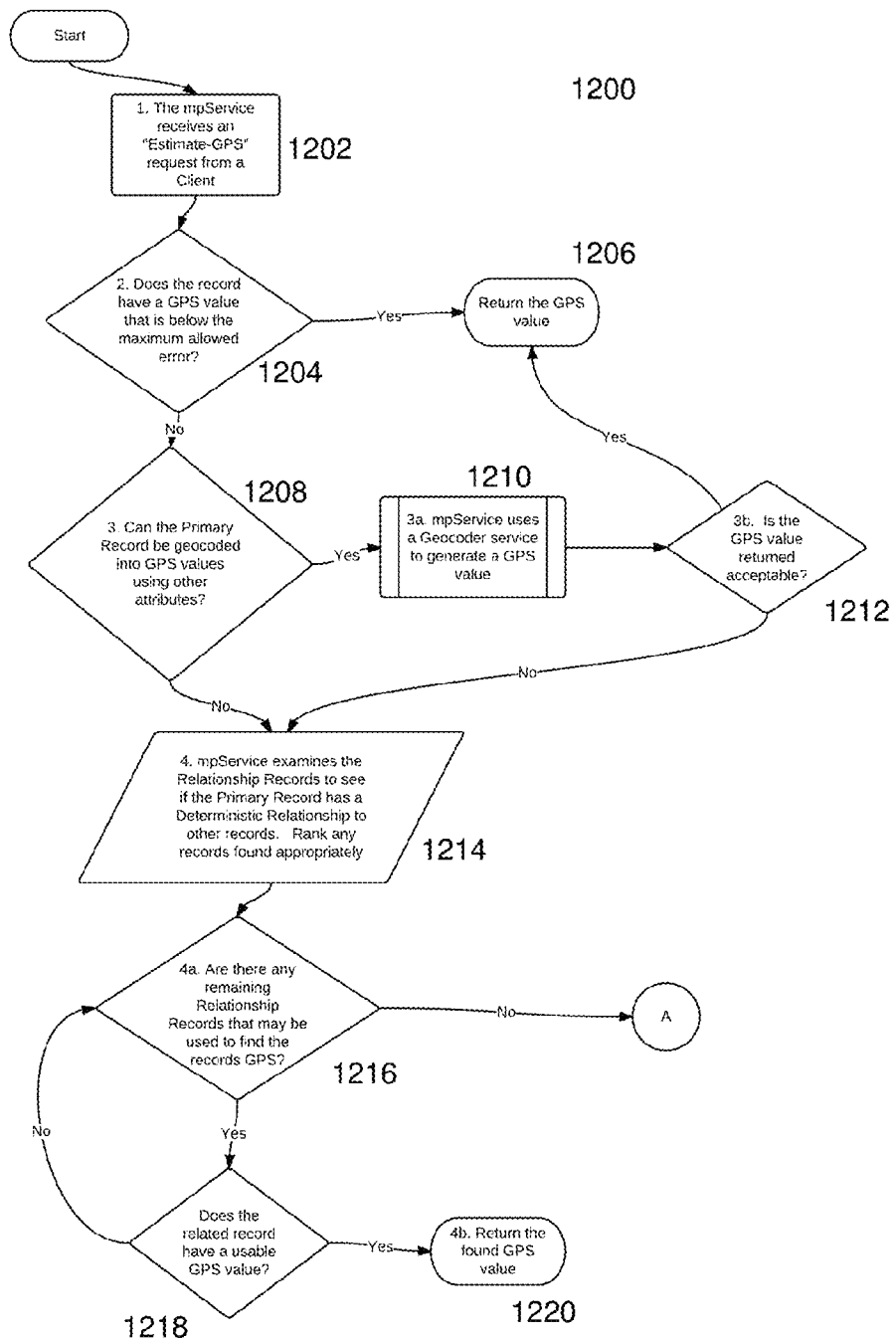
FIG. 12 illustrates an exemplary method for estimating a Primary Record's GPS value, according to an embodiment of the present invention.
Figure 13:
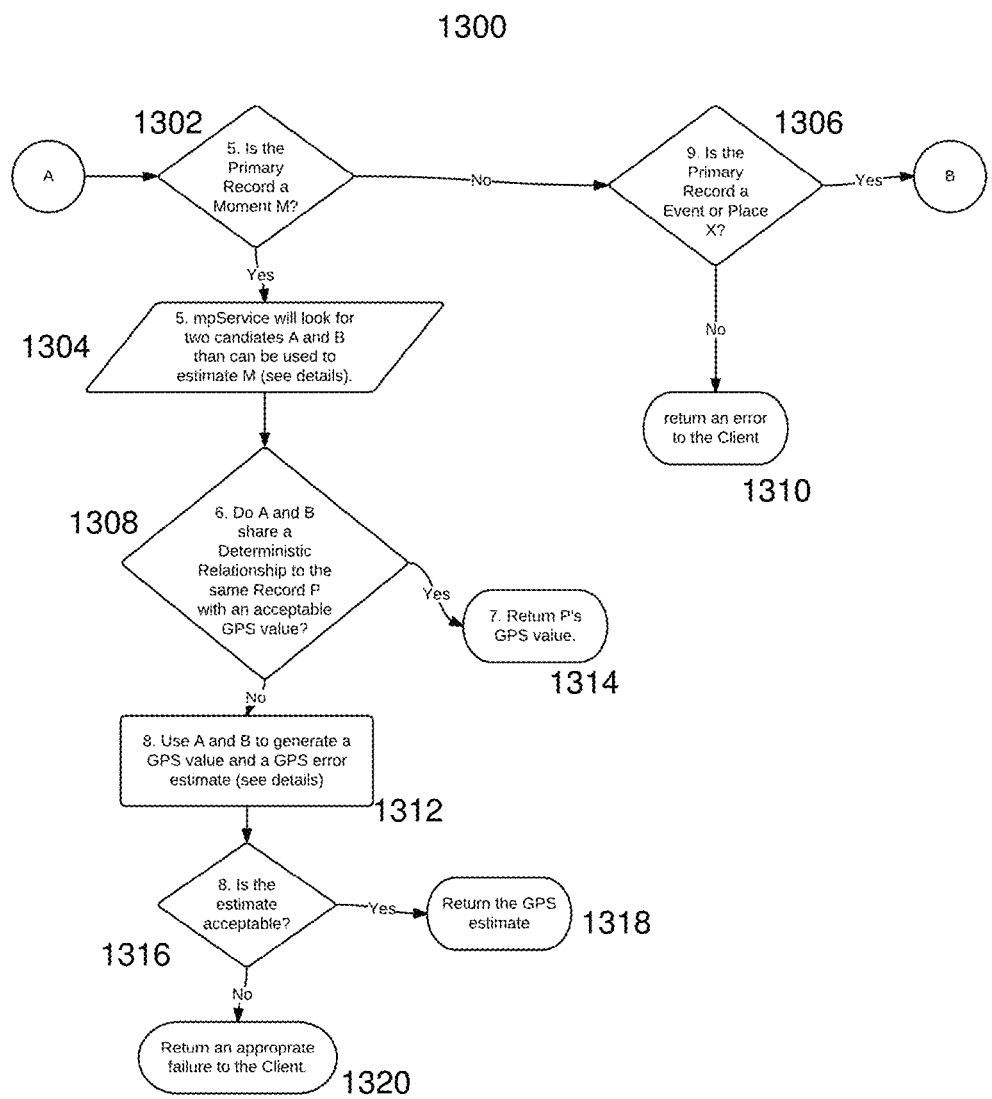
FIG. 13 illustrates an exemplary method for estimating a Primary Record's GPS value, according to an embodiment of the present invention.
Figure 14:
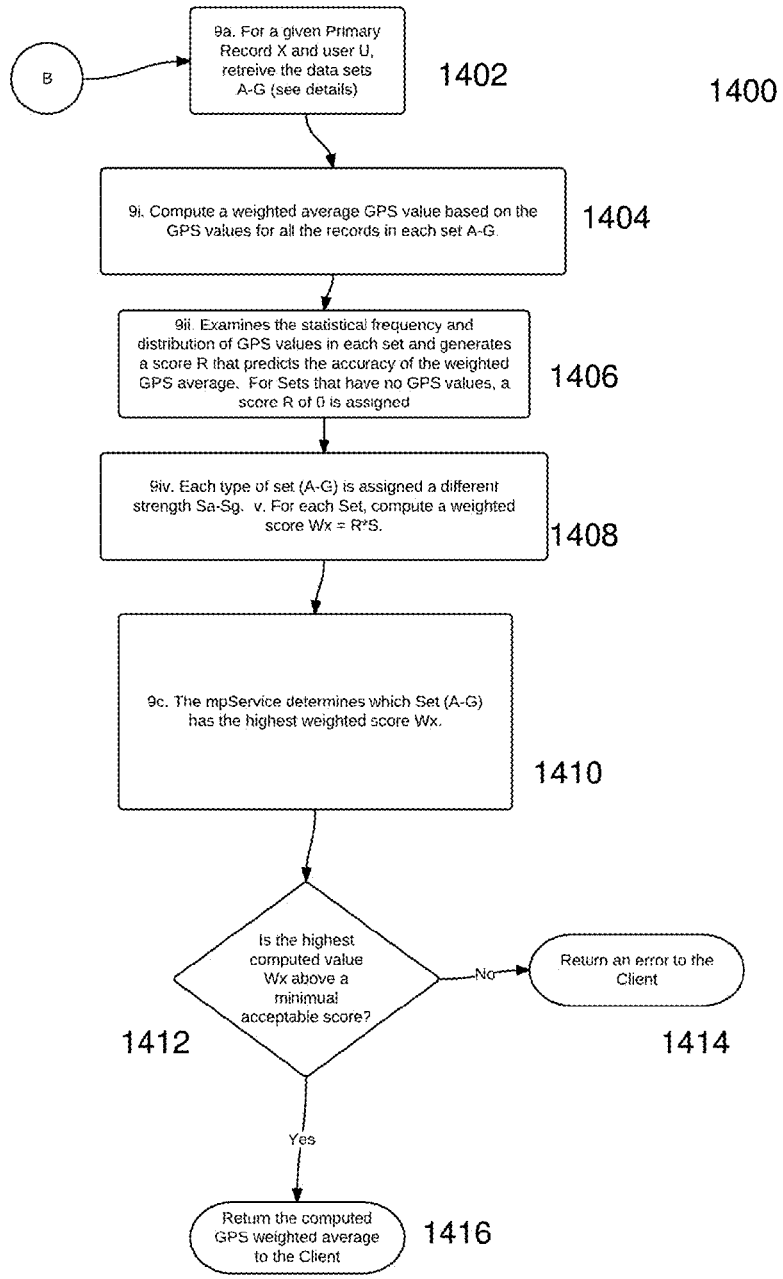
FIG. 14 is an exemplary method for estimating a Primary Record's GPS value, in accordance with one embodiment of the present disclosure.

FIGS. 12, 13, and 14 illustrate methods 1200, 1300, and 1400 for estimating a primary record's GPS value, according to an embodiment of the present invention.

In an embodiment, a method of Estimating a Primary Record's GPS Value if some of a user's Primary Records may not contain a recorded GPS Value, or the GPS Value that it contains was recorded at an unacceptable error value. This makes the record difficult to display on a Map, and it also makes it difficult to find related content based on the record's GPS location.

In an embodiment, a combination of the Primary Record's original recorded GPS Value (if available) and its Relationship Records is used to examine the GPS Values of other related Primary Records. The Primary Record may have relationships to records in the different databases (e.g., mpDB 102 and Facebook™.) The Primary Record may be related to the Primary Records of other users. The Primary Record may have some attributes that can be used with a Geocoder Service to estimate a GPS Value.

In an embodiment, in block 1202, the mpService 104 receives an "Estimate-GPS" request from a Client. The requesting Client may include: a Primary Record to be estimated; a list of Relationship Records for this Primary Record; any required user account information, including the user's authorization information for any required third party databases; a maximum allowed GPS error value.

In addition to the values included in the request by the Client, the mpService 104 may use some additional configuration data, for example: a list of "Deterministic Relationship Types" ranked from "best" to "worst". A Deterministic Relationship Type is a relationship type that is used by a Primary Record to get an accurate GPS Value of its location. If a Primary Record X has a Relationship Record to Y that is of a Deterministic Relationship Type, then X and Y have a "Deterministic Relationship" and the system can use Y's GPS Value for X's GPS Value. No estimation is required. No estimation is required. The ranking allows for different types of relationships to be used, but some are considered "more" deterministic than others (e.g., a Moment does not have a recorded GPS Value, but it has an "occurred" at" relationship to a Place Record. The "occurred at" relationship type may be considered definitive and may be used for the Moment's location.); and a ranking of databases. Some Primary Records may have multiple Relationship Record candidates of the same Deterministic Relationship Type but pointing to different databases. Some databases, however, may contain a higher quality dataset and therefore, are preferred over other databases. The ranking allows the mpService 104 to choose which database to query first.

In an embodiment, in block 1202, if the Primary Record's GPS Value has a recorded error estimate that is at or below the maximum allowed error, then in block 1206 the mpService 104 may return GPS Value to the requesting Client and exit this routine (steps on this list). In an embodiment, in block 1208, the mpService 104 examines the Primary Record's data attributes to determine if it can be potentially geocoded into GPS Values (e.g., the record has values for Address, City, State, etc.). In an embodiment, in block 1210, if there are enough attributes with values that can be geocoded, then the mpService 104 sends a request to a Geocoder Service to generate a GPS Value. The Geocoder Service may return a potential GPS Value along with an estimate of error or may return a failure.

In an embodiment, in block 1212, if the Geocoder Service returns a GPS Value, then the mpService 104 examines the returned "estimate of error" for the GPS Value. If the "estimate of error" value is at or below the maximum allowed error, then the mpService 104 may: add this GPS Value to the Primary Record and update the Primary Record's database with the GPS Value; and return the GPS Value to the Client and exit this routine.

In an embodiment, in block 1214, the mpService 104 examines the Relationship Records to see if the Primary Record has a Deterministic Relationship to another record. If a Primary Record has more than one Relationship Record with a Deterministic Relationship Type, then the mpService 104 ranks the Relationship Records using the ranking of Deterministic Relationship Types defined above. If two or more Relationship Records are of the same ranking, then the mpService 104 examines each Relationship Record's target database and uses the "ranking of databases" that was included in the Client's request to rank them.

In an embodiment, in block 1216, the mpService 104 uses the highest ranked Relationship Record to retrieve a related record. If no valid GPS Value is found on this related record, then the remaining Relationship Records are used one after another in the computed ranking order to retrieve more related records until a valid GPS Value is found. In an embodiment, in blocks 1218 and 1220, if a valid GPS Value is found, then the mpService 104 returns the GPS Value to the Client and exists.

In an embodiment, in block 1302, the for a Moment M that was created by a user U that needs a GPS estimate, a GPS Value can be estimated by using a pair of Primary Records A and B that have Date-Time Values that are before and after M's Date-Time Value. In block 1304, the mpService 104 looks for two Primary Records A and B that meet the following criteria: A and B are either Primary Records that were created by U or they are Primary Records created by another user that contain a tag or attribute that indicates that U was present; A and B have valid GPS Values with acceptable error estimates or have a Deterministic Relationship to another Primary Record with an acceptable GPS Value; A occurs before M occurs; there is no other acceptable candidate for A that occurs after A but before M; B occurs after M occurs; there is no other acceptable candidate for B that occurs after M but before B.

In an embodiment, in block 1308, if A and B are found, then the mpService 104 checks if A and B both have a Deterministic Relationship to a Primary Record P with a valid GPS Value. In an embodiment, in block 1314, if P is found, the mpService 104 returns P's GPS Value to the Client and exits. In an embodiment, in block 1312, if P is not found, the mpService 104 estimates a GPS Value for M using A and B as follows: assume that the user left A's GPS location at A timestamp and was traveling at a constant speed toward point B's GPS Value with a predicted arrival time of B's timestamp; estimate the user's position at M's timestamp; set the initial error GPS estimate of M to the maximum estimated error of A and B; increase the estimated error of M's GPS Value based on the difference in A's and B's time. The computed numerical increase should use a statistical sampling based on some real world history of this user and/or of other users; and increase the estimated error of M's GPS Value based on the distance between the GPS Values of A and B. The computed numerical increase should use a statistical sampling based on some real world history of this user and/or other users.

In an embodiment, in blocks 1316 and 1318, if the computed error estimate is acceptable, then return the estimated GPS Value to the requesting Client and exit. If the estimate is not acceptable, in block 1320 return an appropriate failure to the Client.

In an embodiment, in block 1306, for a given Event or Place X created by a user U, the mpService 104 queries and in block 1402, retrieve the following sets of related Primary Records: Set A: All Moments created by U and are related to X; Set B: All Primary Records that were created by other users (not U) that are related to X and are also related to user U (this finds other users' data when those other users tagged that they were with User U at X.); Set C: If X is an Event, then retrieve all Moments created by U with date-time stamps between the beginning and end time of X. This finds Moments that user U created during these date-time stamps, but unlike set A, this set includes Moments that may not have a relationship to X; Set D: If X is an Event, then retrieve the latest Moment created by user U before the beginning of X and earliest Moment after X (e.g., Moments recorded by this User just before and after the Event.); Set E: All Primary Records that were created by other users (not U) that are related to X. This strategy involves using other users' Moments linked to X that may or may not have been tagged to user U; Set F: Any geocoded value for X (of any quality.); Set G: The union of all sets A-F above.

In an embodiment, for each set of records found (A-G), the mpService 104 does the following: in block 1404, compute a weighted average GPS Value (e.g., a simple average or more statistical complicated average can be computed) based on the GPS Values (and their error estimates) for all the records in each set. In an embodiment, in block 1406, examines the statistical frequency and distribution of GPS Values in each set and generates a score R that predicts the accuracy of the computed weighted GPS average. For sets that have no GPS Values, a score R of 0 is assigned.

In an embodiment, in block 1408, each type of set (A-G) is assigned a different strength Sa-Sg. Sx is a numerical value that predicts a how accurate this particular 'set's weighted average is at estimating a user's location. In an embodiment, in block 1410, for each Set, compute a weighted score W=R*S. In an embodiment, in block 1412, the mpService 104 determines which set (A-G) has the highest weighted score Wx. In block 1416, if Wx is above a minimal acceptable score, then use the weighted average GPS Value for that set. Return this GPS Value to the Client. In an embodiment, in block 1414, if Wx is not above a minimal acceptable score, then return an error to the Client. Also, if the Primary Record is not an Event or Place X, in block 1306 return an error to the Client.

In an embodiment, this method determines the location of some of a user's records by using the GPS Values of other data. Since the related records can be in different databases, including third party databases, this method allows a seamless and easy way to determine the best GPS Value to use. This method can also use GPS Values stored in venue databases like Google and relate them to Primary Records.

In an embodiment, this method can be enhanced by using a venue database aggregator that can create a set of Relationship Records for each Place so that the algorithm can use three different sources to get information about X (e.g., Foursquare™, Google Places™, Facebook™, etc.) For example: a user creates a Moment M that includes a check-in to Foursquare™ at Place X; a database aggregator creates a record in the mpDB 102 for Place X and creates three Relationship Records for X of relationship type "is" each pointing to three different databases: Foursquare™, Google™ and Facebook™.

When importing and displaying Moment M, the algorithm can use the database ranking Google's™ GPS Value for place X, even though the original check-in was using a Foursquare™ venue database.

In an embodiment, this method mixes social graph information, statistical sampling of historical data, and a Geocoder Service to create an optimized single query to determine the highest quality GPS Value to use.

Since Moments can use their "check-in" relationships to Place Records to retrieve a GPS location, the GPS Value for a Moment Recorded in the past improves if the GPS Value in the Place Record is updated to a more accurate value after the Moment was recorded.

In an embodiment, the method enables one to automatically identify common behavior between large sets of Primary Records. It is valuable to be able to identify common statistical trends that occur between people or groups of people, such as predicting the statistical likelihood of a person to perform a given activity, go to a specific Place or type of Place in the future, or enjoy a new activity that they have never done before. It is also valuable to be able to create insight into the transactions that users are performing. It is easy to create customized queries for asking specific questions, but without performing a deeper statistical analysis, some trends, related behaviors and other user insights might not be quickly recognized. It is valuable to be able to recognize trends and changes in people's behavior that might represent a rise or fall in popularity of a particular type of user transaction, type of activity, type of Event or type of Place. It is also valuable to be able to discover new common correlating behaviors. The following is a list of examples for discovering new common correlating behaviors: How effective was a specific type of offer or advertisement at getting the user to go to a Place or an Event? What are the most common types of user transactions performed? If a user performs a transaction of a given type in a given type of location, then what other transactions is he likely to perform and when and where is he likely to perform them in? Detecting users' sentiments and relating them to what they were doing and when they were doing them.

In an embodiment, the mpService 104 executes daily, weekly and monthly batch processes that perform analysis on all of the transactions in the system. The batch processes can perform many different types of analyses, for example: Identifying popular (or unpopular) Places, Events, People, activities, moods, topics, types of Places, and types of Events.

In an embodiment, the batch process can also perform: Identifying pairs of correlating factors that can assist in predicting future behavior (e.g., a user's likelihood to visit a certain Place, type of Place, perform and/or enjoy a certain activity based on this user's history.)

In an embodiment, the batch process can also perform: Identifying Places, Events, People, Moments, Lists, media, commercial offerings that this user may enjoy based on comparing the user's history, his location, and his plans for the future (his future to-dos, Events, Places, etc.) against the behavior of people with similar demographics or profiles.

In an embodiment, the batch process can also perform: Generating a list of suggestions of Places, Events, commercial offers (coupons, ads, special offers, etc.), content, services and activities for this user for the present or the future.

In an embodiment, the batch process can also create notifications that could be sent to the user (e.g., via Email, SMS, alerts within the mpClient 108, etc.) based on the list of potential suggestions and offers.

In an embodiment, the batch process can also use the list of potential suggestions and offers to connect the user to businesses and/or create or suggest services, customized commercial offers and other types of commercial speech.

In an embodiment, the batch process can also generate potentially new, unknown relationships between different sets of recorded data, across subsets of or all users.

In an embodiment, the batch process can also identify common transactions, places, activities and other human behaviors, and identifying the common demographic factors of the people who engage in them, when they tend to be performed, with whom and at what types of places.

In an embodiment, the batch process can also test whether newly discovered relationships can help predict which transactions, activities, places and other human actions a user is likely or not likely to do or enjoy.

In an embodiment, the batch process can also generate various "heat maps": visual representations of the earth or regions of the earth with concentrated data points that may represent different people, activities, events, tags, topics, trends, and sentiments that existed or occurred or may exist or occur at a specific point in time or period of time.

A mathematician or statistician that is one of ordinary skill in the art can recognize that a number of statistical methods can be used to generate such analyses as described above.

In an embodiment, myPlanit™ is uniquely capable of mixing private data, shared data and public data because of its ability to perform a unique type of "dynamic web crawl" that can reach across the social and semantic graph of the Internet in order to collect a very specific sliver of related data. The mix of this specific data schema, the schema's ability to represent a wide range of online and offline behavior, and the ability for it to be linked to external databases collectively offers a unique ability to build analysis tools that can: dynamically query two or more large external databases for a set of data that has known relationships between all the elements; dynamically discover relationships and correlations between two or more large sets of data. The myPlanit™ system is especially adept at discovering time and location based relationships and correlations; dynamically compare the data across many dimensions: time, GPS, place, event, user, and attribute; discover causal relationships (as opposed to just simple correlations) between two or more large sets of data to predict future behavior; and dynamically create and share datasets that link together data records on different databases, different social networks, or different websites.

In an embodiment, an exemplary method enables a Primary Record, a List or an Auto-List to be embedded into an existing Website when, for example, users may have content in an mpDB 102 that they wish to display on an external website. For example, the content may include details about an Event they want to publish, a Place they wish others to go, a Person's contact detail or a Moment they want to share. They may wish to embed the entire content of a List or Auto-List in an external website. They may wish to embed this content on a blog, on a commercial website, in a status message, in an email message, in a banner advertisement, or on any other web based or digital communication modality.

Copying or exporting data from the user's mpDB 102 into another document is of limited value, since the user may only be able to display the data as static information that is the information that exists at the moment that the export was made. Such information cannot be automatically, dynamically updated with any changes that are later made to such information.

In an embodiment, a method embeds analytic logic that can track how often this specific content is viewed and interacted with by people viewing the content ("Viewers") and users, even when embedded on third party Clients and websites (e.g., embedding Google Analytics™ code.) The method is can transmit a specific referral code to an external website or link when a user clicks on such website or link so that the external website can verify that the traffic originated from this specific set of content (e.g., transmitting an iTunes™ store referral code to the iTunes™ store.)

In an embodiment, analytics and referral logic enables cash, merchandise, prizes, commissions, special treatment, airline miles, discounts, virtual experience points, virtual badges, and any other type of reward can be tracked and calculated as it is related to any advertisement, commercial speech, referral or other type of content that may be displayed to the Viewer. The rewards may be owed to a particular user, myPlanit™ Inc., its business partners or some other entity or individual.

In an embodiment, an mpClient 108 is embedded into a third party website or Client. By embedding a piece of logic into an HTML document, the user can embed a version of the mpClient 108 on their external site so that Slice content can be viewed and interacted with by Viewers as well as dynamically displaying the latest information.

The user uses the mpClient 108 to create or import Slice data into their mpDB 102. The Slice may be composed of Primary Records that they created themselves or it may be composed of Primary Records that have been imported or linked from third party databases.

The mpClient 108 exposes a method to allow the user to invoke an "embed this" operation on any Primary Record, List or Auto-List in the mpDB 102.

The "embed this" operation displays a set of options to the user to control how the embedded content may be displayed to a Viewer. The display options may include: the size and shape of the frame that may display the embedded content; the ability to choose icons, colors, fonts and/or visual themes to control how the content may look; a Cascading Style Sheet (CSS) file or a set of CSS entries that may be used when the content is displayed; the ability to add additional text, photos, videos or other web-enabled media to the content; the ability to select one or more user interface views such as a map, a textual list or other visual display of the embedded content; the ability to choose the layout and location of user interface elements; and the ability to define which Primary Record attributes may be displayed (e.g., only show the venue names and addresses of Place Records) and the map display attributes (e.g., zoom level, street view, etc.)

The mpClient 108 displays a set of options to the user that allow the user to embed certain types of analytics and referral logic, such as:

Options to embed myPlanit™ defined or third party defined referral codes and logic. The referral codes and logic may be used for the user to track different sorts of activities done by a Viewer of the embedded content. This could include tracking the following: banner ad or other interactive content click-throughs or other interactions if and when a Viewer clicks on or otherwise interacts with a link; how often a link, a banner ad, a Primary Record, a List, an Auto-List or any other interactive content is displayed; purchases made by the Viewer or some other action a Viewer may perform while the Viewer is interacting with the embedded content; purchases or some other action a Viewer may perform on another website that was linked to from the embedded content; and purchases made or other activity performed by a Viewer at a Place or an Event listed in the embedded content and such activity is tracked by the mpClient 108.

Options to embed myPlanit™ defined or third party defined analytic codes that can assist in tracking how often the content has been displayed or interacted with and by whom. For example, the user may be able to add their Google Analytics code to enable the full set of features offered by Google Analytics as it relates to tracking Viewers of the embedded content.

The mpClient 108 displays a set of privacy options that may be applied to the embedded content such as: options for what types of user accounts can view the content. Some content may require the Viewer to have a myPlanit™ account and/or an account on a third party service; options to restrict the content to be viewed only by a specific set of people or a defined list of friends; options that cause different versions of the embedded content to be shown to different Viewers. Some Viewers of the content may see a reduced set of attributes or records based on the privacy settings of each record in the content (e.g., Facebook™ does this with shared content, allowing some messages and content to be viewed by close friends, but other friends receive only a subset of content.)

The mpClient 108 displays a set of options to the user to control which embedded content may be displayed to a Viewer. The options may include: the ability to enable or disable advertising within the content; for each Primary Record in the content, the ability for a user to restrict some of the record's attributes from being included in the content.

The ability to select if related records or related media that link to this content should also be included. For example, for any Place Record included, the user can choose to include details such as: recent or upcoming Events at this Place; Moments recorded at this Place; Moments recorded at this Place by friends of the Viewer; People who have been to this Place or who plan to go; and friends of the Viewer who have been to this Place or plan to go.

For any Event Record included, the user can choose to include: Moments recorded during this Event and to-do's related to this Event.

The user can select if they want to automatically embed a set of third party add-ins or widgets to the content (e.g., "Facebook™ Like Add-in", Google Analytics™ widget, Google Adsense™ widget, Vimeo™ or YouTube™ embedded video, etc.) These can be generated by the mpClient 108 on behalf of the Viewer and automatically included in the generated object.

The user can select what sort of commands that at a Viewer may be allowed to perform on the content such as: viewer can add any of the content to the Viewer's mpDB 102; the Viewer can add any of the content to one of the Viewer's Lists stored in the Viewer's mpDB 102; the Viewer can subscribe to any List or Auto-List displayed on the content; the Viewer can retrieve directions; the Viewer can forward the content to other people (e.g., forward by email, SMS, electronic message or notification, etc.); the Viewer can invite other people to an Event; the Viewer can RSVP for any Event (accept/decline/tentatively accept.)

After the user has entered all of his options, the mpClient 108 displays a version of the content to be embedded to the user.

The user now selects one of the following: cancel the entire command; alter any of the settings; verify and generate the code.

The mpClient 108 may store the selected options in the mpDB 102 and then generate a unique fragment of code that is capable of generating the content. In most embodiments, this fragment of code may be one of the following: one or more HTML defined <script/> objects. In an embodiment, this script object defines a set of parameters and also includes an src tag that points to a=piece of JavaScript; and one or more HTML define <iframe> objects. In an embodiment, the iframe object may have an src tag that points to an external webserver that generates the requested content.

In an embodiment, slice content can be viewed by displaying the code fragment to the user; or the user adds the code fragment to his website or third party Client.

Instead of using the previous method, a third party Client can execute a script or API command directly via the mpService 104 without needing to use an mpClient 108. Each of the supported options defined above is exposed through a defined API. The Client can issue the request via an HTTP Web API request (similar to a Facebook™ Open Graph request.) The Client can also execute the request as a JavaScript™ routine (similar to the method used by Google Analytics™.) The API command generates the code fragment described above.

Alternatively, a third party Client can issue one or more JavaScript operations to invoke and embed an mpClient 108 object directly within the third party Client without having to generate a code fragment first (e.g., similar to the method used to embed and display a map via Google Maps™ API v3.0 for JavaScript™.)

In an embodiment, a method for displaying an embedded mpClient 108 on a third party website or Client includes, for example: when a Viewer looks at a website or Client, such website or Client executes the code fragment to invoke the embedded mpClient 108; the embedded mpClient 108 retrieves and displays the content from the mpService; if the Viewer is also a myPlanit™ user, then the embedded mpClient 108 can automatically authenticate the user via a defined cookie stored in the user's web browser; if the content can only be viewed by a myPlanit™ user, then the embedded mpClient 108 displays a preview of the content with a "log into myPlanit™ to see more"; and if the Viewer logs in with an existing or new account, then the mpClient 108 is updated to display a more complete version of the content.

An embodiment of the mpClient 108 is now displayed inside the embedded website. It may include all or just some of the various mpClient 108 features and commands.

The embedded mpClient 108 may initially display the requested content as defined above. Examples of some of the content displayed by the mpClient 108 include the following: a Primary Record (Person, Place, Event, Moment, Tag, Unstructured Data) and any related Associated Media; records related to a Primary Record; a map displaying Slice contents; a map displaying the contents of multiple Slices; a calendar view displaying Events and/or Moments (e.g., day, week, month, year, agenda views, etc.)

If configured to do so, the mpClient 108 then displays a set of commands to the Viewer. Some of the commands may be related to the content displayed. Examples of some of the commands offered by the mpClient 108 include the following: add a Place to the user's mpDB 102; add an Event to the user's mpDB 102; RSVP to an Event or request to be on an Event's waiting list; add a to-do to the user's mpDB 102; add a coupon, voucher, other offer to the user's mpDB 102; add an upcoming sale as an Event to the user's mpDB 102; add a reminder to the user's mpDB 102 of an upcoming Event, sale, offer or other discount. The reminder can trigger at a certain time or it could trigger when the user is nearby a Place related to the reminder; add a Person to the user's mpDB 102; add an item to a List; subscribe to a List or an Auto-List of add a List or Auto-List to my myPlanit™ subscriptions; compare this content to a List in the user's mpDB 102; get the URL of a data-feed for this data (e.g., RSS, Atom, iCalendar); download a vCard, vEvent or iCalendar event for a Place, Person, Event, or Moment; share an item with another person; purchase a ticket to an Event (e.g., movie tickets, theater tickets); make a restaurant reservation; purchase books, music, videos, related media, airline reservations, car rentals, hotel reservations or other related merchandise, services or media related to one or more of the items displayed; find other People, Places, Events, Moments, Tags related to an item displayed; find other People, Places, Events, Moments, Tags nearby to an item displayed; find other People, Places, Events, Moments that are on the same day, week or month as an Event or Moment listed; get directions to a location related to a Primary Record displayed; and any other mpClient 108 feature, command, display or operation If the Viewer selects a command, the mpClient 108 determines if the Viewer is a myPlanit™ user in order to perform the command. If the command requires the Viewer to be logged into a myPlanit™ user account and/or to be logged into a third party account (e.g., Facebook™, Twitter™, etc.), then the mpClient 108 may verify that the Viewer is logged into the required account(s) before it executes the requested command. If the Viewer is not logged into the required account or accounts, then they may be routed to a page to login or to create a new account as needed.

In an embodiment, some of the requested commands may be able to be executed within the embedded frame or widget on the existing website; may require the Viewer to be transferred to an mpClient 108 running in a full web browser, which may require the user to leave the original website; or may require the Viewer to be transferred to a third party website or to a different embodiment of an mpClient 108 embedded in a third party website.

In an embodiment, the exemplary method allows a user to simultaneously embed a mixed set of People, Places, Events and Moments. The ability to mix different types of data offers a tremendous amount of different use cases, such as: creating and sharing an itinerary of future events, Moments or destinations (e.g., trip, concert tour, sports team's schedule, etc.); creating and sharing a history of events or Moments in the past (e.g., historical events, a personal history of a trip); and creating and sharing media related to shared events in real-time.

Most embedding techniques today allow you to include a specific set of data of a singular type: a single video, photo, or event, etc. These techniques may allow the data to be viewed and shared, but they do not offer the rich full set of interactivity that the above method affords. With myPlanit™, the information is viewable, actionable (mapping, directions, calendaring, etc.) and shareable, and it is also importable to a user's personal data so that a copy, a subscription, and/or a comparison to other data can be made.

Figure 15:
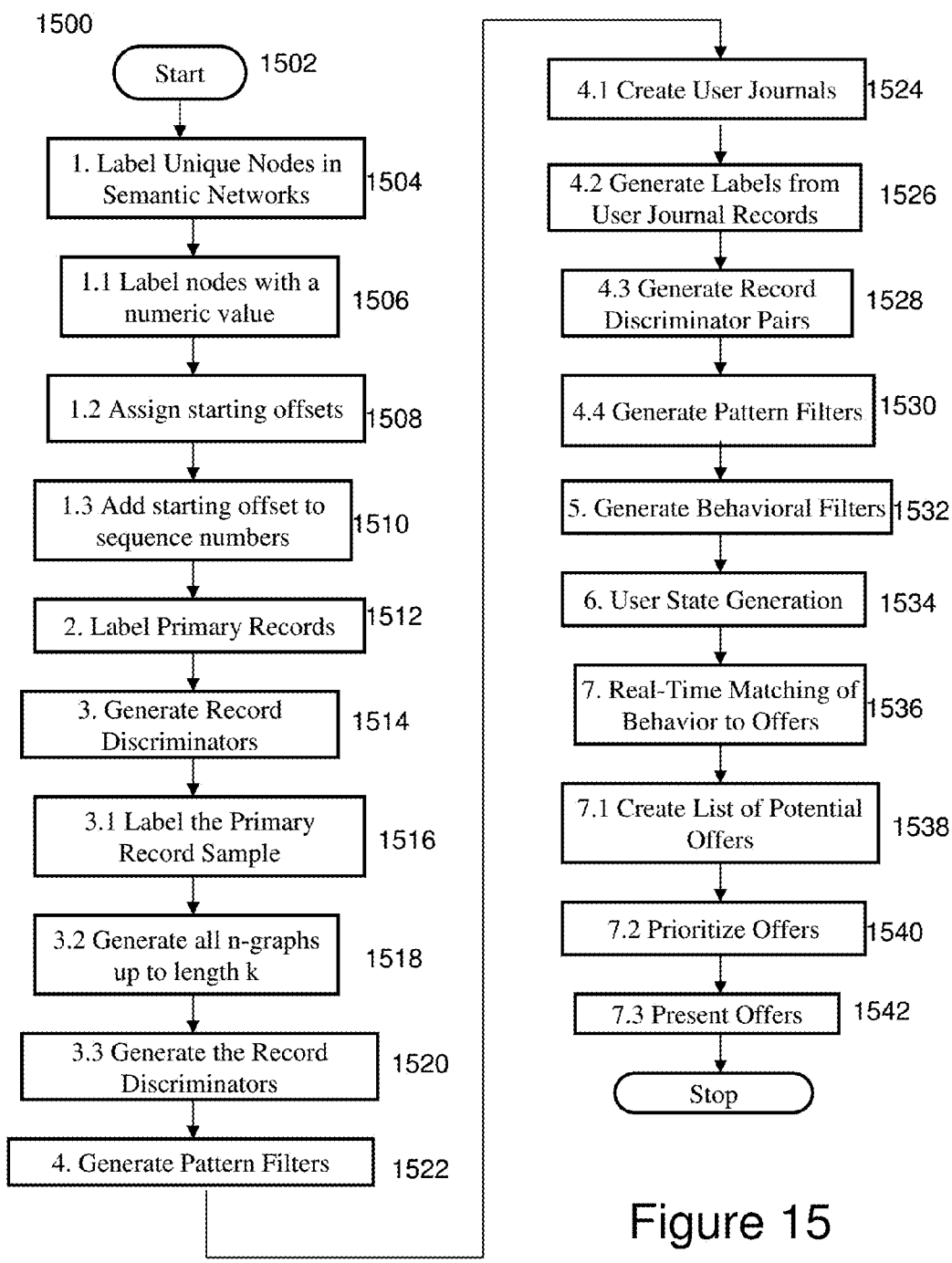
FIG. 15 illustrates is a flow diagram illustrating one embodiment of a method of a prediction algorithm, in accordance with an embodiment of the present disclosure.

FIG. 15 illustrates a method 1500 for analyzing patterns across a broad set of domains and produce an analytic result of solicited and unsolicited decisions, recommendations and plans based on input across multiple domains, the data from which are integrated and interconnected through individual life experiences, according to an embodiment of the present invention.

In an embodiment, the exemplary method enables some trends, related behaviors and other user insights to be recognized a timely manner to provide value to the user and potential marketers who want to provide value to that user. It is valuable to be able to recognize trends and changes in people's behavior that might either a) represent a rise or fall in popularity of a particular type of user transaction, activity, Event or Place or b) indicate potential future behavior or desires. It is also valuable to be able to discover common correlating behaviors and identify common statistical trends that occurs for a specific individual, amongst a specific set of people or across certain groups of people, such as predicting the statistical likelihood of a person to do something, such as perform a given activity, go to a specific Place or type of Place in the future, use a coupon or service or enjoy an activity that they either have or never done before.

Today, there is an overload of information and a tremendous amount of inputs. The information related to an individual's life is strewn across various online and offline tools (ex: "who's" are in address books, "when's" are in calendars, "where's" and "what's" are everywhere). The disaggregated nature of information loses its value and individuals and marketers ability to understand the full context of any given life experience (ex: a user is at a café in Rome (where) with their friend (who) on their vacation (when=Event) having a great pizza (what)), and then even more so, the aggregate of such life experiences and an individual's overall needs, desires, behaviors, interests, and footpath.

Moreover, today, it is either difficult or incredibly time-consuming for people to discover services and information, such as suggestions as to new behaviors or experiences, commercial or other offers of goods or services, including e-commerce and advertising, and other recommendations for services (ex: traffic, weather, premium features, turn-by-turn navigation, and any other digital utility or service), Events, Places, People, Moments (ex: activities, things, experiences) (all such services and information, "Offers"), that are of interest or relevant to them or is what they need to fulfill their needs, desires and goals as, when and/or where they need it. When people do find this information, it is because they searched for it or had to set some sort of alert (ex: "liking a place") and not because it was proactively presented to them. Moreover, the Offers are not proactively presented to them based on where they may be going at some given point in the future, for example, based on a calendar appointment they have next week.

Finally, when looking across a large population of people, current "decisioning" systems do not nor are not able to take into account all the data that comprise the full context of life's experiences (who, what, when AND where) as most focus on one or two aspects at best. Thus, currently, we are unable to analyze the complete intentions of a large population based on prior behavior.

In an embodiment, the method below describes a universal, cross-domain analysis, decisioning, recommendation and Offer system. The mpService 104 performs large-scale analysis on all of the transactions in the system, using a blend of collaborative filtering techniques that discover useful patterns in the data and identifies pairs of correlating factors that can assist in predicting future behavior. This system is able to efficiently analyze patterns across a broad set of domains and produce an analytic result of solicited and unsolicited decisions, recommendations and plans based on input across multiple domains, the data from which are integrated and interconnected through individual life experiences. The "decisioning" process is capable of generating potentially new, unknown relationships between different sets of recorded data, across subsets of or all users. Effectively creating a single, robust decision domain.

The method described herein can be used for providing both solicited (results from search queries that better match the behavior pattern of the use) and unsolicited recommendations, such as notifications of nearby activities such as parties of friends, special offers in stores or restaurants, traffic or weather situations, stores that match shopping patterns, routes that match travel patterns and weather situations etc.

Specifically, the mpService 104 is able to interrelate elements from multiple domains, such as People ("who"), Places ("where"), Events/Moments ("when"), and Tags/Titles ("what"), etc. The following describes efficient and general encoding and computational methods that enable the mpService 104 to (a) classify sequences of records and (b) predict behaviors or provide recommendations for the present or the future based on sequences of past (historical) or future (planned) records (such as appointments).

In an embodiment unique nodes are labeled using generic semantic networks. In order to efficiently classify domain (such a domain may be a "who", "what", "where", "when", etc.) specific data in fields and to efficiently store this domain specific data, the mpService 104 utilizes Semantic Networks to translate domain-specific fields into an efficient numerical representation.

A semantic network, or frame network, is a network that represents semantic relations between concepts. This is often used as a form of knowledge representation. It is a directed or undirected graph consisting of vertices, which represent concepts and edges. Semantics networks, at least those with well-defined semantics, are a form of logic. A semantic network is used when one has knowledge that is best understood as a set of concepts that are related to one another. Most semantic networks are cognitively based. They also consist of arcs and nodes that can be organized into a taxonomic hierarchy.

A plethora of Semantic Networks can be used to perform this translation for any given domain, such as: language specific lexical databases, such as Princeton WordNet (ex: for "what's"); hierarchical databases, extracted from GIS systems, augmented with customized relational data (ex: for "where's"); custom rule bases or Semantic Networks providing fine grain time- and date-relationships (ex: for "when's"); social networks such as LinkedIn or Facebook (ex: for "who's"); special purpose rule bases or Semantic Networks used to extract inter-record relationships; and additional specialized "feature extraction" filters or mechanisms.

In an embodiment, Semantic networks may be implemented as a graph of interconnected nodes in memory, with a corresponding set of arcs representing the corresponding relationships between the connected nodes.

In an embodiment, following is an exemplary method for unique labeling of nodes in semantic networks Block 1504 illustrates an exemplary embodiment wherein the mpService 104 uses an approach to mapping nodes across multiple Semantic Networks onto a single underlying set of domain-independent labels, which provides for efficient storage, reference, and analysis of elements in such Semantic Networks. The method used to generate unique labels is as follows: In block 1506, every node in every Semantic Network is labeled with a numeric value 1 . . . N (such value, a "Sequence Number"), said values being determined using a Graph Labeling algorithm.

In the mathematical discipline of graph theory, a graph labeling is the assignment of labels, traditionally represented by integers, to the edges or vertices, or both, of a graph. Formally, given a graph G, a vertex labeling is a function mapping vertices of G to a set of labels. Likewise, an edge labeling is a function mapping edges of G to a set of "labels". When the edge labels are members of an ordered set (e.g., the real numbers), it may be called a weighted graph.

In block 1508, the mpService 104 traverses the set of Semantic Networks in a set order, and assigns each Semantic Network a starting offset equal to the sum of the count of nodes in every Semantic Network that precedes it in the aforementioned set order (such sum, the "Starting Offset".) In block 1510, the Starting Offset is added to the Sequence Number of every node in every Semantic Network. For example, given two Semantic Networks [Sa] and [Sb] whose nodes initially have the following ranges of numeric labels:

Sa: 1 . . . 2800
Sb: 1 . . . 1200

The nodes may be subsequently relabeled such that the nodes in said Semantic Networks might then be labeled as follows:

Sa: 1 . . . 2800
Sb: 2801 . . . 4000

The result is a unique node numbering across all Semantic Networks. The value of the label on any node j is represented by the symbol $\alpha j$.

Once the unique node numbering has been established, each node is identified by its unique label $\alpha j$. Well known methods such as hash tables can be used to map each label to its corresponding original node, creating an efficient, compact labeling mechanism that is useable within and across one or more Semantic Networks.

In computer science, a hash table or hash map is a data structure that uses a hash function to map identifying values, known as keys (e.g., a person's name), to their associated values (e.g., their telephone number). Thus, a hash table implements an associative array. The hash function is used to transform the key into the index (the hash) of an array element (the slot or bucket) where the corresponding value is to be sought. Cryptographic hash functions are believed to provide good hash functions for any table sizes, either by modulo reduction or by bit masking. For the best possible choice of hash function, a table of size n with open addressing has no collisions and holds up to n elements, with a single comparison for successful lookup, and a table of size n with chaining and k keys has the minimum max(0, k-n) collisions and O(1+k/n) comparisons for lookup.

Label Primary Records

In block 1512, every field in every Primary Record, R, may be mapped to one or more nodes $\alpha i^*$ in the Semantic Network corresponding to the domain of such individual field (ex: Place Name or GPS location is mapped to a Semantic Network of GIS information ("where's") or a Tag Name is mapped to a Semantic Network such as WordNet ("what's")), resulting in a semantic mapping M from fields f1 . . . fn in R to a set of $\alpha$'s as follows:

M: R[f1, f2, . . . , fn]=><$\alpha 1, \alpha 2, \ldots, \alpha k$>
Where <$\alpha 1, \alpha 2, \ldots, \alpha k$> may be denoted as <$\alpha^*$>.

As an example, mapping a Primary Record with the following fields:

Tags: red, blue
Location: Grand Central Terminal may result in the set <α73, α85, α902>, whose values are the labels of the nodes corresponding to <red, blue, Grand Central Terminal>.

The preferred embodiment of the storage representation of <α*> is a string of fixed-point numbers. This representation is very compact, is amenable to computationally efficient compression mechanisms, and is easily stored, retrieved, searched and matched.

In an embodiment, record discriminators are generated. In block 1514, the mpService 104 uses "Record Discriminators" to enable the basic matching processes of this overall method. The mpService 104 uses Record Discriminators, w, to conditionally select or reject specific Primary Records by examining their associated semantic labels <α*>.

ω[α*]: R'[<α1, α2, . . . αn>]=>μ where applying ω to [α*] resulting in μ, whose value may be e.g., a score value, a weight value, or a Boolean value.

As used herein, "Record Discriminators" express a logical grouping or relationship between elements of one or more Semantic Networks that commonly occur within Primary Records recorded by user populations or subpopulations. These relationships express common user preferences, behaviors, trends or other salient attributes or patterns. The purpose of the Record Discriminators is to capture these attributes within a reasonable confidence interval when applied to data sampled from a large user population.

In the simplest case, a Boolean Record Discriminator tests for the presence of a set of one or more α*, and results in true if α* is a member of R'. For example, if the node for friendship-related words in the WordNet Semantic Network were labeled α123, then the discriminator ωbool[α123] returns true when applied to R' [α*], if <α*> contains α123 aka friendship-related words.

Additional finer-grain or coarser-grain discrimination is accomplished by including additional nodes within the discriminator. For example, if α123 is a node for friendship related words, and if there is a sibling or parent node for "acquaintance-related words" α456, this node may be automatically (or heuristically) included in the Discriminator, or a secondary Discriminator could be created.

The ability to express positive and negative conditions in Discriminators is important in the event exclusion of a specific characteristic is required, the simplest example of which is excluding specific geographic areas or specific traits that have are indefinite in scope or difficult to define.

Record Discriminators are utilized by Pattern Filters (infra vide), which can effectively utilize both stochastic and deterministic Record Discriminators.

Stochastic Record Discriminators are generated through large scale analysis of Primary Records, through methods including cryptanalysis, methods derived from digital signal processing, Markov analysis, multidimensional scaling, and general algebraic statistics, as well as through optimization methods such as Bloom filters and Bayesian analysis, all methods of which are generally known to mathematicians, engineers, or computer scientists who are ordinarily skilled in the art.

A Markov chain is a mathematical system that undergoes transitions from one state to another, between a finite or countable number of possible states. Usually a Markov chain is defined for a discrete set of times (i.e., a discrete-timeMarkov chain) although some authors use the same terminology where "time" can take continuous values. The steps are often thought of as moments in time, but they can equally well refer to physical distance or any other discrete measurement; formally, the steps are the integers or natural numbers, and the random process is a mapping of these to states. The Markov property states that the conditional probability distribution for the system at the next step (and in fact at all future steps) depends only on the current state of the system, and not additionally on the state of the system at previous steps. By convention, we assume all possible states and transitions have been included in the definition of the processes, so there is always a next state and the process goes on forever.

Deterministic Record Discriminators may be generated from structured knowledge bases as the result of prior recorded user feedback related to acceptance or rejection of recommendations or through a variety of data-driven automated or manual generation processes. These Record Discriminators may be associated with individual User Profiles and used to augment system-wide Record Discriminators.

One preferred embodiment of a method to generate a Stochastic Record Discriminator is to use combinatorial and statistical analysis techniques commonly used in the field of cryptanalysis. These methods are particularly effective in emerging hidden relationships and patterns within a large body of data, when a large sample of encoded data is available.

In preferred embodiment the Primary Record Sample is labeled. In block 1516, select a large sample set of Primary Records, mapping each record Ri to a set <αi*>, and collectively mapping all of the Primary Records to a set of records A: [<α1*><α2*> . . . <αn*>]

All n-graphs up to length k may be generated. In block 1518, generate all possible combinations of n elements in A, where n ranges over 1 . . . k (such combinations of elements, an "n-graph.")

For example, if A* were <α1, α2, α3>, then the following result is generated:

for n=1: [<α1><α2><α3>]
for n=2: [<α1, α2><α2, α3>, <α1,α3>]

Set E is calculated by uniting all of the sets of n-graphs:

$$E=[<α1><α2><α3><α1, α2><α2, α3>, <α1,α3>]$$

The value k is a tunable parameter of the system, with higher values capturing more remote causal relationships at the expense of increased computational costs.

Block 1520 is an exemplary method for Generating Record Discriminators. First, count the number of occurrences of each n-graph <α1, α2, . . . > in set E. Next, sort the results of this count by the frequency of occurrence of each n-graph. Finally, select the most frequent N n-graphs <α1, α2, . . . >, which may be denoted by record discriminators [ω1 . . . ωN].

Block 1522 is an exemplary method for Generating Pattern Filters. The mpService 104 predicts user behaviors through the use of Pattern Filters generated through statistical analysis of large sets of Primary Records. A Pattern Filter is a mapping of a pair of Record Discriminators <ω1, ω2> to a numeric value μ:

Φ12: <ω1, ω2>=>μ, otherwise nil

Given two Primary Records <R1, R2>, if ω1 matches R1, and ω2 matches R2, then Φ12 matches with a score of μ.

By applying the universe of Pattern Filters <Φij*> to temporally sequential pairs of Primary Records, where for example one Primary Record is the current state Primary Record that the mpService 104 is evaluating, and the other Primary Record is a possible future state E, the most likely set of corresponding future states E can be computed.

The following section describes a preferred embodiment and methodology for generating a set of pattern filters.

Block 1524 is an exemplary method for Creating User Journals for Each mP User. First, for each user, create a User Journal U: [U1, U2, . . . Un] by selecting every user-specific Primary Record (such user-specific Primary Record, U) from the mpDB, possibly limited to specific time periods, geographic regions, or to other domain specific ranges.

Block 1526 is an exemplary method for Generating Labels from User Journal Records. For each Ui in the user journal U: [U1, U2, . . . Un], generate the set of <ωj> that matches Ui by evaluating each U i against each ω i:

$$U => \omega 1^*>, <\omega 2^*> \ldots <\omega n^*>]$$

The result may be [0, 1, . . . k] Record Discriminators ωi associated with each Ui¬ in the User Journal U.

Block 1528 is an exemplary method for Generating Record Discriminator Pairs. For each pair of records in the user journal [Ui, Uj] that are within k elements of each other (such that j−i<=k), generate all pairwise combinations of every element of Record Discriminators <ωi*, ωj*>.

Block 1530 is an exemplary method for Generating Pattern Filters. First, count the resulting pairs <ωi, ωj> generated in [4.3] and sort such pairs by most frequently occurring to least frequently occurring. Then, select the first N pairs. Next, compute the probability of occurrence of each pair <ωi, ωj> by dividing the number of occurrences of that tuple by the total number of occurrences over all selected pairs, resulting in a set of probabilities <ρij*>. Each resulting pair <ωi, ωj> shall be designated a Pattern Filter.

Block 1532 is an exemplary method for Generating Behavioral Filters. Behavioral Filters are a framework for improving the accuracy of predictions of user behavior and responses. Behavioral Filters are composed of multiple Record Discriminators and can be matched against multiple sequences of records in a User Journal. In Block 1522, Pattern Filters were generated which enumerate the possible state transitions that can occur between pairs of records in a User Journal, and b) the related probability of these state transitions were also generated. A Behavioral Filter is composed of a sequence of Pattern Filters [<ω1, ω1'> . . . <ωk, ωk'>], which sequence collectively matches a corresponding sequence of records in a User Journal. A Behavioral Filter [<ω1, ω1'> . . . <ωk, ωk'>] matches a sequence of User Records [U1, U2, . . . Uk] if and only if the first element ωi in each pair <ωi, ωi'> matches a User Record, such that ωi[Ui] is true for all i.

The matching probability of a Behavioral Filter can be computed from the individual probabilities of the constituent Pattern Filters [<ωi, ωj> . . . <ωi, ωj>].

A preferred embodiment of the method of generating a set of Behavioral Filters derived from a set of Pattern Filters is as follows. Given a set of Pattern Filters [<ωi, ωi'>*] and their probabilities <ρi*>, a Markov Analysis is performed by exhaustively constructing all possible sequences of Pattern Filters [<ωi,ωj>*] and computing the probability of each sequence as the product of their probabilities <ρi*>. In the event the probability of a sequence falls below a small limiting value c, that filter sequence is culled from the result set.

The result is a set of Behavioral Filters [fβ1 . . . βN], each composed of sequences of Pattern Filters [<ωi,ωj>, <ωi,ωj>, <ωi,ωj>] and a set of computed probabilities [ρ1 . . . ρN] associated with [β1 . . . βN].

Block 1534 is an exemplary method for User State Generation. The User State for a user U is the subset of the Behavioral Filters [β1 . . . βN] computed in block 1532 that are a Partial Match to the most recent records [U[k]] in the User Journal for U. A "Partial Match" is defined as follows: given a Behavioral Filter β composed of k Pattern Filters [<ω1, ω1'>,<ω2, ω2'>, . . . ,<ωk, ωk'>], a β may be split into two vectors without loss of generality as {C: [ω1, ω2, . . . ωn] R:[ω1', ω2', . . . ωn'] }, where C is the set of conditions and R is the set of resultant states. β is a partial match to a set of User Records [U1, U2, . . . , Un] if there is a sequence [ω1 . . . ωm] in C, m<k, such that each [ω1 . . . ωm] matches the last m elements of β, namely [Un−w+1, . . . Un].

The mpService 104 generates the User State by comparing the current User Journal with the set of all Behavioral Filters and by extracting a set of eligible Behavioral Filters that match the current User State.

A preferred embodiment of the method of computing the User State is as follows. Rewrite all Behavioral Filters [β1 . . . βN] into split form, namely [C1 . . . CN] and [R1 . . . RN]. The mpService 104 construct a table of storage elements consisting of two columns. The left-hand column is populated with each distinct value of w in [C1 . . . CN]. The right hand column is populated with a distinct pointer to every element of any corresponding [R1 . . . RN] which corresponds to the value in the left hand column. Whenever a new user record R is created, the left column of the table is searched, and for each row where the value in the left hand column matches the new user record, the contents of the right hand column is added to the set of all such selections (such set, the "Tentative User State".)

Each Behavioral Filter in the Tentative User State is evaluated for a Partial Match. If that filter does not match, that element is removed from the Tentative User State. After all Behavioral Filters in the Tentative User State have been evaluated, the resulting set is called the User State.

Block 1536 is an exemplary method for Real-time Matching. Real-time Offer Matching can occur either on a centralized server, on a personal device, or on another remote device. At any given time, the mpService 104 is capable of presenting to a given user a plethora of Offers. The mpSystem is also capable of presenting to the user their likely future actions or behaviors based on their past data.

At any given time, a plethora of available Offers are stored within the mpService, awaiting an opportunity to be presented to users. These Offers may have been internally generated within the mpService 104 or provided by external systems to the mpService. Each Offer is encoded by the mpService 104 and labeled with a set of labels <αi*>. The determination as to which Offer to present to a user is based on the mpService's assessment of which Offer would be most relevant to the user. Each Offer may also have a value or score associated with it, which may be used to further discriminate it among several competing Offers.

The mpService 104 uses Real-time Matching to determine which members of the currently available set of Offers θ should be presented a given user. Real-time Matching is the process by which a set of Offers is evaluated each time that a specific user's journal of records (their User Journal) changes. The User State computed in block 1534 is used to predict whether or not a user may accept or reject a specific real-time Offer.

The following is a preferred embodiment of the method of constructing an optimal ordering for possible Offers to present to a User. Block 1538 is an exemplary method for Creating List of Potential Offers. For each Offer θ labeled with the set of labels λ: [α1 . . . αn], evaluate Ri[λ] for all [R1 . . . RN] in the User State. For each Ri that matches, add the pair [θ, ρi] to the List of Potential Offers, where pi is the probability associated with Ri.

Block 1540 is an exemplary method for Prioritizing Offers. Sort the list of Potential Offers according to the probability calculated, from high to low. The ordering of the list of Potential Offers is now optimal. Block 1542 is an exemplary method for Presenting Offers.

Using the list of Potential Offers generated above, the mpService 104 presents to the User one or more of the most optimal Potential Offers for User action such as viewing, selection, rejection, storing for later use, or other offer-specific action.

In an embodiment, myPlanit™ is uniquely capable of performing analytics and decisioning across a) private data, shared data and public data and b) various types of data (such as people data, place data, event data, moment data, etc.) because of its ability to integrate related data from multiple sources. The mix of this specific data schema, the schema's ability to represent a wide range of online and offline behavior, and the ability for it to be linked to external databases collectively offers a unique ability to build analysis tools that can: dynamically query one or more external databases for a set of data that has known relationships amongst all the elements; discover causal relationships (as opposed to just simple correlations) between two or more large sets of data to predict future behavior; dynamically create and share datasets that link together data records on different databases, different social networks, or different websites; reduce cross-domain analytics to a single decision domain.

Moreover, this method may enable the creation of a highly efficient decisioning process requiring limited mathematical computation for applying large population behavioral statistics to individual users; provide for efficient analytics and decisioning simultaneously across multiple domains of data; and is able to make recommendations based on behavior patterns that take into account past records, present state and future plans.

Figure 16:
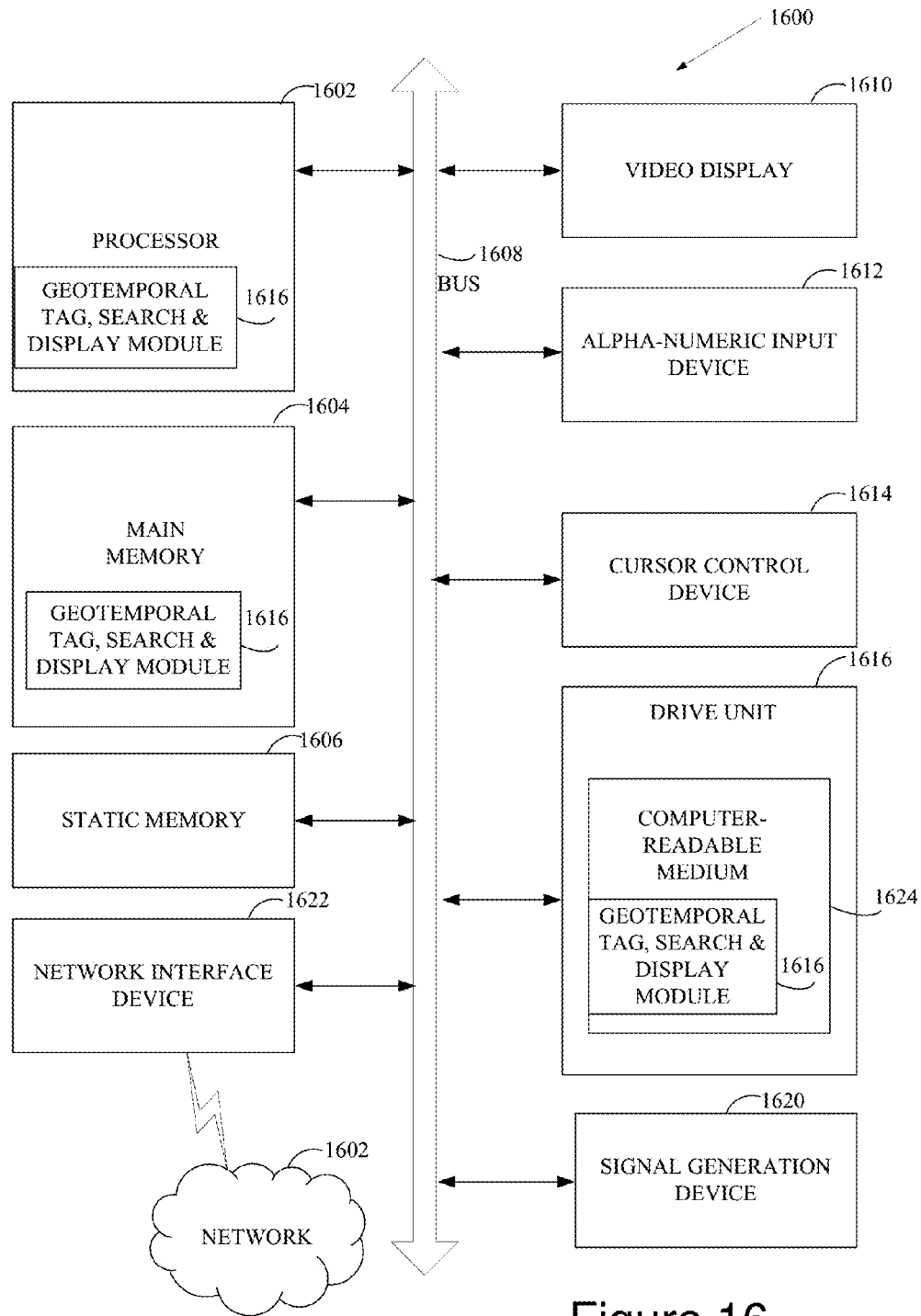
FIG. 16 illustrates is a block diagram of an exemplary computer system that may perform one or more of the operations described herein.

FIG. 16 illustrates a diagrammatic representation of a machine in the exemplary form of a computer system 1600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1600 includes a processing device (processor) 1602, a main memory 1604 (e.g., read-only memory (ROM), flash memory, dynamic random access memory (DRAM) such as synchronous DRAM (SDRAM) or Rambus DRAM (RDRAM), etc.), a static memory 1606 (e.g., flash memory, static random access memory (SRAM), etc.), and a data storage device 1618, which communicate with each other via a bus 608.

Processor 1602 represents one or more general-purpose processing devices such as a microprocessor, central processing unit, or the like. More particularly, the processor 1602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1602 may also be one or more special-purpose processing devices such as an application specific integrated circuit (ASIC), a field programmable gate array (FPGA), a digital signal processor (DSP), network processor, or the like. The processor 1602 is configured to execute instructions 1626 for performing the operations and steps discussed herein, illustrated in FIG. 16 by depicting instructions 1626 within processor 1602.

The computer system 1600 may further include a network interface device 1622. The computer system 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), and a signal generation device 1620 (e.g., a speaker).

The data storage device 1618 may include a computer-readable storage medium 1624 on which is stored one or more sets of instructions 1626 (e.g., software) embodying any one or more of the methodologies or functions described herein. The instructions 1626 may also reside, completely or at least partially, within the main memory 1604 and/or within the processor 1602 during execution thereof by the computer system 1600, the main memory 1604 and the processor 1602 also constituting computer-readable storage media. The instructions 1626 may further be transmitted or received over a network 1670 via the network interface device 1622.

In one embodiment, the instructions 1626 include instructions for a geotemporal tag, search and display module 1616, which may respectively correspond to the myPlanit™ central database 102 and the myPlanit™ web service 104 of FIG. 1, and/or a software library containing methods that call storyboard geotemporal tag, search and display module 1616. While the computer-readable storage medium 1624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating", "tagging", "interconnecting", "receiving", "identifying", "displaying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-based method of organizing and structuring electronically stored information comprising:
    receiving data at a central database comprising one or more server computers executing on one or more processors, from a computing device or one or more web service server computers executing on one or more processors in communication with the central database, the received data related to content types stored on the computing device or the web service server computers, the content types comprising text, videos, photos, audio recordings, notes, calendar entries, contact entries, and GPS location data;
    extracting at the central database any people, date, place, event, and related descriptor data from the received data regardless of the content types to which the received data relate and storing the extracted data in the central database;
    determining at the central database if the place data has a GPS value and an estimate of error for the GPS value;
    determining if the central database has any other data having a deterministic relationship to the place data that indicates a place where a moment or event took place when there is no GPS value for the place data or the estimate of error for the GPS value is above a maximum allowed error and using the other data, data received from a venue database aggregator and a geocoder service server computer in communication with the central database or the computing device to compute a valid GPS value for the place data to update the place data;
    generating a plurality of nodes comprising portions of the extracted data in a plurality of formats corresponding to the generated nodes, the generated nodes comprising a person node, an event node, a date node, a place node, and related descriptor node;
    generating, by the one or more processors of the central database, a plurality of composite moment records from the generated nodes, wherein each composite moment record comprises linked nodes having at least three of a person node type, date node type, place node type, event node type, and related descriptor node;
    receiving at the central database a request from the computing device or from one or more web service server computers executing on one or more processors in communication with the central database or the computing device to display on the computing device a slice of data related to the extracted data, wherein the slice comprises one or more of date, person, place, or event data, weak links, slice attributes or relationship records related to the extracted data;
    identifying or receiving an ordering for the requested slice at the central database;
    ordering, at the central database the composite moment records to identify a sorted list of the composite moment records based on a comparison of the ordering and corresponding data of the composite moment records;
    obtaining from the central database data and content on the computing device or the web service servers in communication with the computing device or the central database, data and the content corresponding to the requested slice of data related to the extracted data; and
    displaying from the central database or the one or more servers in communication with the central database a display of the requested slice on the computing device.

2. The method of claim 1, further comprising receiving data related to content stored on a social networking service server computer in communication with the computing device or the central database;
    extracting at the central database any event, date, person, and place data associated with the content stored on the social networking service computer;

determining if the place data associated with the content stored on the social networking service computer data has a GPS value and an estimate of error for the GPS value; and determining if the central database has any other data having a deterministic relationship to the place data associated with the content stored on the social networking service that indicates where a moment took place and using the other data, data received from the venue database aggregator, the place data associated with the content stored on the social networking service server, and data received from the geocoder service server computer, to compute a valid GPS value for the place data when there is no GPS value for the place data or the estimate of error is above the maximum allowed error.

3. The method of claim 2, further comprising sharing, by the processing device, the sorted list of related composite moment records between application software on the computing device such that the relative time and space context is retained and wherein the ordering comprises a time order and a geographic order.

4. The method of claim 3, further comprising computing map annotations corresponding to the place data corresponding to the requested slice of the extracted data;

grouping the map annotations for the requested slice; and communicating the grouped map annotations for presentation in a visual display on the computing device, wherein the annotations contain links to the content on the computing device corresponding to the requested slice, wherein the map can be zoomed in or out and pan, dynamically retrieving additional place data corresponding to the requested slice.

5. The method of claim 4, further comprising presenting the requested slice of the extracted data using a date-time slider that dynamically retrieves map annotations from the central data base corresponding to a date and time indicated on the date-time slider display on the computing device when a marker on the date-time slider is moved and updates annotations on the map.

6. The method of claim 5, further comprising analyzing photo and video data from the central database using a face recognition or other body part recognition system to identify persons associated with moments and associating persons identified with the composite records.

7. The method of claim 6, wherein the data received at the central database includes data received from a web service server computer or the computing device comprising historical online credit card, debit card, or ATM transactions.

8. The method of claim 6, further comprising receiving at the central database descriptors of feelings, adjectives, moods, or activities associated with the content; and the slice comprises one or more of the date, person, place, or event extracted data and the descriptors of feelings, adjectives, moods, or activities associated with the content when the map is zoomed in or out or panned or markers of the date-time slider are moved, dynamically retrieving additional place data corresponding to the extracted data for the requested slice with the date and time modified by the markers of the date-time slider and boundaries of the zoomed or panned map.

9. A system for storing and managing personal information comprising:

a central database executing on one or more processors and one or more servers in communication with computing device, one or more web service server computers, a venue database aggregator service server, and a geocoder service server executing on one or more processors, the central database programmed or configured to receive data from the computing device or the servers in communication with the central database, the received data related to content types stored on the computing device or the one or more web service server computers, the content types comprising text, video, audio recordings, photos, calendar entries, GPS location data, and contact entries;

extract any people, date, place, event and related descriptor data from the received data regardless of the content types to which the received data relate;

determine if the place data has a GPS value and an estimate of error for the GPS value;

determine if the central database has any other data having a deterministic relationship to the place data that indicates a place where a moment or event took place if there is no GPS value for the place data or the estimate of error is above a maximum allowed error, and use the other data, data received from the venue database aggregator server, and the geocoder service server to compute a valid GPS value for the extracted place data;

generate a plurality of nodes comprising portions of the extracted data in a plurality of formats corresponding to the generated nodes, the generated nodes comprising a person node, an event node, a date node, a place node, and related descriptor node;

generate a plurality of composite moment records from the generated nodes, wherein each composite moment record comprises linked nodes having at least three of a person node, date node, and related descriptor node;

receive at the central database a request from the computing device or from one or more web service server computers executing on one or more processors in communication with the computing device or the central database to display on the computing device a slice of data related to the extracted data, wherein the slice comprises one or more of date, person, place, or event data, weak links or relationship records, or slice attributes related to the extracted data;

identify or receive an ordering for the requested slice at the central database;

order, at the central database the composite moment records to identify a sorted list of the composite moment records based on a comparison of the ordering characteristic and the corresponding data of the composite moment records;

obtain from the central database the data and content on the computing device or the web service servers in communication with the computing device or the central database the data and the content corresponding to the requested slice of the extracted data; and display from the central database or from the one or more server computers in communication with the central database a display of the requested slice on the computing device in a textual display, a calendar display, or a timeline display.

10. The system of claim 9, wherein the central database is further configured or programmed to:

compute map annotations corresponding to the place data corresponding to the requested slice of the extracted data;

group the map annotations for the requested slice;

communicate the grouped map annotations for presentation in a visual display on the computing device, wherein the annotations contain links to the content on the device corresponding to the requested slice, wherein the map can be zoomed in or out and pan, dynamically retrieving additional place data corresponding to the extracted data for the requested slice; and present the requested slice of the extracted data using a date-time slider that dynamically retrieves map annotations from the central data base corresponding to a date and time indicated on the time-date slider display on the computing device and presents updated annotations on the map.

11. The system of claim 10, wherein the central database is further configured or programmed to:

analyze photo and video data from the central database using a face recognition or other body part recognition system to identify persons associated with moments and associate persons identified with the composite records.

12. The system of claim 11, wherein the central database is further configured or programmed to:

receive and process moment data received from a web service server computer or the computing device comprising historical online credit card, debit card, or ATM transactions.

13. A method for automatically generating and storing moment templates for creating a composite moment record in a central database for managing electronic personal information comprising:

receiving at a central database data from a computing device a date, time, and location of the computing device;

retrieving and analyzing previously stored moment templates of composite moment records from the central database or the computing device based on the time and the location of the computing device;

generating behavioral filters of multiple record moments to predict moment attributes;

automatically generating a moment template for person, place, date, and event information based on comparing the date, time, and location of the computing device or recently created composite moment records with previously created composite moment records and the predicted moment attributes;

receiving at the central database edited or additional person, place, date, and event data and content associated with the moment template from the computing device or one or more web service computers executing on one or more processors, the content comprising content types including one or more of text, video, audio recordings, photos, calendar entries, GPS location data, social media feeds, weather, traffic, or contact entries;

updating the moment template with the edited or additional data, regardless of the content types; and creating and storing in the central database the composite moment record, wherein each composite moment record comprises linked nodes having at least a person node type, place node type, and date node type, and comprising normalized data associated with a particular node type from the updated template.

14. The method of claim 13, further comprising receiving content comprising text, videos, photos, audio recordings, notes, calendar entries, contact entries, and GPS location data associated with the moment template; and updating the composite moment record with the associated content.

15. The method of claim 13, further comprising receiving a request to convert the moment template to an auto-event having a start and end time and date; and creating the auto-event and storing the auto-event in the central database.

16. The method of claim 13, wherein the received additional or edited data of the moment template comprises descriptors of feelings, adjectives, moods, or activities associated with the person, place, date, and event data and content associated with the moment template.

17. The method of claim 16, further comprising receiving content comprising text, videos, photos, audio recordings, calendar entries, or contact entries associated with the descriptors of the moment template; and updating the composite moment record with the descriptors and the associated content.

* * * * *